(12) United States Patent
Madrigal et al.

(10) Patent No.: US 12,321,431 B2
(45) Date of Patent: Jun. 3, 2025

(54) FACE AUTHENTICATION ANTI-SPOOFING USING ULTRASOUND

(71) Applicant: Google LLC, Mountain View, CA (US)

(72) Inventors: Octavio Ponce Madrigal, Mountain View, CA (US); Anton Heistser, Munich (DE); Patrick M. Amihood, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 333 days.

(21) Appl. No.: 17/929,991

(22) Filed: Sep. 6, 2022

(65) Prior Publication Data
US 2023/0126062 A1 Apr. 27, 2023

Related U.S. Application Data

(63) Continuation of application No. PCT/US2021/056601, filed on Oct. 26, 2021.

(51) Int. Cl.
*G06F 21/32* (2013.01)
*G06T 7/20* (2017.01)
(Continued)

(52) U.S. Cl.
CPC ............. *G06F 21/32* (2013.01); *G06T 7/20* (2013.01); *G06T 7/70* (2017.01); *G06V 10/25* (2022.01);
(Continued)

(58) Field of Classification Search
CPC ...... G06F 21/32; G06V 10/25; G06V 10/443; G06V 10/761; G06V 40/161; G06V 40/45; G06V 2201/07
See application file for complete search history.

(56) References Cited

U.S. PATENT DOCUMENTS

| 3,522,764 A | 8/1970 | Biber et al. |
| 5,729,604 A | 3/1998 | Van Schyndel |

(Continued)

FOREIGN PATENT DOCUMENTS

| EP | 3447684 | 2/2019 |
| WO | 2019089432 | 5/2019 |

(Continued)

OTHER PUBLICATIONS

"International Search Report and Written Opinion", Application No. PCT/US2021/056622, Jul. 8, 2022, 14 pages.
(Continued)

*Primary Examiner* — Kent Yip
(74) *Attorney, Agent, or Firm* — Colby Nipper PLLC

(57) ABSTRACT

Techniques and apparatuses are described that implement face authentication anti-spoofing using ultrasound. In particular, a face-authentication system uses ultrasound to distinguish between a real human face and a presentation attack that uses instruments to present a version of a human face. The face-authentication system includes or communicates with an ultrasonic sensor, which can detect a presentation attack and notify the face-authentication system. In general, the ultrasonic sensor analyzes characteristics of a presented object and determines whether the object represents a human face or a presentation attack instrument. In this way, the ultrasonic sensor can prevent unauthorized actors from using the presentation attack to gain access to a user's account or information.

20 Claims, 28 Drawing Sheets

(51) Int. Cl.
*G06T 7/70* (2017.01)
*G06V 10/25* (2022.01)
*G06V 10/44* (2022.01)
*G06V 10/74* (2022.01)
*G06V 40/16* (2022.01)
*G06V 40/40* (2022.01)

(52) U.S. Cl.
CPC .......... *G06V 10/443* (2022.01); *G06V 10/761* (2022.01); *G06V 40/161* (2022.01); *G06V 40/45* (2022.01); *G06T 2207/10132* (2013.01); *G06V 2201/07* (2022.01)

(56) References Cited

U.S. PATENT DOCUMENTS

| | | | |
|---|---|---|---|
| 6,104,808 | A | 8/2000 | Alameh et al. |
| 6,542,436 | B1 | 4/2003 | Myllyla |
| 7,801,315 | B2 | 9/2010 | Watanabe et al. |
| 9,665,784 | B2 | 5/2017 | Derakhshani et al. |
| 10,108,871 | B2 | 10/2018 | Derakhshani et al. |
| 10,262,188 | B2 | 4/2019 | Agassy et al. |
| 10,311,219 | B2 | 6/2019 | Bakish |
| 2016/0371555 | A1 | 12/2016 | Derakhshani et al. |
| 2019/0065875 | A1* | 2/2019 | Sheikh Faridul ...... G06V 40/40 |
| 2019/0138828 | A1 | 5/2019 | Hogan |
| 2019/0258841 | A1* | 8/2019 | Rasmussen ........ G06V 40/1394 |
| 2020/0066132 | A1 | 2/2020 | Kleinbeck |
| 2020/0201968 | A1 | 6/2020 | Danielsen et al. |
| 2020/0300970 | A1 | 9/2020 | Nguyen et al. |
| 2020/0319301 | A1 | 10/2020 | Qiu et al. |
| 2022/0222466 | A1 | 7/2022 | Hassani et al. |
| 2023/0125564 | A1 | 4/2023 | Madrigal et al. |
| 2023/0129068 | A1 | 4/2023 | Madrigal et al. |

FOREIGN PATENT DOCUMENTS

| | | |
|---|---|---|
| WO | 2023075751 | 5/2023 |
| WO | 2023075753 | 5/2023 |
| WO | 2023075754 | 5/2023 |

OTHER PUBLICATIONS

"International Search Report and Written Opinion", Application No. PCT/US2021/056631, Jul. 11, 2022, 14 pages.
"International Search Report and Written Opinion", Application No. PCT/US2021/056601, Jul. 11, 2022, 15 pages.
Chen, et al., "EchoFace: Acousito Sensor-Based Media Attack Detection for Face Authentication", Mar. 2020, pp. 2152-2159.
Lai, et al., "A Smart Spoofing Face Detector by Display Features Analysis", Jul. 2016, 15 pages.
Ming, et al., "A Survey on Anti-Spoofing Methods for Face Recognition with RGB Cameras of Generic Consumer Devices", Oct. 8, 2020, 53 pages
Pinto, et al., "Video-Based Face Spoofing Detection through Visual Rhythm Analysis", Aug. 2012, 8 pages.
"International Preliminary Report on Patentability", Application No. PCT/US2021/056622, Apr. 30, 2024, 10 pages.
"International Preliminary Report on Patentability", Application No. PCT/US2021/056631, Apr. 30, 2024, 10 pages.
"International Preliminary Report on Patentability", Application No. PCT/US2021/056601, Apr. 30, 2024, 11 pages.
"Non-Final Office Action", U.S. Appl. No. 17/930,016, Nov. 13, 2024, 37 pages.
"Non-Final Office Action", U.S. Appl. No. 17/930,026, Nov. 18, 2024, 13 pages.
Park, Jae-Hyun, "Anomaly detection from the signal of low-cost laser device without the false alarm and the missing", IEEE Sensors Journal. Mar. 26, 2018; 18(1 0):4275-85., May 18, 2018, 11 pages.
"Foreign Office Action", EP Application No. 21811189.6, Mar. 28, 2025, 4 pages.

* cited by examiner

FACE AUTHENTICATION ANTI-SPOOFING USING ULTRASOUND

CROSS-REFERENCE TO RELATED APPLICATION(S)

This application is a continuation application of International Application Serial No. PCT/US2021/056601, filed Oct. 26, 2021, the disclosure of which is incorporated by reference herein in its entirety.

BACKGROUND

Face authentication provides a convenient way for users to unlock their device, add security for accessing accounts, or sign transactions, which enhances the user experience. Some face-authentication systems rely on cameras for face authentication. However, it can be challenging for a camera to distinguish between a user's face and a presentation attack that presents an image of the user's face. As such, challenges arise in preventing unauthorized actors from spoofing a face-authentication system that relies on cameras.

SUMMARY

Techniques and apparatuses are described that implement face authentication anti-spoofing using ultrasound. In particular, a face-authentication system uses ultrasound to distinguish between a real human face and a presentation attack that uses instruments to present a version of a human face. Example instruments can include a piece of paper with a photograph of a user, a screen displaying a digital image of the user, or a mask that replicates the user's face to some degree. The face-authentication system includes or communicates with an ultrasonic sensor, which can detect a presentation attack and notify the face-authentication system. In general, the ultrasonic sensor analyzes one or more ultrasonic-based features of a presented object and determines whether the object represents a human face or a presentation attack instrument (e.g., paper, screen, or mask). In some implementations, the ultrasonic sensor uses sensor fusion (e.g., uses data from another sensor to process ultrasonic data) to further enhance its ability to detect the presentation attack. Using these techniques, the ultrasonic sensor can prevent unauthorized actors from using the presentation attack to gain access to a user's account or information.

Aspects described below include a method performed by an ultrasonic sensor for face authentication anti-spoofing using ultrasound. The method includes transmitting an ultrasonic transmit signal and receiving an ultrasonic receive signal. The ultrasonic receive signal comprises a version of the ultrasonic transmit signal that is reflected by an object. The method also includes generating range-profile data based on the ultrasonic receive signal. The range-profile data comprises amplitude and phase information associated with the ultrasonic receive signal. The method additionally includes determining a feature of the range-profile data within a region-of-interest that is associated with a location of the object. The method further includes detecting a presentation attack based on the feature. The presentation attack attempts to spoof a face-authentication system and the object is associated with the presentation attack. The method also includes preventing the face-authentication system from authenticating the presentation attack.

Aspects described below include an apparatus with an ultrasonic sensor configured to perform any of the described methods.

Aspects described below also include a computer-readable medium comprising instructions which, when executed by a processor, cause an ultrasonic sensor to perform any of the described methods.

Aspects described below also include a system with means for providing face authentication anti-spoofing using ultrasound.

BRIEF DESCRIPTION OF DRAWINGS

Apparatuses for and techniques for face authentication anti-spoofing using ultrasound are described with reference to the following drawings. The same numbers are used throughout the drawings to reference like features and components:

FIG. 2-1 illustrates an example implementation of a face-authentication system as part of a user device;

FIG. 2-2 illustrates example components of an ultrasonic sensor for face-authentication anti-spoofing;

FIG. 2-3 illustrates example sensors for face-authentication anti-spoofing;

FIG. 3 illustrates an example face-authentication system that performs face-authentication anti-spoofing using ultrasound;

FIG. 4-1 illustrates ultrasonic reflection differences between some presentation-attack instruments and a human face;

FIG. 4-2 illustrates received power differences between some presentation-attack instruments and a human face;

FIG. 8-1 illustrates an example scheme implemented by an ultrasonic sensor to generate a single-channel feature for face authentication anti-spoofing;

FIG. 8-2 illustrates example range-profile data associated with face authentication anti-spoofing;

FIG. 9-1 illustrates an example scheme implemented by an ultrasonic sensor to generate a multi-channel feature for face authentication anti-spoofing;

FIG. 9-2 illustrates example interferograms associated with face authentication anti-spoofing;

FIG. 10-1 illustrates an example scheme implemented by an ultrasonic sensor for performing co-registration;

FIG. 10-2 illustrates another example scheme implemented by an ultrasonic sensor for performing co-registration;

FIG. 10-3 illustrates an additional example scheme implemented by an ultrasonic sensor for performing co-registration;

FIG. 10-4 illustrates yet another example scheme implemented by an ultrasonic sensor for performing co-registration;

FIG. 11-1 illustrates an example scheme implemented by an ultrasonic sensor to generate another single-channel or multi-channel feature for face authentication anti-spoofing;

FIG. 11-2 illustrates example power distribution histograms associated with face authentication anti-spoofing;

FIG. 11-3 illustrates example constant-false-alarm-rate signal-to-noise ratio histograms associated with face authentication anti-spoofing;

FIG. 12-1 illustrates an example scheme implemented by an ultrasonic sensor to generate yet another single-channel or multi-channel feature for face authentication anti-spoofing;

FIG. 12-2 illustrates a first set of standard-deviation graphs associated with face authentication anti-spoofing;

FIG. 12-3 illustrates a second set of standard-deviation graphs associated with face authentication anti-spoofing;

DETAILED DESCRIPTION

Overview

Face authentication provides a convenient way for users to unlock their device, add security for accessing accounts, or sign transactions, which enhances the user experience. Some face-authentication systems rely on cameras for face authentication. However, it can be challenging for a camera to distinguish between a user's face and a presentation attack that presents an image of the user's face. As such, challenges arise in preventing unauthorized actors from spoofing a face-authentication system that relies on cameras.

Some techniques distinguish between real face and an image of a face by detecting liveliness (e.g., blinking or facial movements). These techniques, however, can require additional capture time, thereby increasing latency involved with performing face authentication. Furthermore, these techniques may be overcome using a video recording of a human face that includes these movements.

To address these problems, this document describes techniques and devices that implement face authentication anti-spoofing using ultrasound. In particular, a face-authentication system uses ultrasound to distinguish between a real human face and a presentation attack that uses instruments to present a version of a human face. Example instruments can include a piece of paper with a photograph of a user, a screen displaying a digital image of the user, or a mask that replicates the user's face to some degree. The face-authentication system includes or communicates with an ultrasonic sensor, which can detect a presentation attack and notify the face-authentication system. In general, the ultrasonic sensor analyzes one or more ultrasonic-based features of a presented object and determines whether the object represents a human face or a presentation attack instrument (e.g., paper, screen, or mask). In some implementations, the ultrasonic sensor uses sensor fusion (e.g., uses data from another sensor to process ultrasonic data) to further enhance its ability to detect the presentation attack. Using these techniques, the ultrasonic sensor can prevent unauthorized actors from using the presentation attack to gain access to a user's account or information.

Example Environment

Figure 1:
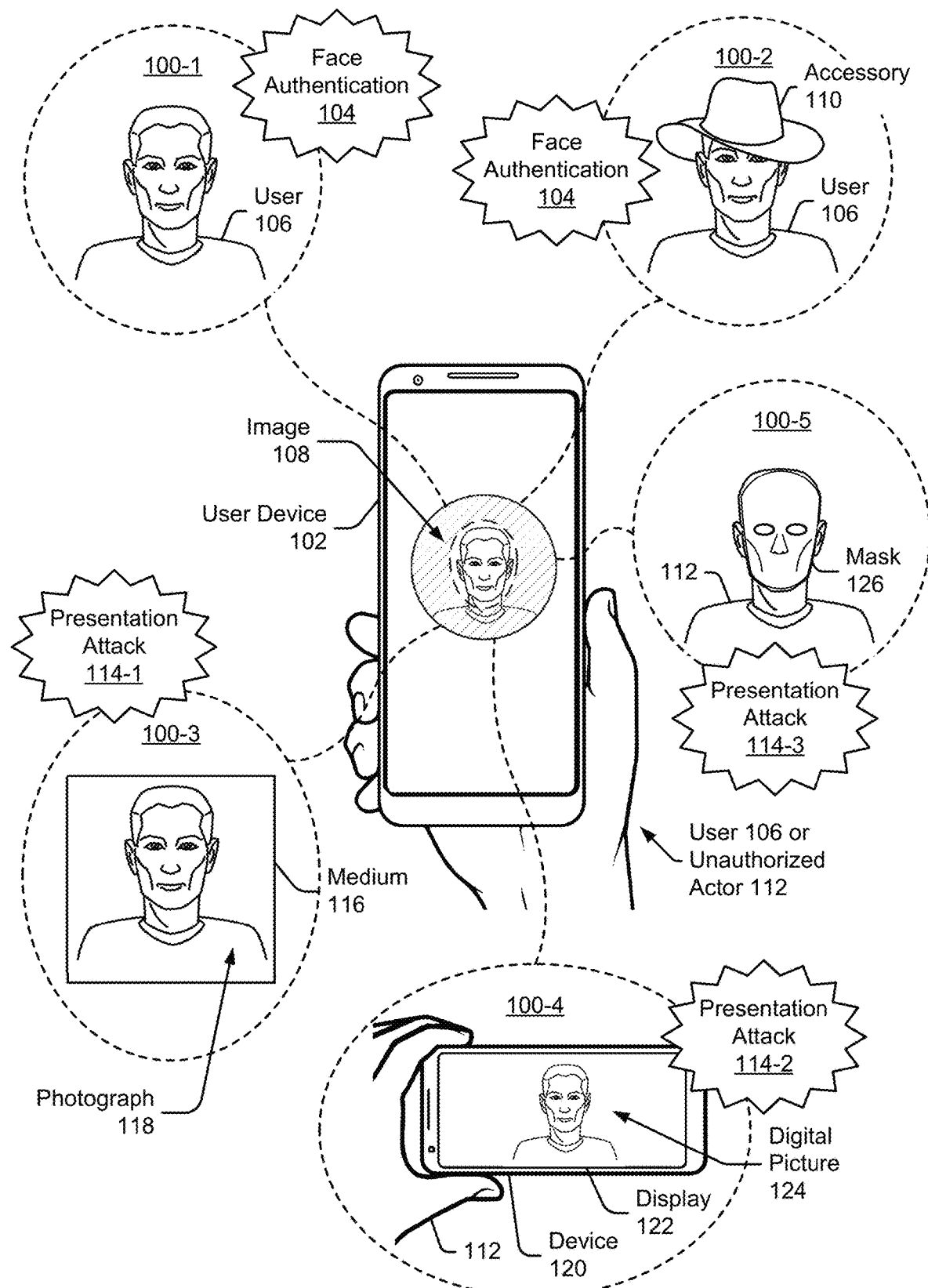
FIG. 1 illustrates example environments in which face authentication anti-spoofing using ultrasound can be implemented.

FIG. 1 is an illustration of example environments 100-1 to 100-5 in which techniques for face authentication anti-spoofing using ultrasound may be embodied. In the environments 100-1 to 100-5, a user device 102 performs face authentication 104. In environments 100-1 and 100-2, a user 106 controls the user device 102 and uses face authentication 104 to, for example, access an application or to sign (electronically) a transaction. During face authentication 104, the user device 102 captures one or more images 108 using a camera system. In this case, the image 108 includes the user 106's face. Using facial recognition techniques, the user device 102 recognizes the user's face from the image and authenticates the user 106.

In some cases, the user 106 may wear an accessory 110 (e.g., a hat, a scarf, a headband, glasses, or jewelry), which can make it more challenging for the user device 102 to recognize the user 106. In this situation, the user device 102 can use ultrasound to determine an absence of a presentation attack and confirm that a real human face is present. With ultrasound, the user device 102 can successfully perform face authentication 104 during situations in which the user 106 is not wearing an accessory 110, such as in environment 100-1, and in situations in which the user 106 chooses to wear an accessory 110, such as in environment 100-2.

In other situations, an unauthorized actor 112 may have control of the user device 102. In this case, the unauthorized actor 112 can use various techniques to attempt to spoof (e.g., trick) the user device 102 into granting the unauthorized actor 112 access to the user 106's account or information. Environments 100-3, 100-4, and 100-5 provide examples of three different presentation attacks 114-1, 114-2, and 114-3, respectively.

In the environment 100-3, the unauthorized actor 112 presents a medium 116 with a photograph 118 of the user 106 during face authentication 104. The medium 116 can be a wood-based medium (e.g., paper, cardboard, or poster board), a plastic-based medium (e.g., an acrylic sheet), a cloth-based medium (e.g., a cotton fabric or a polyester fabric), a sheet of glass, and so forth. In some cases, the medium 116 presents a relatively flat surface in which the photograph is attached, printed, or carved into the medium 116. In other cases, the medium 116 can be curved or attached to an object with a curved surface. During face authentication 104, the unauthorized actor 112 orients the medium 116 towards a camera of the user device 102 to cause the user device 102 to capture images 108 of the photograph 118 presented on the medium 116.

In the environment 100-4, the unauthorized actor 112 presents a device 120 with a display 122 during face authentication 104. The device 120 can be a smartphone, a tablet, a wearable device, a television, a curved monitor, or a virtual or augmented reality headset. The display 122 can be a light-emitting diode (LED) display or a liquid-crystal display (LCD). On the display 122, the device 120 presents a digital picture 124 of the user 106. During face authentication 104, the unauthorized actor 112 orients the display 122 of the device 120 towards the camera of the user device 102 to cause the user device 102 to capture images 108 of the digital picture 124 presented on the display 122.

In the environment 100-5, the unauthorized actor 112 wears a mask 126, which replicates one or more features of the user 106's face in some way. For example, a color of the mask 126 can be approximately similar to the user 106's skin color or the mask 126 can include structural features that represent the user's chin or cheekbone structure. The mask 126 can be a rigid plastic mask or a latex mask. During face authentication 104, the unauthorized actor 112 wears the mask 126 and faces towards the camera of the user device 102 to cause the user device 102 to capture images 108 of the mask 126.

The presentation attacks 114-1 to 114-3 shown in environments 100-3 to 100-5 can spoof some authentication systems, which may then grant the unauthorized actor 112 access. However, with the techniques of face-authentication anti-spoofing using ultrasound, the user device 102 detects the presentation attacks 114-1 to 114-3 and denies the unauthorized actor 112 access.

With the described techniques, the user device 102 can distinguish between a human face (e.g., a face of the user 106) and a representation of a face (e.g., the photograph 118, the digital picture 124, or the mask 126) presented by a presentation attack 114. In particular, the user device 102 uses ultrasound to detect differences in ultrasonic reflections between the human face and the representation of the face. A human face, for instance, is composed of human tissue, which is not as reflective as other types of material, such as plastic. Also, the human face has curves and angles, which can reduce the amount of ultrasonic energy that is reflected directly back to the user device 102. In contrast, presentation-attack instruments with relatively flat surfaces or uniformly curved surfaces, such as the medium 116, the display 122, or a rigid type of mask 126, can increase the amount of ultrasonic energy that is reflected back to the user device 102. By analyzing characteristics of the reflected ultrasonic energy, the user device 102 can determine whether a human face or an instrument used in a presentation attack 114 is presented for face authentication 104. The user device 102 is further described with respect to FIG. 2-1.

Example Face Authentication System

Figures 1, 2:
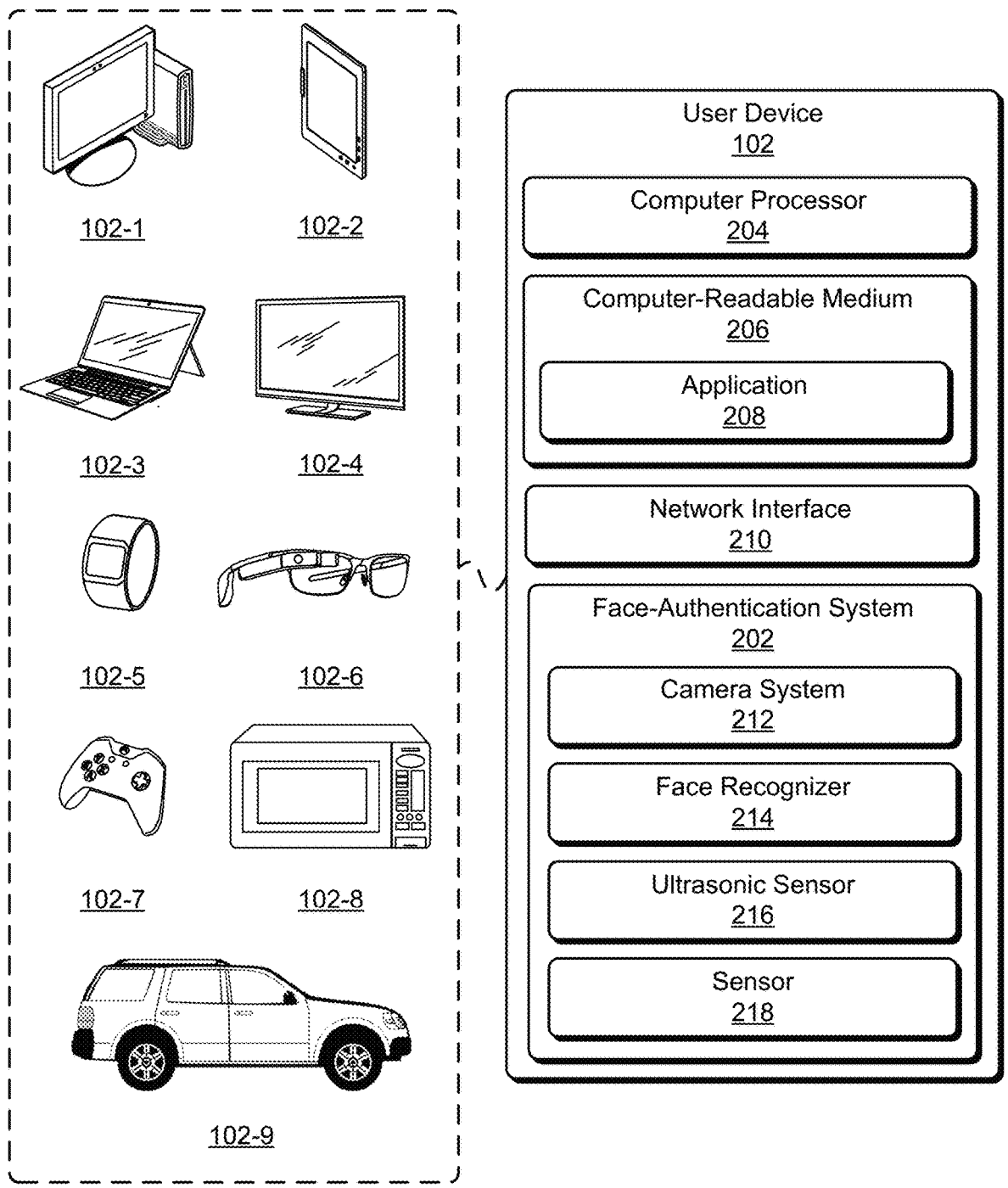
Figure 2:
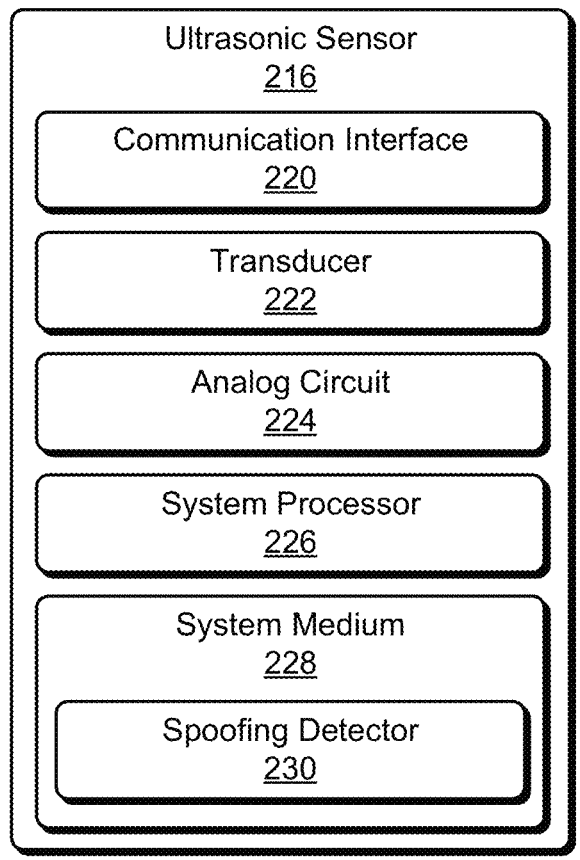

FIG. 2-1 illustrates a face-authentication system 202 as part of the user device 102. The user device 102 is illustrated with various non-limiting example devices including a desktop computer 102-1, a tablet 102-2, a laptop 102-3, a television 102-4, a computing watch 102-5, computing glasses 102-6, a gaming system 102-7, a microwave 102-8, and a vehicle 102-9. Other devices may also be used, including a home-service device, a smart speaker, a smart thermostat, a security camera, a baby monitor, a Wi-Fi® router, a drone, a trackpad, a drawing pad, a netbook, an e-reader, a home-automation and control system, a wall display, a virtual-reality headset, and another home appliance. Note that the user device 102 can be wearable, non-wearable but mobile, or relatively immobile (e.g., desktops and appliances).

The user device 102 includes one or more computer processors 204 and one or more computer-readable medium 206, which includes memory media and storage media. Applications and/or an operating system (not shown) embodied as computer-readable instructions on the computer-readable medium 206 can be executed by the computer processor 204 to provide some of the functionalities described herein. The computer-readable medium 206 also includes an application 208 or setting, which activates in response to the face-authentication system 202 authenticating the user 106. Example applications 208 can include a password-storage application, a banking application, a wallet application, a health application, or any application that provides user privacy.

The user device 102 can also include a network interface 210 for communicating data over wired, wireless, or optical networks. For example, the network interface 210 may communicate data over a local-area-network (LAN), a wireless local-area-network (WLAN), a personal-area-network (PAN), a wire-area-network (WAN), an intranet, the Internet, a peer-to-peer network, point-to-point network, a mesh network, and the like. The user device 102 may also include a display (not shown).

The face-authentication system 202 enables the user 106 to access the application 208, settings, or other resources of the user device 102 using an image of, or that includes, the user 106's face. The face-authentication system 202 includes at least one camera system 212, at least one face recognizer 214, and at least one ultrasonic sensor 216. The face-authentication system 202 can optionally include another sensor 218. Although shown as part of the face-authentication system 202 in FIG. 2-1, the ultrasonic sensor 216 and/or the sensor 218 can be considered separate entities that can communicate (e.g., provide information) to the face-authentication system 202 for face-authentication anti-spoofing. Sometimes the ultrasonic sensor 216 and/or the sensor 218 operate to support other features of the user device 102 in addition to supporting face-authentication anti-spoofing. Various implementations of the face-authentication system 202 can include a System-on-Chip (SoC), one or more Integrated Circuits (ICs), a processor with embedded processor instructions or configured to access processor instructions stored in memory, hardware with embedded firmware, a printed circuit board with various hardware components, or any combination thereof.

The face-authentication system 202 can be designed to operate under a variety of different environmental conditions. For example, the face-authentication system 202 can support face authentication for distances that are approximately 70 centimeters (cm) or less. The distance represents a distance between the user device 102 and the user 106. As another example, the face-authentication system 202 can support face authentication for a variety of tilt and pan angles of the user device 102 that provide angular views between approximately −40 and 40 degrees. These angles can include tilt angles between approximately −40 to 20 degrees and pan angles between approximately −20 and 20 degrees. With this range of angular views, the face-authentication system 202 can operate during situations in which the user 106 holds the user device 102 and/or situations in which the user device 102 is on a surface and the user 106 approaches the user device 102.

Additionally, the face-authentication system 202 can be designed to make a decision regarding face authentication 104 within a predetermined amount of time, such as 100 to 200 milliseconds (ms). This time frame can include a total amount of time it takes to capture the image 108, use ultrasound to determine whether or not a presentation attack 114 occurred, and perform facial recognition on the image 108.

The camera system 212 captures one or more images 108 for face authentication 104. The camera system 212 includes at least one camera, such as a red-green-blue (RGB) camera. The camera system 212 can also include one or more illuminators to provide lighting, especially in dark environments. The illuminator can include an RGB light, such as an LED. In some implementations, the camera system 212 can be used for other applications, such as for taking selfies, capturing pictures for the application 208, scanning documents, reading barcodes, and so forth.

The face recognizer 214 performs face recognition to verify that a human face presented in the image 108 corresponds to an authorized user 106 of the user device 102. The face recognizer 214 can be implemented in software, programmable hardware, or some combination thereof. In some implementations, the face recognizer 214 is implemented using a machine-learned module (e.g., a neural network).

The ultrasonic sensor 216 uses ultrasound to distinguish between a human face and a presentation attack 114. The ultrasonic sensor 216 is further described with respect to FIG. 2-2. The sensor 218 provides additional information to the ultrasonic sensor 216, which enhances the ultrasonic sensor 216's ability to detect the presentation attack 114. The sensor 218 is further described with respect to FIG. 2-3.

FIG. 2-2 illustrates example components of the ultrasonic sensor 216. In the depicted configuration, the ultrasonic sensor 216 includes a communication interface 220 to transmit ultrasonic sensor data to a remote device, though this need not be used when the ultrasonic sensor 216 is integrated within the user device 102. In general, the ultrasonic sensor data provided by the communication interface 220 is in a format usable by the face-authentication system 202.

The ultrasonic sensor 216 also includes at least one transducer 222, which can convert electrical signals into sound waves. The transducer 222 can also detect and convert sound waves into electrical signals. These electrical signals and sound waves may include frequencies in an ultrasonic range.

A frequency spectrum (e.g., range of frequencies) that the transducer 222 uses to generate an ultrasonic signal can include frequencies in the ultrasonic range, which includes frequencies between approximately 20 kilohertz (kHz) and 2 MHz. In some cases, the frequency spectrum can be divided into multiple sub-spectrums that have similar or different bandwidths. For example, different frequency sub-spectrums may include 30 to 500 kHz, 30 to 70 kHz, 80 to 500 kHz, 1 to 2 MHz, 20 to 48 kHz, 20 to 24 kHz, 24 to 48 kHz, 26 to 29 kHz, 31 to 34 kHz, 33 to 36 kHz, or 31 to 38 kHz.

These frequency sub-spectrums can be contiguous or disjoint, and the transmitted signal can be modulated in phase and/or frequency. To achieve coherence, multiple frequency sub-spectrums (contiguous or not) that have a same bandwidth may be used by the transducer 222 to generate multiple ultrasonic signals, which are transmitted simultaneously or separated in time. In some situations, multiple contiguous frequency sub-spectrums may be used to transmit a single ultrasonic signal, thereby enabling the ultrasonic signal to have a wide bandwidth.

For face authentication anti-spoofing, the ultrasonic sensor 216 can use frequencies that provide a particular range resolution that is advantageous for face authentication anti-spoofing. As an example, the ultrasonic sensor 216 can use a bandwidth that can achieve a range resolution of approximately 7 cm or smaller (e.g., approximately 5 cm or approximately 3 cm). An example bandwidth can be at least 7 kHz. The frequencies can also be selected to support a particular detection range for face authentication, such as approximately 70 cm. Example frequencies include frequencies between approximately 31 to 38 kHz.

Sometimes the ultrasonic sensor 216 supports other features in the user device 102 in addition to face authentication anti-spoofing. These other features can include presence detection or hand-grip detection. In this case, the ultrasonic sensor 216 can dynamically switch between different operational configurations that are optimized for the active feature. For example, the ultrasonic sensor 216 can use frequencies between approximately 26 and 29 kHz for presence detection and frequencies between approximately 31 and 38 kHz for face authentication anti-spoofing.

In an example implementation, the transducer 222 of the ultrasonic sensor 216 has a monostatic topology. With this topology, the transducer 222 can convert the electrical signals into sound waves and convert sound waves into electrical signals (e.g., can transmit or receive ultrasonic signals). Example monostatic transducers may include piezoelectric transducers, capacitive transducers, and micromachined ultrasonic transducers (MUTs) that use microelectromechanical systems (MEMS) technology.

Alternatively, the transducer 222 can be implemented with a bistatic topology, which includes multiple transducers located at different positions on the user device 102. In this case, a first transducer converts the electrical signal into sound waves (e.g., transmits ultrasonic signals), and a second transducer converts sound waves into an electrical signal (e.g., receives the ultrasonic signals). An example bistatic topology can be implemented using at least one speaker and at least one microphone of the user device 102. The speaker and microphone can be dedicated for operations of the ultrasonic sensor 216. Alternatively, the speaker and microphone can be shared by both the user device 102 and the ultrasonic sensor 216. Example positions of the speaker and microphone are further described with respect to FIG. 5.

The ultrasonic sensor 216 includes at least one analog circuit 224, which includes circuitry and logic for conditioning electrical signals in an analog domain. The analog circuit 224 can include a waveform generator, analog-to-digital converters, amplifiers, filters, mixers, phase shifters, and switches for generating and modifying electrical signals. In some implementations, the analog circuit 224 includes other hardware circuitry associated with the speaker or microphone.

The ultrasonic sensor 216 also includes one or more system processors 226 and at least one system medium 228 (e.g., one or more computer-readable storage media). The system processor 226 processes the electrical signals in a digital domain. The system medium 228 includes a spoofing detector 230. The spoofing detector 230 can be implemented using hardware, software, firmware, or a combination thereof. In this example, the system processor 226 implements the spoofing detector 230. The spoofing detector 230 processes responses (e.g., electrical signals) from the transducer 222 to detect a presentation attack 114. The spoofing detector 230 can be implemented, at least in part, using a heuristics module or a machine-learned module (e.g., a neural network).

In some implementations, the ultrasonic sensor 216 uses information provided by the sensor 218. For example, the sensor 218 provides the ultrasonic sensor 216 information about a location of an object (e.g., the user 106's face or a presentation-attack instrument). This information can include range and/or angle measurements. In this way, the ultrasonic sensor 216 can use the location information provided by the sensor 218 to customize (e.g., filter or normalize) ultrasonic data prior to determining whether or not a presentation attack 114 exists. In some cases, this customization is performed before the ultrasonic sensor 216 independently measures the location of the object using ultrasonic techniques. Optionally, the ultrasonic sensor 216 can utilize the location information provided by the sensor 218 to enhance an accuracy of measuring the object's location using ultrasonic techniques.

As another example, the ultrasonic sensor 216 can utilize motion data provided by the sensor 218. In particular, the ultrasonic sensor 216 can modify the ultrasonic data to compensate for motion identified by the motion data. Example sensors 218 are further described with respect to FIG. 2-3.

Figures 2, 3:
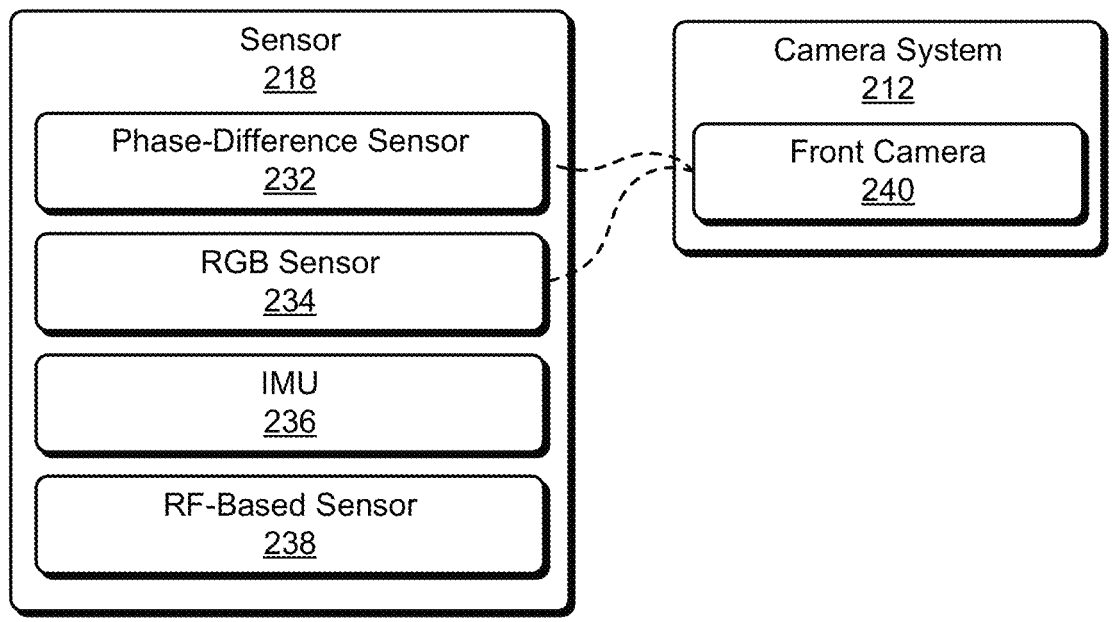
Figure 3:
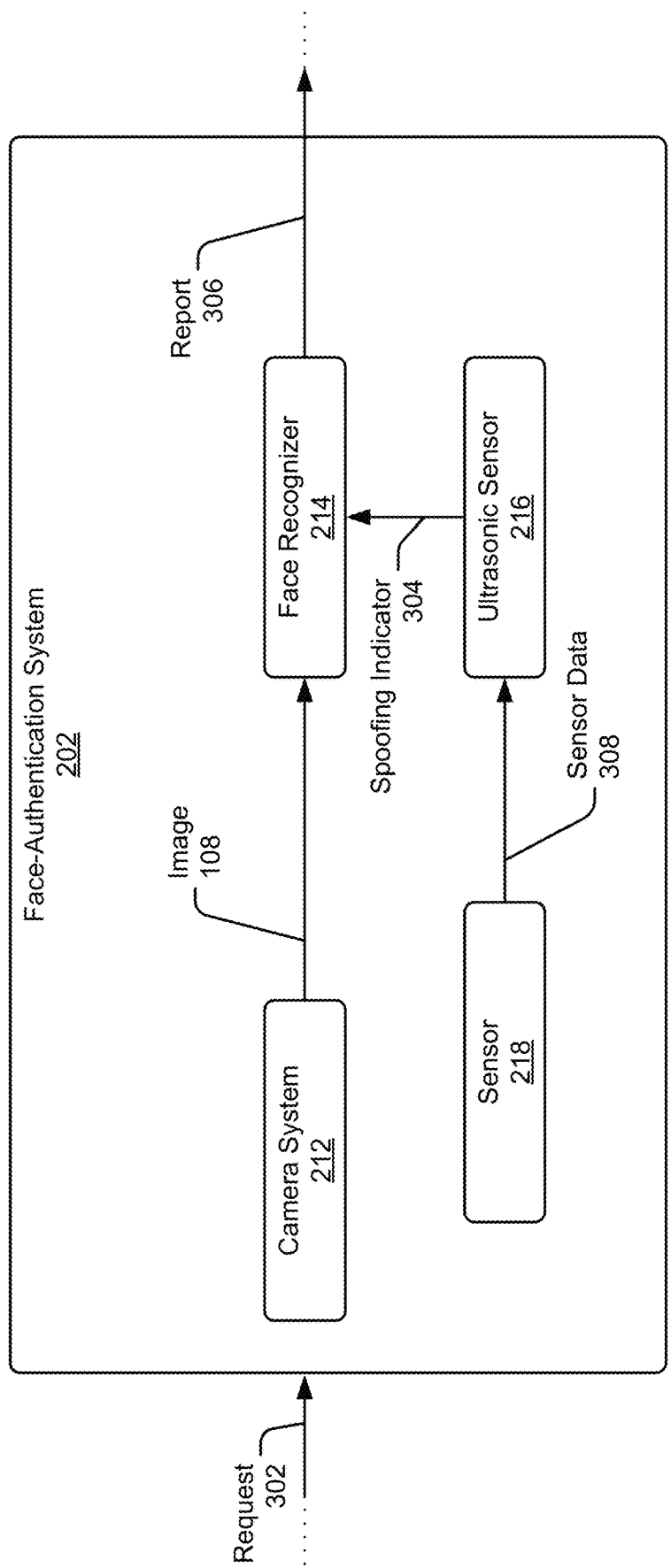

FIG. 2-3 illustrates example sensors 218 for face-authentication anti-spoofing. In the depicted configuration, the sensor 218 can include a phase-difference sensor 232, an RGB sensor 234, an inertial measurement unit (IMU) 236 (IMU 236), and/or a radio-frequency-based sensor 238 (RF-based sensor 238). In some implementations, the phase-difference sensor 232 is part of a front camera 240 of the camera system 212. The front camera 240 can also be used to capture the image 108 for face authentication. The phase-difference sensor 232 can measure an object's distance based on detected phase differences. With the measured distance, the ultrasonic sensor 216 can determine a region-of-interest associated with the object and perform distance normalization to compensate for the distance between the object and the ultrasonic sensor 216, which can vary in different face-authentication situations. In particular, the ultrasonic sensor 216 calibrates the intensity or amplitude information associated with the object based on the measured distance. This enables the ultrasonic sensor 216 to support face authentication anti-spoofing for a variety of different distances.

The RGB sensor 234 can also be part of the front camera 240. The RGB sensor 234 can measure an angle to an object and provide this angle to the ultrasonic sensor 216. The ultrasonic sensor 216 can normalize energy or intensity information based on the measured angle. This enables the ultrasonic sensor 216 to better detect backscattering differences between an object used in a presentation attack 114 or a human face and support face authentication anti-spoofing for a variety of different angles.

The inertial measurement unit 236 can measure a motion of the user device 102. With this motion information, the ultrasonic sensor 216 can perform motion compensation. Additionally or alternatively, the ultrasonic sensor 216 can be activated responsive to the inertial measurement unit 236 indicating that the user device 102 is approximately stationary. In this way, the inertial measurement unit 236 can reduce the quantity of motion artifacts observed by the ultrasonic sensor 216.

Example RF-based sensors 238 can include an ultra-wideband sensor, a radar sensor, or a WiFi® sensor. Using radio-frequencies, the RF-based sensor 238 can measure a distance and/or angle to the object that is presented for face authentication 104. With these measurements, the ultrasonic sensor 216 can determine a region-of-interest for detecting the presentation attack and calibrate the intensity or amplitude information. Interactions between the camera system 212, the face recognizer 214, the ultrasonic sensor 216, and the sensor 218 are further described with respect to FIG. 3.

FIG. 3 illustrates an example face-authentication system 202 that performs face-authentication anti-spoofing using ultrasound. In the depicted configuration, the face-authentication system 202 includes the camera system 212, the face recognizer 214, and the ultrasonic sensor 216. The face-authentication system 202 can also optionally include the sensor 218. The face recognizer 214 is coupled to the camera system 212 and the ultrasonic sensor 216. The sensor 218 is coupled to the ultrasonic sensor 216.

During operation, the face-authentication system 202 accepts a request 302 to perform face authentication 104. In some situations, the request 302 is provided by the application 208 or another service that requires face authentication 104. In other situations, the request 302 is provided by the sensor 218 responsive to the sensor 218 detecting an interaction with the user 106. For example, the inertial measurement unit 236 can send the request 302 to the face-authentication system 202 responsive to detecting the user 106 lifting the user device 102.

In response to receiving the request 302, the face-authentication system 202 initializes and activates the camera system 212. The camera system 212 captures at least one image 108 for face authentication 104. The camera system 212 provides the captured image 108 to the face recognizer 214.

The ultrasonic sensor 216 performs ultrasonic sensing to detect a presentation attack 114. This can occur prior to the camera system 212 capturing the image 108, while the camera system 212 captures the image 108, or after the camera system 212 captures the image 108. By analyzing the reflected ultrasonic energy, ultrasonic sensor 216 can determine whether the reflected ultrasonic energy came from an object associated with a presentation attack 114 or a human face. The ultrasonic sensor 216 generates a spoofing indicator 304, which indicates whether or not the presentation attack 114 is detected. The ultrasonic sensor 216 provides the spoofing indicator 304 to the face recognizer 214.

The face recognizer 214 accepts the image 108 and the spoofing indicator 304. If the spoofing indicator 304 indicates that a presentation attack 114 is not detected, the face recognizer 214 performs face recognition to determine whether the user 106's face is present within the image 108. The face recognizer 214 generates a report 306, which is provided to the application 208 or the service that sent the request 302. If the face recognizer 214 recognizes the user 106's face and the spoofing indicator 304 indicates absence of the presentation attack 114, the face recognizer 214 uses the report 306 to indicate successful face authentication. Alternatively, if the face recognizer 214 does not recognize the user 106's face and/or the spoofing indicator 304 indicates occurrence of the presentation attack 114, the face recognizer 214 uses the report 306 to indicate that face authentication failed. This failure indication can cause the application 208 and/or the user device 102 to deny access.

In some implementations, the sensor 218 provides sensor data 308 to the ultrasonic sensor 216. The ultrasonic sensor 216 uses the sensor data 308 to customize the processing of ultrasonic-based data, which is measured based on the reflected ultrasonic energy. By considering the additional information provided by the sensor 218, the ultrasonic sensor 216 can enhance its ability to detect the presentation attack 114.

In some aspects, the ultrasonic sensor 216 can additionally provide information to the face-authentication system 202 or another component of the face-authentication system 202 to support anti-spoofing techniques performed by this entity. For example, the ultrasonic sensor 216 can provide a measured distance of the object to the face-authentication system 202. With this information, the face-authentication system 202 can analyze the image 108 provided by the camera system 212 and determine whether a size of the object, as presented in the image 108, comports with a general size of a human face at the measured distance provided by the ultrasonic sensor 216. In particular, the face-authentication system 202 can determine an upper and lower boundary associated with a size of a human face at the measured distance. If the size of the object in the image 108 is within the boundary, then the face-authentication system 202 does not detect a presentation attack 114. However, if the size of the object in the image 108 is outside of the boundary, then the face-authentication system 202 detects the presentation attack 114. In this way, the ultrasonic sensor 216 can also provide ultrasonic-based information that supports anti-spoofing techniques performed by other entities.

Face Authentication Anti-Spoofing

Figures 1, 4:
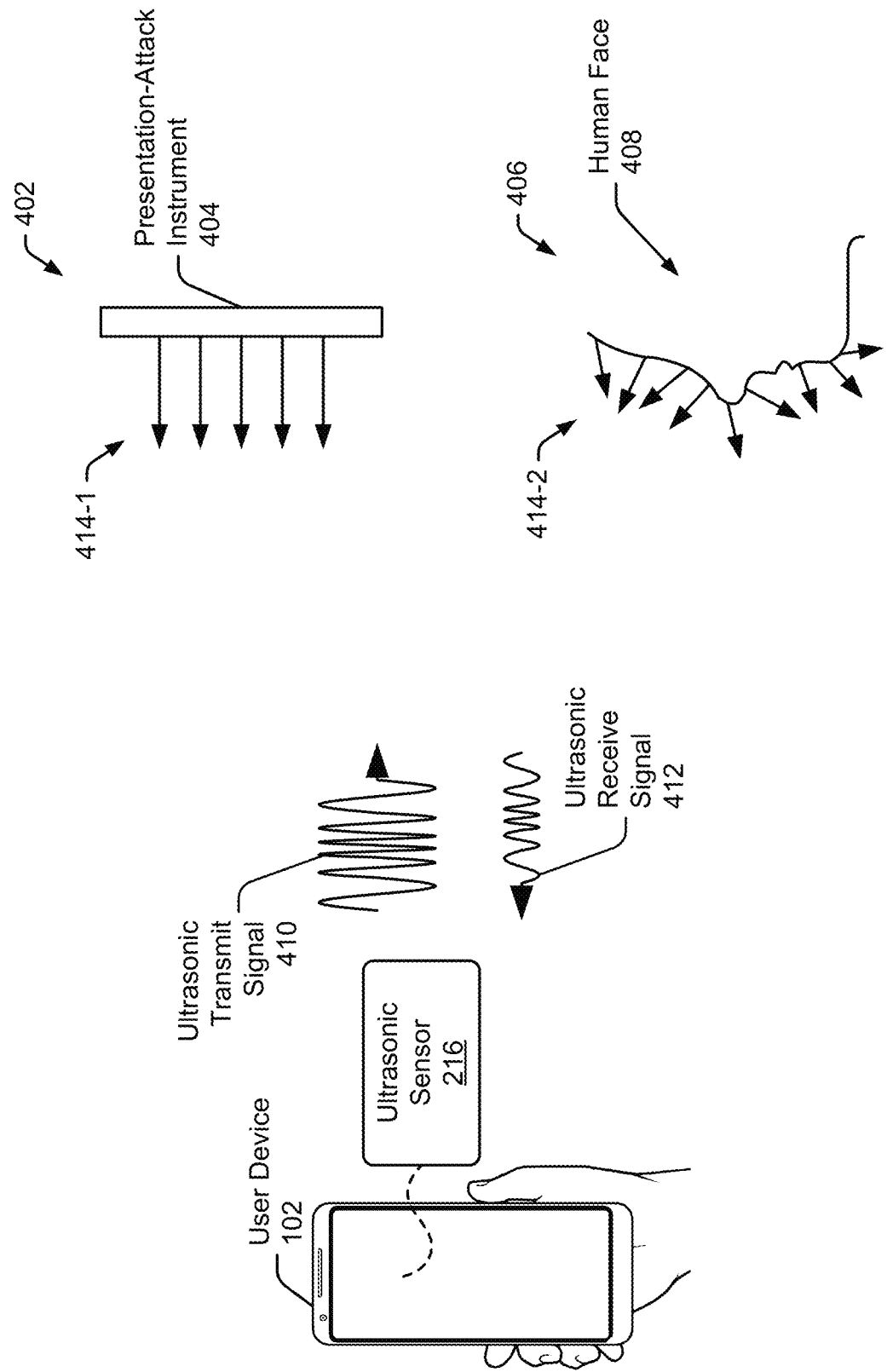
Figures 2, 4:
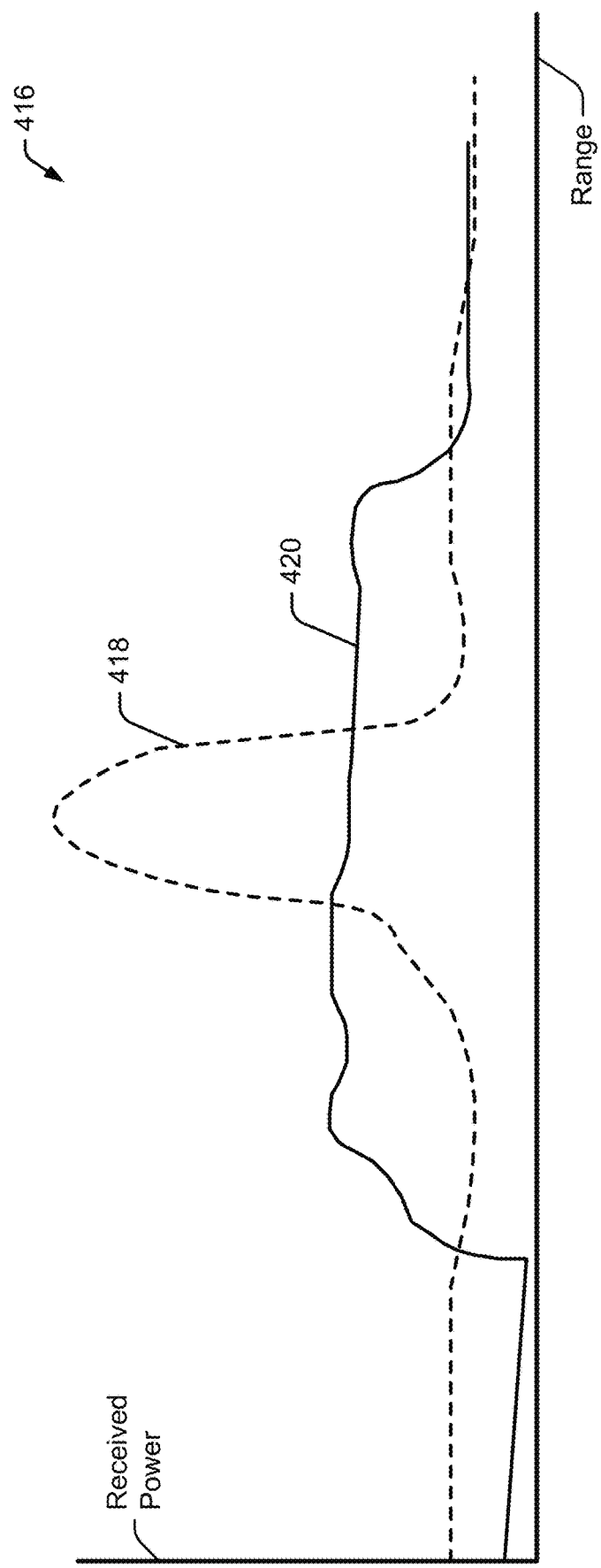

FIG. 4-1 illustrates ultrasonic reflection differences between some presentation-attack instruments and a human face. At 402, a presentation-attack instrument 404 (e.g., an object associated with the presentation attack 114) is presented to the user device 102 during face authentication 104, as shown in environments 100-3 to 100-5. At 406, a human face 408 (e.g., the face of the user 106) is presented to the user device 102 during face authentication 104, as shown in environments 100-1 and 100-2.

The presentation-attack instrument 404 can have a different physical structure than the human face 408. Some presentation-attack instruments 404, for example, can have a substantially flat or planar surface, such as the medium 116 or the device 120. Other presentation-attack instruments 404, such as the mask 126 or other presentation-attack instruments 404 with curved surfaces, can have an approximately piecewise planar surface in which the presentation-attack instrument 404 is composed of a set of substantially flat surfaces. In contrast, the human face 408 can have significantly more pronounced contours and angles relative to the presentation-attack instrument 404. These contours form the forehead, nose, eye sockets, lips, cheek, chin, and ears of the human face 408. Based on these structural differences, the ultrasonic-behavior of the presentation-attack instrument 404 can resemble a point target, whereas the ultrasonic-behavior of the human face 408 can resemble a distributed target.

Also, the presentation-attack instrument 404 and the human face 408 can be composed of different materials. These different materials can result in the presentation-attack instrument 404 and the human face 408 having different absorption and reflection properties associated with ultrasound. For example, the human face 408 is composed of human tissue. Some presentation-attack instruments 404 are composed of other materials, such as plastic, which have a higher reflection coefficient than human tissue.

For both 402 and 406, the ultrasonic sensor 216 transmits at least one ultrasonic transmit signal 410. The ultrasonic transmit signal 410 propagates through space and impinges on the presentation-attack instrument 404 and the human face 408. Due to differences in the physical structures and materials of the presentation-attack instrument 404 and the human face 408, the ultrasonic transmit signal 410 interacts differently with the presentation-attack instrument 404 and the human face 408. This interaction is illustrated by reflections 414-1 and 414-2, which are respectively associated with the presentation-attack instrument 404 and the human face 408.

Due to the planar-like surface of the presentation-attack instrument 404, a significant amount of the ultrasonic transmit signal 410 can be reflected back to the user device 102, as shown by the reflections 414-1 being oriented towards the left in FIG. 4-1. In contrast, the contours of the human face 408 cause the ultrasonic transmit signal 410 to diffuse in many directions, as shown by the reflections 414-2 being oriented in different directions. As such, less ultrasonic energy can be directed back towards the user device 102 from the human face 408 relative to the presentation-attack instrument 404. Also, if the presentation-attack instrument 404 includes materials with a higher reflection coefficient than human tissue, more ultrasonic energy can be reflected by the presentation-attack instrument 404 relative to the human face 408. In other words, the reflections 414-1 associated with the presentation-attack instrument 404 can have higher amplitudes than the reflections 414-2 associated with the human face 408. This difference in amplitude is illustrated by the reflections 414-1 having longer lengths than the reflections 414-2.

For both 402 and 406, the ultrasonic sensor 216 receives at least one ultrasonic receive signal 412. An amplitude of the ultrasonic receive signal 412 is based on the amount of ultrasonic energy that is reflected and the amount of ultrasonic energy that is directed back towards the ultrasonic sensor 216. In general, the different physical structures and materials of the presentation-attack instrument 404 and the human face 408 can cause the ultrasonic receive signal 412 to have a higher amplitude in 402 than 406. Based on the characteristics of the ultrasonic receive signal 412, the ultrasonic sensor 216 can determine whether the presentation-attack instrument 404 or the human face 408 is presented for face authentication 104. Differences in the ultrasonic-behavior of the presentation-attack instrument 404 and the human face 408 are further described with respect to FIG. 4-2.

FIG. 4-2 illustrates received power differences between the presentation-attack instrument 404 and the human face 408. A graph 416 has a first dimension associated with received power and a second dimension associated with range (e.g., distance or slant range). In the graph 416, a dashed line 418 represents the received power associated with the presentation-attack instrument 404. A solid line 420 represents the received power associated with the human face 408. In this example, the presentation-attack instrument 404 and the human face 408 are positioned at approximately a same distance from the user device 102.

As seen in the graph 416, the presentation-attack instrument 404 produces received power with a higher peak than the human face 408. This can be due, at least in part, to a higher reflection coefficient of materials that form the presentation-attack instrument 404. Also, the received power associated with the presentation-attack instrument 404 is concentrated across a smaller range interval whereas the received power associated with the human face 408 is distributed across a larger range interval. This can be due, at least in part, to the point-like nature of the presentation-attack instrument 404 and the distributed nature of the human face 408. By exploiting these inherent differences, the ultrasonic sensor 216 can employ a variety of techniques to identify whether an object presented for face authentication 104 corresponds to a presentation attack 114 or a human face 408. These techniques are further described with respect to FIGS. 7 to 15.

Figure 5:
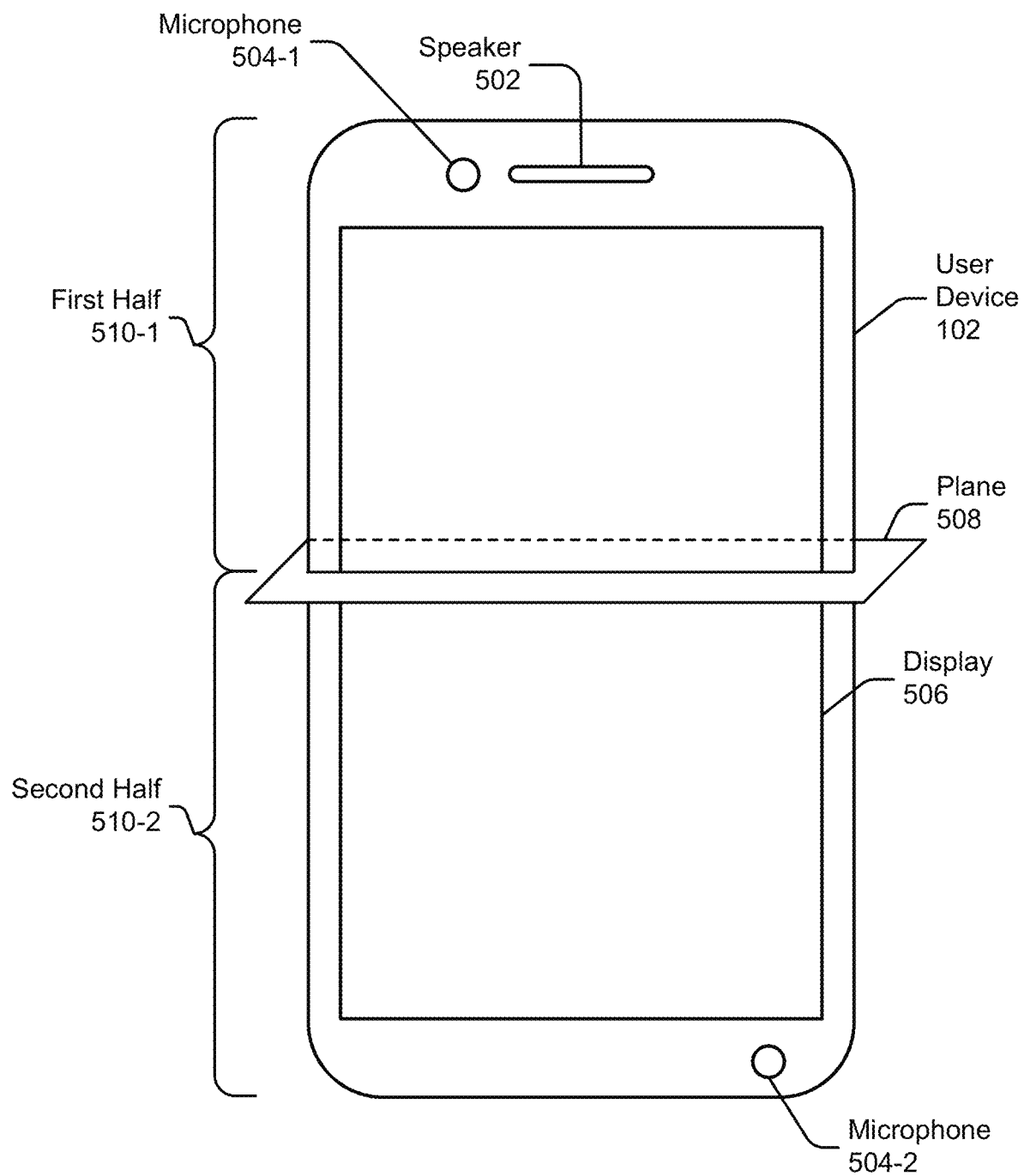
FIG. 5 illustrates example positions of a speaker and microphone of a user device.

FIG. 5 illustrates example positions for a speaker 502 and microphones 504-1 and 504-2 of the user device 102. Although the example user device 102 of FIG. 5 is shown to include one speakers 502 and two microphones 504-1 to 504-2, the ultrasonic sensor 216 may operate with one or more speakers and one or more of microphones at any given time. In situations in which the ultrasonic sensor 216 can use multiple speakers, the ultrasonic sensor 216 can select a speaker that can provide a higher signal-to-noise ratio. The signal-to-noise ratio can be dependent upon performance characteristics of the speaker and/or a position of the speaker relative to the user 106.

In this implementation, the speaker 502 and the microphones 504-1 and 504-2 are positioned on a same surface of the user device 102. In this case, this surface also includes a display 506. The microphone 504-1 is positioned on a different side of the user device 102 than the microphone 504-2. Consider a plane 508, which bisects the user device 102 in half. In this case, a first half 510-1 of the user device 102 includes the speaker 502 and the microphone 504-1. A second half 510-2 of the user device 102 includes the microphone 504-2.

By placing the microphones 504-1 and 504-2 far apart (e.g., at a distance greater than a wavelength of the ultrasonic transmit signal 410), the microphones 504-1 and 504-2 can observe different aspects or features of the reflections 414-1 or 414-2. Using multi-channel techniques, for instance, the ultrasonic sensor 216 can evaluate differences in the responses observed at the microphones 504-1 and 504-2. Due to the point-like nature of the presentation-attack instrument 404, the responses observed at the microphones 504-1 and 504-2 can be substantially similar. In contrast, the responses observed at the microphones 504-1 and 504-2 for the human face 408 can be significantly different due to the distributed nature of the human face 408. Therefore, the ultrasonic sensor 216 can evaluate the differences in the responses to determine whether or not a presentation attack 114 is occurring. An operation of the ultrasonic sensor 216 is further described with FIG. 6.

Figure 6:
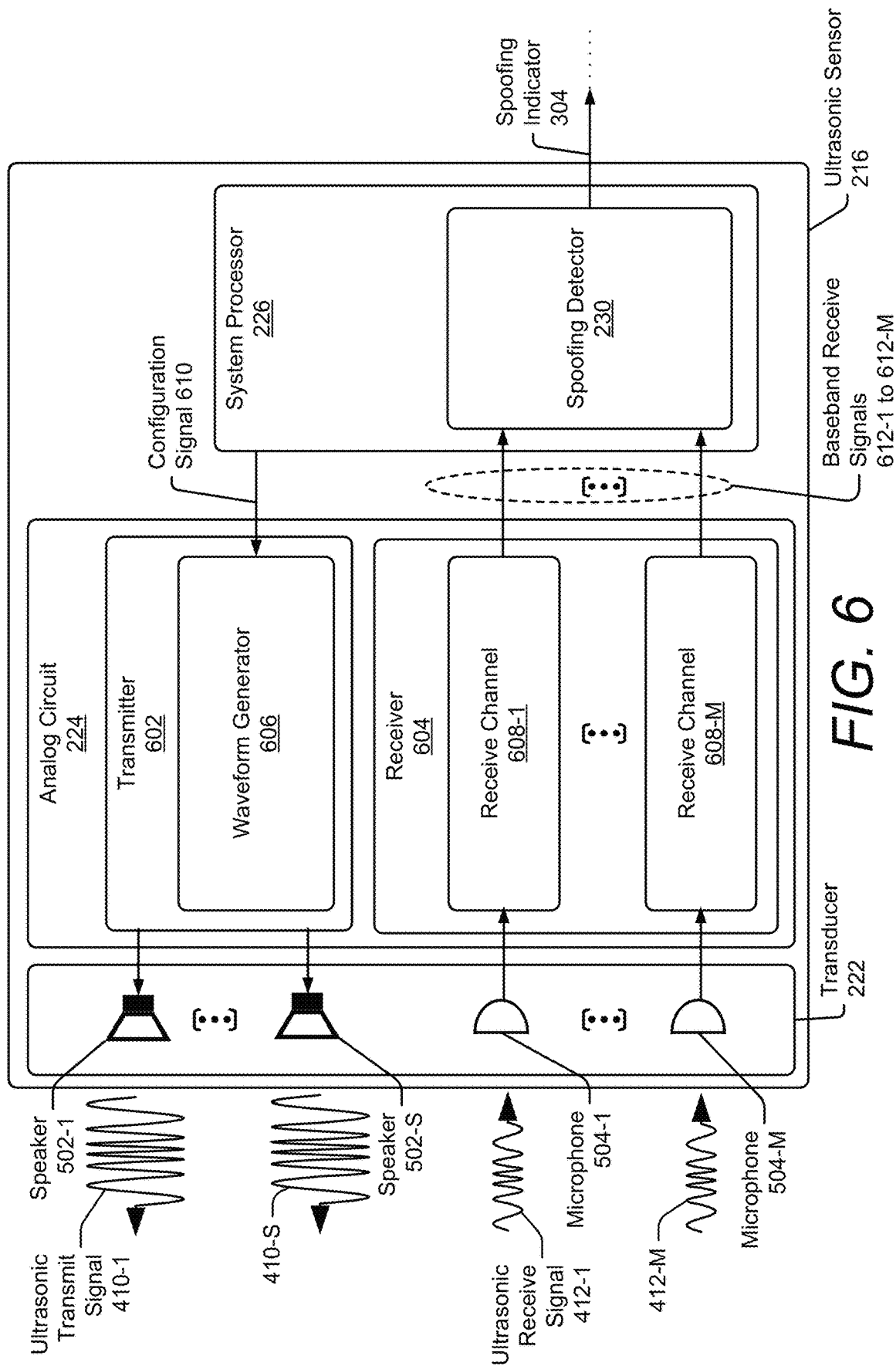
FIG. 6 illustrates an example implementation of an ultrasonic sensor for face-authentication anti-spoofing.

FIG. 6 illustrates an example implementation of the ultrasonic sensor 216. In the depicted configuration, the ultrasonic sensor 216 includes the transducer 222, the analog circuit 224, and the system processor 226. The analog circuit 224 is coupled between the transducer 222 and the system processor 226. The analog circuit 224 includes a transmitter 602 and a receiver 604. The transmitter 602 includes a waveform generator 606 coupled to the system processor 226. Although not shown, the transmitter 602 can include one or more transmit channels. The receiver 604 includes multiple receive channels 608-1 to 608-M, where M represents a positive integer. The receive channels 608-1 to 608-M are coupled to the system processor 226.

The transducer 222 is implemented with a bistatic topology, which includes at least one speaker 502 and at least one microphone 504. In the depicted configuration, the transducer 222 includes multiple speakers 502-1 to 502-S and multiple microphones 504-1 to 504-M, where S represents a positive integer. The speakers 502-1 to 502-S are coupled to the transmitter 602, and the microphones 504-1 to 504-M are coupled to respective receive channels 608-1 to 608-M of the receiver 604.

Although the ultrasonic sensor 216 in FIG. 6 includes multiple speakers 502 and multiple microphones 504, other implementations of the ultrasonic sensor 216 can include a single speaker 502 and a single microphone 504, a single speaker 502 and multiple microphones 504, multiple speakers 502 and a single microphone 504, or other types of transducers capable of transmitting and/or receiving. In some implementations, the speakers 502-1 to 502-S and microphones 504-1 to 504-M can also operate with audible signals. For example, the user device 102 can play music through the speakers 502-1 to 502-S and detect the user 106's voice using the microphones 504-1 to 504-M.

During transmission, the transmitter 602 passes electrical signals to the speakers 502-1 to 502-S, which emit ultrasonic transmit signals 410-1 to 410-S, respectively. In particular, the waveform generator 606 generates the electrical signals, which can have similar waveforms (e.g., similar amplitudes, phases, and frequencies) or different waveforms (e.g., different amplitudes, phases, and/or frequencies). In some implementations, the system processor 226 passes a configuration signal 610 to the waveform generator 606. The configuration signal 610 can specify characteristics of the waveform generation (e.g., a center frequency, a bandwidth, and/or a modulation type). Using the configuration signal 610, the system processor 226 can customize the ultrasonic transmit signals 410-1 to 410-S to support an active feature, such as face authentication anti-spoofing or presence detection. Although not explicitly shown, the waveform generator 606 can also communicate the electrical signals to the system processor 226 or the receiver 604 for demodulation. The ultrasonic transmit signals 410-1 to 410-S may or may not be reflected by an object (e.g., the human face 408 or the presentation-attack instrument 404).

During reception, the microphones 504-1 to 504-M receive ultrasonic receive signals 412-1 to 412-M, respectively. Relative phase differences, frequencies, and amplitudes between the ultrasonic receive signals 412-1 to 412-M and the ultrasonic transmit signals 410-1 to 410-S may vary due to the interaction of the ultrasonic transmit signals 410-1 to 410-S with a nearby object (e.g., the human face 408 or the presentation-attack instrument 404) or the external environment (e.g., path loss and noise sources). The ultrasonic receive signals 412-1 to 412-M represent versions of an ultrasonic transmit signal 410 that propagates from one of the speakers 502-1 to 502-S to one of the microphones 504-1 to 504-M. The receive channels 608-1 to 608-M process the ultrasonic receive signals 412-1 to 412-M and generate baseband receive signals 612-1 to 612-M.

The system processor 226 includes the spoofing detector 230. The system processor 226 and/or the spoofing detector 230 can perform functions such as range compression, baseband processing, demodulation, and/or filtering. In general, the spoofing detector 230 accepts the baseband receive signals 612-1 to 612-M from the receive channels 608-1 and 608-M and analyzes these signals to generate the spoofing indicator 304, as further described with respect to FIG. 7.

Figure 7:
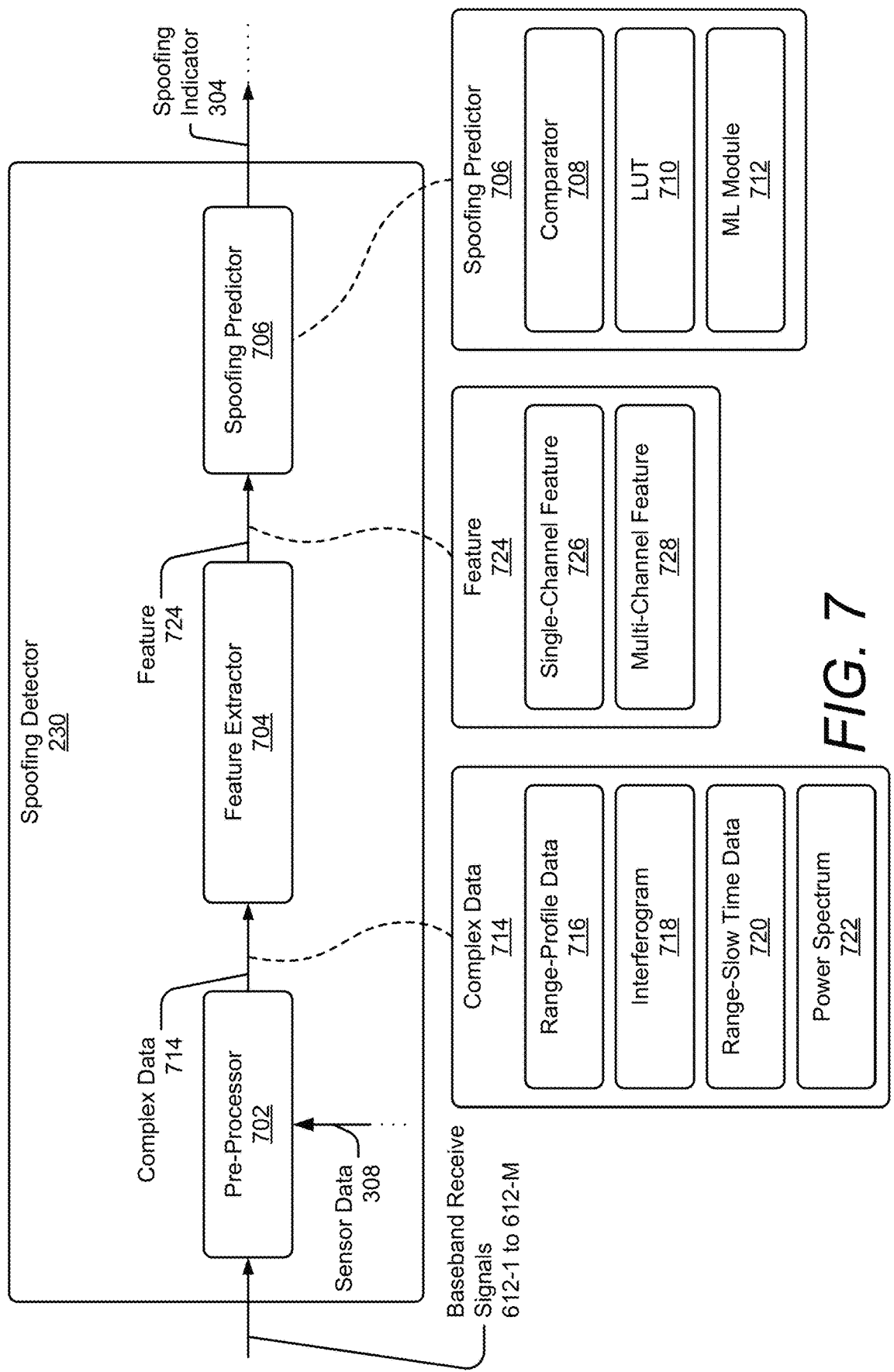
FIG. 7 illustrates an example scheme implemented by an ultrasonic sensor for face authentication anti-spoofing.

FIG. 7 illustrates an example scheme implemented by the ultrasonic sensor 216 for face authentication anti-spoofing. In the depicted configuration, the spoofing detector 230 includes a pre-processor 702, a feature-extractor 704, and a spoofing predictor 706. The pre-processor 702 operates on the baseband receive signals 612-1 to 612-M to provide data in a format that is useable by the feature extractor 704. The pre-processor 702 can perform filtering, Fourier transforms (e.g., fast-Fourier transforms), range compression, normalization, and/or clutter cancellation. In some implementations, the filtering and/or normalization is based on the sensor data 308, as further described below.

The feature extractor 704 can perform a variety of functions in order to extract information useful for distinguishing between the presentation-attack instrument 404 and the human face 408. In some cases, the feature extractor 704 also utilizes location information (e.g., range and/or angle) of the object to extract the appropriate information. The location information can be determined by the ultrasonic sensor 216 using ultrasonic techniques, provided by the sensor 218 via the sensor data 308, or some combination thereof. Operations of the feature extractor 704 can vary depending on the type of input data the ultrasonic sensor 216 operates on and whether the input data is associated with a single receive channel 608 or multiple receive channels 608-1 to 608-M. Example feature extractors 704 are further described with respect to FIGS. 8-1, 9-1, 11-1, and 12-1.

The spoofing predictor 706 determines whether or not a presentation attack 114 occurred based on information provided by the feature extractor 704. The spoofing predictor 706 can include a comparator 708, a look-up table 710 (LUT 710), and/or a machine-learned module 712.

During operation, the pre-processor 702 accepts the baseband receive signals 612-1 to 612-M and generates complex data 714. The complex data 714 includes amplitude and phase information (e.g., real and imaginary numbers). Example types of complex data 714 include range-profile data 716 (e.g., data representing an intensity map), an interferogram 718, range-slow time data 720 (e.g., data representing a range-Doppler map), and/or a power spectrum 722.

The range-profile data 716 includes amplitude (e.g., intensity) and phase information across a range dimension and a time dimension (e.g., a fast-time dimension). The range dimension can be represented by a set of range bins (e.g., range cells). The time dimension can be represented by a set of time intervals (e.g., chirp intervals or pulse intervals). The interferogram 718 can include coherence and phase information across range and time dimensions. The range-slow time data 720 includes amplitude and phase information across the range dimension and a Doppler (or slow-time) dimension. The Doppler dimension can be represented by a set of Doppler bins. The power spectra 722 includes power information across a frequency dimension and a time dimension.

In some aspects, the pre-processor 702 can use the sensor data 308 provided by the sensor 218 to calibrate the complex data 714 and/or filter the complex data 714 according to a region-of-interest. As an example, the pre-processor 702 can calibrate amplitude-based information for the range-profile data 716, the interferogram 718, the range-slow time data 720, and/or the power spectra 722 based on a measured location of an object as provided by the sensor data 308. In particular, the pre-processor 702 can normalize the amplitude information based on a measured distance and/or angle to the object, which is presented for face authentication 104.

Additionally or alternatively, the pre-processor 702 can provide a subset of the complex data 714 that is associated with a region-of-interest identified by the distance and/or angle measurement provided by the sensor data 308. The region-of-interest can include the measured location of the object. In some cases, the region-of-interest is centered around the measured location of the object or surrounds at least a portion of the measured location. A size of the region-of-interest can be based on a general size of the human face 408. Additionally or alternatively, the region-of-interest can be based on a region associated with face authentication (e.g., the region-of-interest can include distances up to 70 cm).

The feature extractor 704 extracts one or more features 724 from the complex data 714. Example features 724 can include a single-channel feature 726 and/or a multi-channel feature 728. The feature extractor 704 determines the single-channel feature 726 based on one of the baseband receive signals 612-1 to 612-M. In this way, the single-channel feature 726 is associated with one of the receive channels 608-1 to 608-M. Additionally or alternatively, the feature extractor 704 determines the multi-channel feature 728 using at least two of the baseband receive signals 612-1 to 612-M. The multi-channel feature 728 is associated with two or more of the receive channels 608-1 to 608-M.

In some aspects, the feature extractor 704 can determine the feature 724 that is associated with the object based on a measured location of the object. For example, the feature extractor 704 can identify a region that encompasses the measured location of the object, which can be determined by analyzing the complex data 714 using ultrasonic techniques or based on the sensor data 308 provided by the sensor 218. Within this region, the feature extractor 704 evaluates the complex data 714 to generate the feature 724. In this way, the ultrasonic sensor 216 can ensure that the feature 724 is related to the object that is presented for face authentication and not another object that exists within the environment.

The spoofing predictor 706 analyzes the feature 724 extracted by the feature extractor 704 to detect the presentation attack 114 and generate the spoofing indicator 304. In some examples, the spoofing predictor 706 uses the comparator 708 to compare the feature 724 to a threshold. The threshold is set to enable the ultrasonic sensor 216 to distinguish between the presentation-attack instrument 404 and the human face 408, which may or may not be wearing an accessory 110. In other implementations, the spoofing predictor 706 references a look-up table 710 to determine whether the feature 724 corresponds to the presentation-attack instrument 404 or the human face 408. In yet other implementations, the spoofing predictor 706 uses the machine-learned module 712 to classify the feature 724 as being associated with the presentation-attack instrument 404 or the human face 408.

The spoofing detector 230 generates the spoofing indicator 304, which controls whether the face-authentication system 202 can successfully authenticate the user 106. The spoofing indicator 304 can include one or more elements that indicate whether the object presented for face authentication 104 correlates with a presentation-attack instrument 404 or a human face 408. An example implementation of the spoofing detector 230 is further described with respect to FIG. 8-1.

Single-Channel-Based Face Authentication Anti-Spoofing

Figures 1, 8:
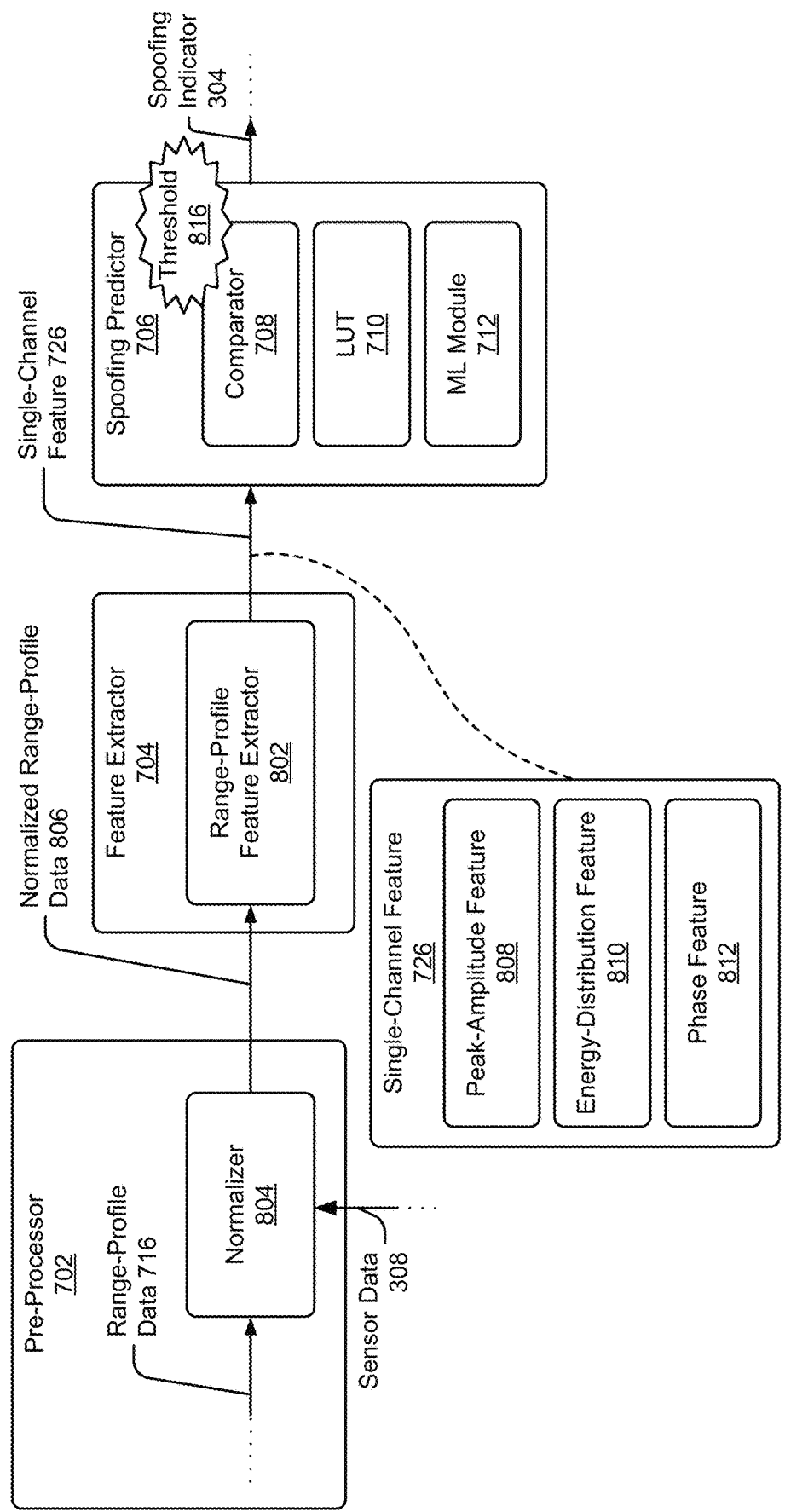
Figures 2, 8:
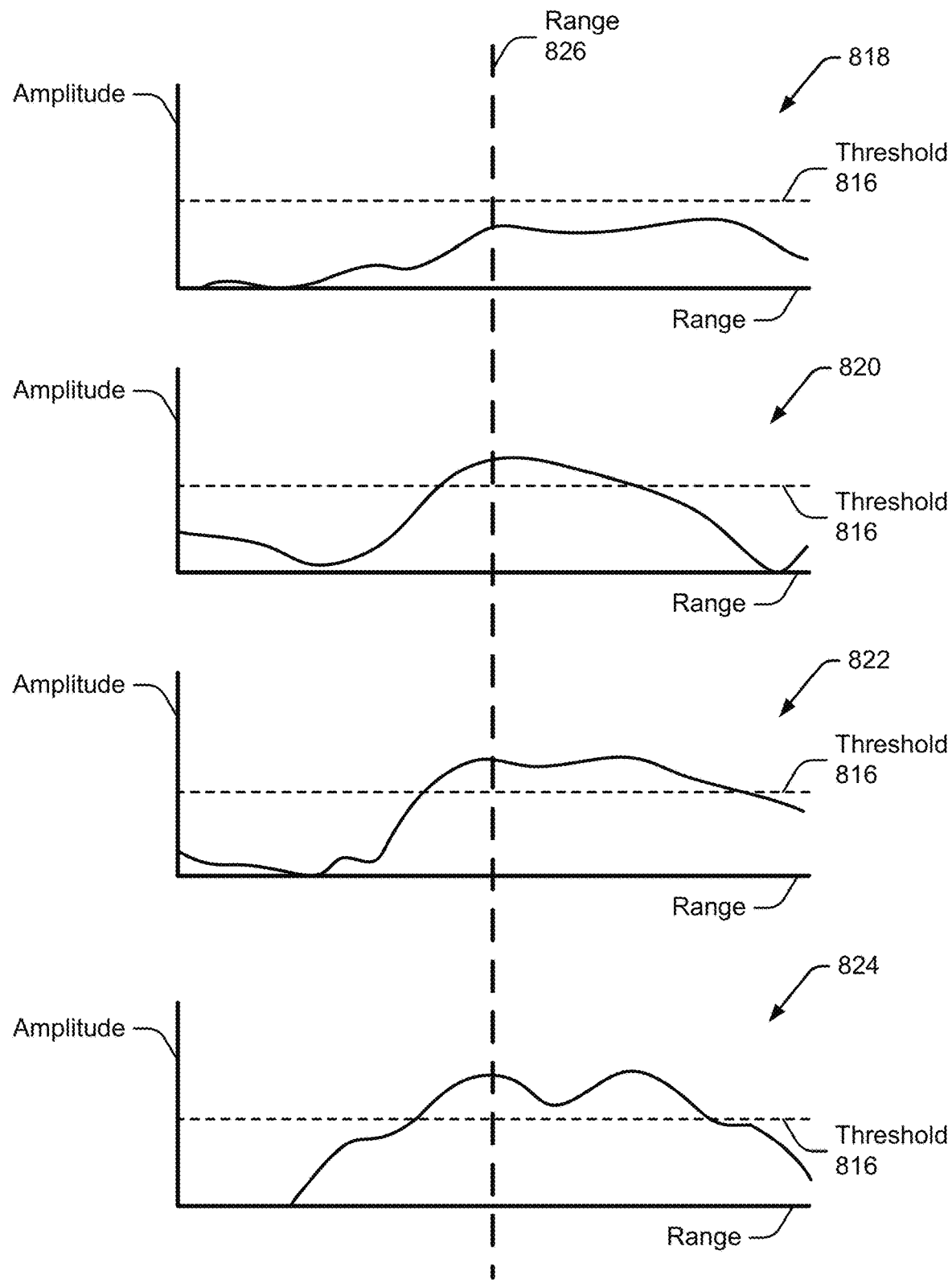

FIG. 8-1 illustrates an example scheme implemented by the ultrasonic sensor 216 to generate a single-channel feature 726 for face authentication anti-spoofing. In the depicted configuration, the feature extractor 704 includes a range-profile feature extractor 802. Optionally, the pre-processor 702 can include a normalizer 804. The spoofing predictor 706 includes the comparator 708, the look-up table 710, and/or the machine-learned module 712.

During operation, the pre-processor 702 generates the range-profile data 716. The range-profile data 716 can be generated by performing a Fourier transform on one of the baseband receive signals 612-1 to 612-M. For implementations that include the normalizer 804, the pre-processor 702 can normalize the amplitude information within the range-profile data 716 based on the sensor data 308, which can include a measured location (e.g., a measured distance and/or angle) of an object that is presented for face authentication 104. Additionally or alternatively, the normalizer 804 can adjust the amplitude information within the range-profile data 716 based on a measured cross-coupling factor or a constant-false-alarm-rate (CFAR) signal-to-noise ratio (SNR). The pre-processor 702 provides normalized range-profile data 806 to the feature extractor 704. For implementations that do not include the normalizer 804, the pre-processor 702 can alternatively provide the range-profile data 716 to the feature extractor 704. Also, these techniques can be similarly applied using range-slow time data 720.

The range-profile feature extractor 802 generates a single-channel feature 726 based on the range-profile data 716 or the normalized range-profile data 806. Example single-channel features 726 can include a peak-amplitude feature 808, an energy-distribution feature 810, and/or a phase feature 812. The peak-amplitude feature 808 identifies a peak amplitude within the range-profile data 716 or the normalized range-profile data 806. The energy-distribution feature 810 identifies a peak energy or a shape of the distributed energy over the range dimension within the range-profile data 716 or the normalized range-profile data 806. The phase feature 812 identifies phase information within the range-profile data 716 or the normalized range-profile data 806.

In some aspects, the range-profile feature extractor 802 can determine the single-channel feature 726 that is associated with the object based on a measured location of the object. For example, the range-profile feature extractor 802 can identify a region that encompasses the measured location of the object. Within this region, the range-profile feature extractor 802 evaluates the amplitude and/or phase information to generate the peak-amplitude feature 808, the energy-distribution feature 810, and/or the phase feature 812. In this way, the ultrasonic sensor 216 can ensure that the single-channel feature 726 is related to the object that is presented for face authentication and not another object that exists within the environment.

The spoofing predictor 706 detects whether or not the presentation attack 114 occurred during face authentication 104 and generates the spoofing indicator 304 to communicate this information to the face-authentication system 202. Consider an example in which the range-profile feature extractor 802 provides the peak-amplitude feature 808 to the spoofing predictor 706. In this case, the spoofing predictor 706 can use the comparator 708 to compare a peak amplitude identified by the peak-amplitude feature 808 to a threshold 816. If the peak amplitude is greater than the threshold 816, the spoofing predictor 706 detects the presentation attack 114. Alternatively, if the peak amplitude is less than the threshold 816, the spoofing predictor 706 does not detect the presentation attack 114 (e.g., detects the human face 408). This example is further described with respect to FIG. 8-2.

FIG. 8-2 illustrates example range-profile data 716 associated with face authentication anti-spoofing. Graphs 818, 820, 822, and 824 illustrate range-profile data 716 for different types of objects, which are presented during face authentication 104. In particular, the graphs 818, 820, 822, and 824 depict amplitude information for one of the ultrasonic receive signals 412-1 to 412-M across the range dimension.

The graph 818 represents range-profile data 716 collected when the object is the human face 408. The graphs 820 and 822 represents range-profile data 716 collected when the object is a piece of paper and a piece of cardboard, respectively. The piece of paper and the piece of cardboard can include the photograph 118 of the user 106, as shown in the environment 100-3. The graph 824 represents range-profile data 716 collected when the object is the device 120 of environment 100-4. In this case, the device 120 can display the digital picture 124 of the user 106.

When the object is the human face 408, the amplitude of the range-profile data 716 is below the threshold 816, as shown in the graph 818. However, when the object is the presentation-attack instrument 404, the amplitude of the range-profile data 716 is above the threshold 816 for at least some range intervals, as shown in graphs 820, 822, and 824. In this way, the ultrasonic sensor 216 can distinguish between the human face 408 and the presentation-attack instrument 404.

In some implementations, the ultrasonic sensor 216 can identify a range 826 associated with the detected object. The ultrasonic sensor 216 can determine the range 826 through ultrasonic sensing, based on the sensor data 308, or some combination thereof. At the identified range 826, the ultrasonic sensor 216 can compare the amplitude of the range-profile data 716 to the threshold 816 to detect the presentation attack 114.

Similar detection methods can be applied to the other single-channel features 726. For example, the spoofing predictor 706 can use the comparator 708 to determine whether the extracted energy-distribution feature 810 represents the human face 408 or the presentation-attack instrument 404. In particular, if the amount of energy at the range 826 is less than a threshold 816, the ultrasonic sensor 216 does not detect the presentation attack 114. However, if the amount of energy is greater than the threshold 816, the ultrasonic sensor 216 detects the presentation attack 114. Additionally or alternatively, the spoofing predictor 706 can use the look-up table 710 or the machine-learned module 712 to determine whether an overall shape of the energy-distribution feature 810 across the range dimension corresponds to the human face 408 or the presentation-attack instrument 404. Similar techniques can be used to analyze the phase feature 812 with the look-up table 710 or the machine-learned module 712.

Although described with respect to a single channel, the operations described in FIG. 8-1 can be performed, in series or in parallel, for more than one, and optionally for each, available receive channel 608-1 to 608-M. In some implementations, the feature extractor 704 provides multiple features to the spoofing predictor 706, such as some combination of the peak-amplitude feature 808, the energy-distribution feature 810, and/or the phase feature 812. By analyzing more than one single-channel feature 726, the spoofing predictor 706 can improve its ability to detect the presentation attack 114. Another face authentication anti-spoofing technique is further described with respect to FIG. 9-1.

Figures 1, 9:
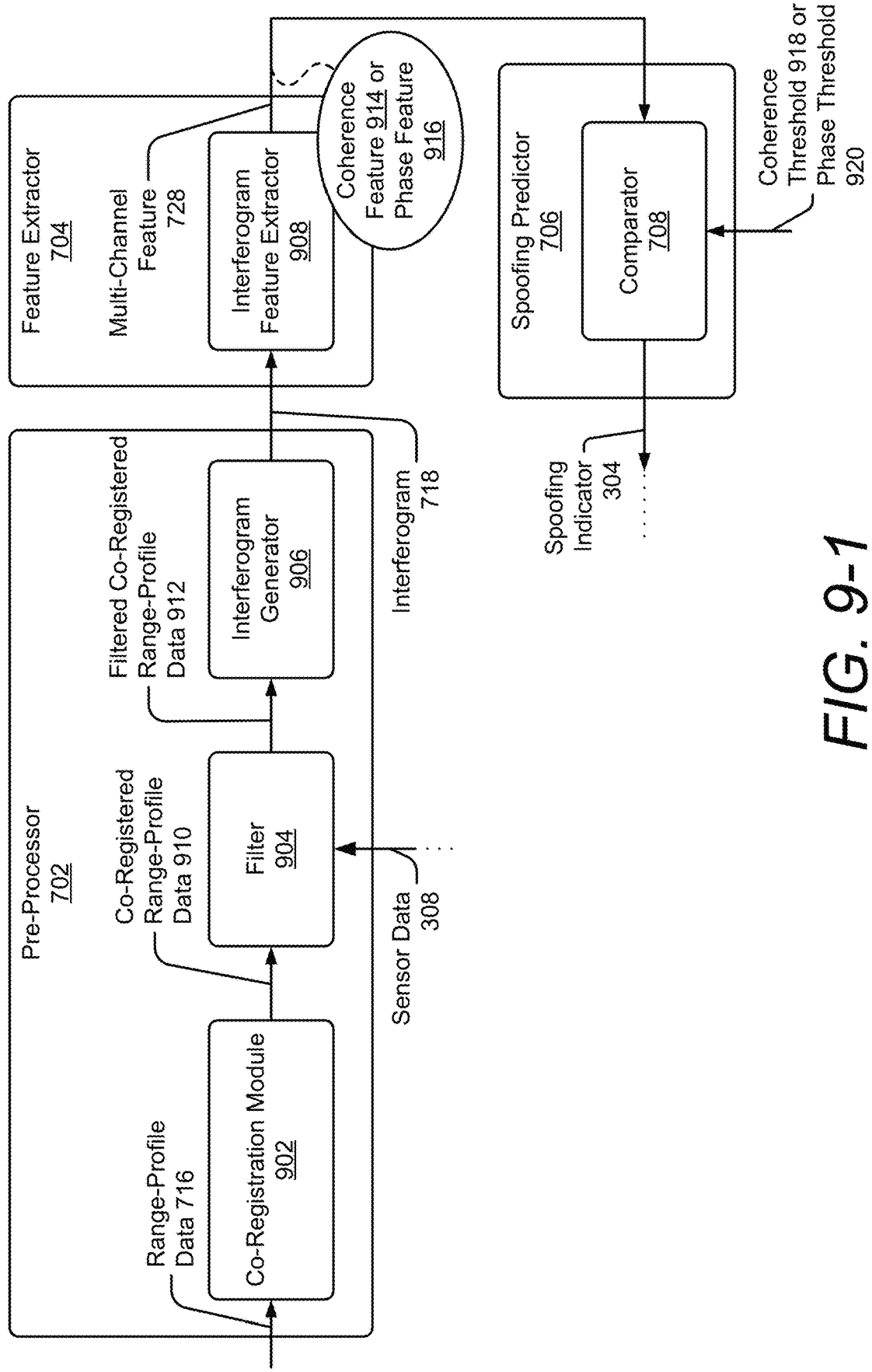
Figures 2, 9:
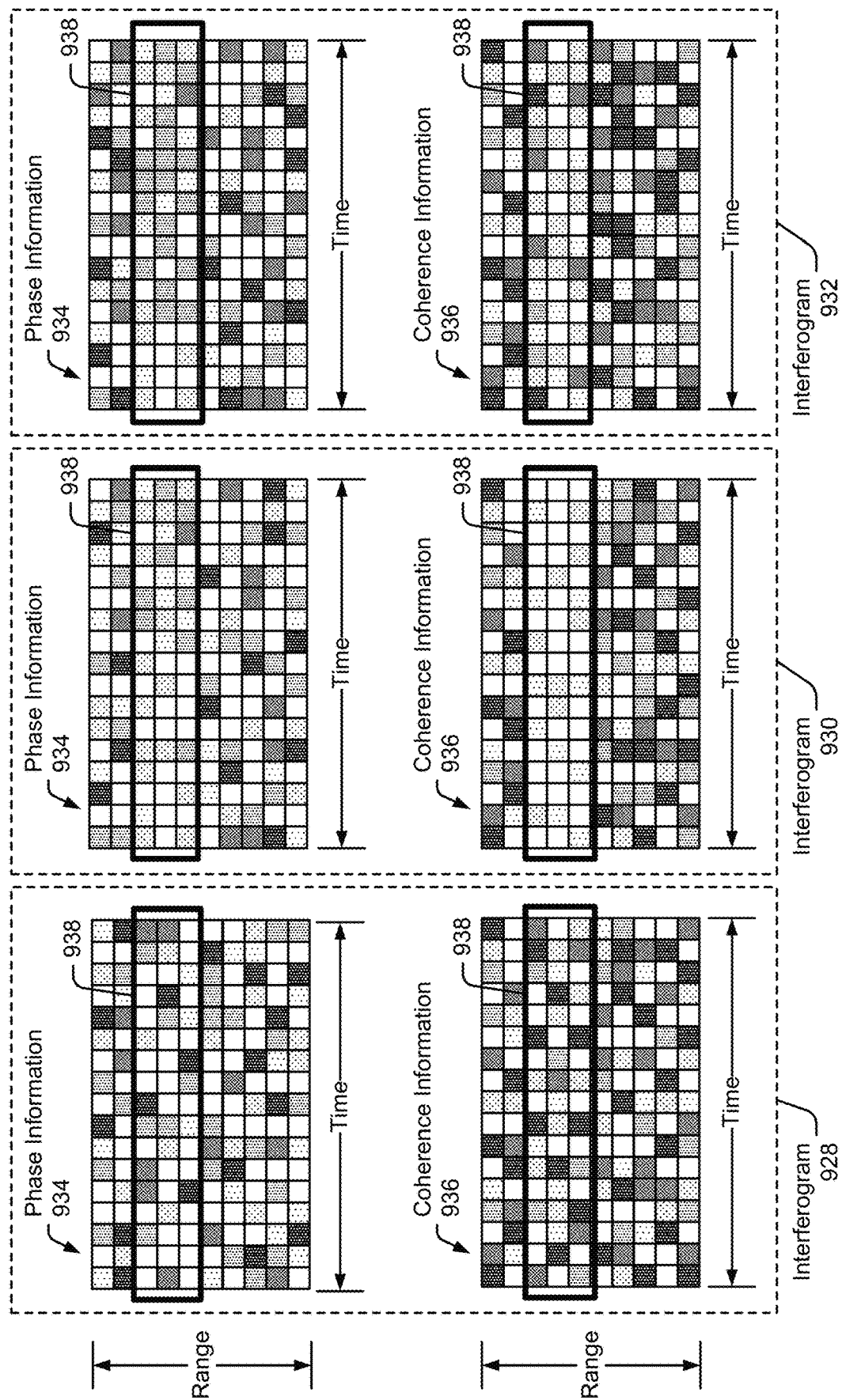

Multi-Channel-Based Face Authentication Anti-Spoofing Using Interferometry-Based Coherence FIG. 9-1 illustrates an example scheme implemented by the ultrasonic sensor 216 to generate a multi-channel feature 728 for face authentication anti-spoofing. In this example, the ultrasonic sensor 216 uses interferometry to evaluate an amount of similarity between reflections observed by two or more transducers 222, such as the microphones 504-1 and 504-2. Due to the planar-like or uniform structure of the presentation-attack instrument 404, the ultrasonic receive signals 412-1 to 412-M produced by the presentation-attack instrument 404 and received by the microphones 504-1 to 504-M can have relatively similar characteristics. In other words, the amplitudes and phases of the ultrasonic receive signals 412-1 to 412-M can be relatively similar over a given time interval. The contoured and non-uniform structure of the human face 408, however, can cause the ultrasonic receive signals 412-1 to 412-M produced by the human face 408 and received by the microphones 504-1 to 504-M to be substantially different. In other words, the amplitudes and phases of the ultrasonic receive signals 412-1 to 412-M can vary significantly over a similar time interval. By using interferometry, the ultrasonic sensor 216 can distinguish between the presentation-attack instrument 404 and the human face 408 for face authentication anti-spoofing.

In the depicted configuration, the pre-processor 702 includes a co-registration module 902, a filter 904, and an interferogram generator 906. Although not shown, the pre-processor 702 can also include the normalizer 804 of FIG. 8-1. The feature extractor 704 includes an interferogram feature extractor 908. The spoofing predictor 706 includes the comparator 708. Although not shown, other implementations of the spoofing predictor 706 can use the look-up table 710 or the machine-learned module 712.

Due to the different positions of the microphones 504-1 to 504-M, an object that is presented for face authentication 104 can be positioned at different ranges within the range-profile data 716 associated with the corresponding receive channels 608-1 to 608-M. To address this, the co-registration module 902 aligns the range-profile data 716 associated with different receive channels 608-1 to 608-M across the range dimension. A variety of different types of co-registration modules 902 are further described with respect to FIGS. 10-1 to 10-4.

The filter 904 filters data provided by the co-registration module 902 based on a region-of-interest, which can be identified based on the sensor data 308, the range-profile data 716, or some combination thereof. The region-of-interest can include a spatial region associated with face authentication or a region surrounding a measured location of the object. By filtering the data, the filter 904 can improve the computational speed of later processes and/or remove data that is not associated with the object of interest.

The interferogram generator 906 generates the interferogram 718. In particular, the interferogram generator 906 performs complex coherence on the range-profile data 716 (or range-slow time data 720) associated with two of the receive channels 608-1 to 608-M to generate the interferogram 718.

During operation, the co-registration module 902 compensates for differences in locations of the microphones 504-1 to 504-M by generating co-registered range-profile data 910 based on the range-profile data 716 associated with different receive channels 608-1 to 608-M. Within the co-registered range-profile data 910, the range associated with the object is similar across the different receive channels 608-1 to 608-M. The filter 904 filters the co-registered range-profile data 910 to generate filtered co-registered range-profile data 912.

Prior to the interferogram generator 906, the range-profile data 716, the co-registered range-profile data 910, and the filtered co-registered range-profile data 912 has unique data associated with each of the receive channels 608-1 to 608-M. The interferogram generator 906 operates on the filtered co-registered range-profile data 912 across pairs of the receive channels 608-1 to 608-M to generate at least one interferogram 718. The interferogram 718 includes coherence information and phase information. The coherence information represents an amount of similarity (e.g., coherence or correlation) between the filtered co-registered range-profile data 912 of two of the receive channels 608-1 to 608-M.

The interferogram feature extractor 908 generates the multi-channel feature 728 based on the interferogram 718. Example multi-channel features 728 include a coherence feature 914 and a phase feature 916. The coherence feature 914 represents an amount of coherence over time for a subset of ranges. Sometimes, the coherence feature 914 represents an average coherence.

A coherence value of zero means that the filtered co-registered range-profile data 912 is not correlated across the pair of receive channels 608-1 to 608-M. In contrast, a coherence value of one means that the filtered co-registered range-profile data 912 is strongly correlated across the pair of receive channels 608-1 to 608-M. A coherence value between zero and one means that the filtered co-registered range-profile data 912 is partially or weakly correlated across the pair of receive channels 608-1 to 608-M.

The phase feature 916 represents an amount of variation in the phase information of the interferogram 718 over time for the subset of ranges. Example phase features 916 can represent an average phase difference across a region of the interferogram 718, a maximum phase difference across the region of the interferogram 718, and/or a standard deviation across the region of the interferogram 718.

In some aspects, the interferogram feature extractor 908 can determine the coherence feature 914 and/or the phase feature 916 that is associated with the object based on a measured location of the object. For example, interferogram feature extractor 908 can identify a region that encompasses the measured location of the object. Within this region, the interferogram feature extractor 908 evaluates the filtered co-registered range-profile data 912 to extract the coherence feature 914 and/or the phase feature 916. In this way, the ultrasonic sensor 216 can ensure that the multi-channel feature 728 is related to the object that is presented for face authentication and not another object that exists within the environment. Additionally or alternatively, the filter 904 can filter the co-registered range-profile data 910 based on the measured location of the object to cause the later-generated multi-channel feature 728 to be associated with the object of interest.

The spoofing predictor 706 uses the comparator 708 to compare the coherence feature 914 and/or the phase feature 916 to a corresponding threshold. For example, the spoofing predictor 706 compares the coherence feature 914 to a coherence threshold 918. In an example, the coherence threshold 918 is approximately equal to 0.5. If the coherence feature 914 (e.g., the amount of coherence observed for a subset of ranges) is less than the coherence threshold 918 and greater than zero, the spoofing predictor 706 determines that the object presented for face authentication 104 corresponds to the human face 408. Alternatively, if the coherence feature 914 is greater than the coherence threshold 918 and less than one, the spoofing predictor 706 determines that the object presented for face authentication 104 corresponds to the presentation-attack instrument 404.

As another example, the spoofing predictor 706 compares the phase feature 916 to the phase threshold 920. If the phase feature 916 indicates that the phase information within the interferogram 718 is greater than the phase threshold 920, the spoofing predictor 706 determines that the object presented for face authentication 104 corresponds to the human face 408. Alternatively, if the phase feature 916 is less than the phase threshold 920, the spoofing predictor 706 determines that the object presented for face authentication 104 corresponds to the presentation-attack instrument 404.

Some implementations of the spoofing predictor 706 can analyze both the coherence feature 914 and the phase feature 916 to determine whether the presentation attack 114 occurred. The spoofing predictor 706 can additionally or alternatively use other techniques, such as those that employ the look-up table 710 or the machine-learned module 712 to analyze the interferogram 718 and determine whether the presentation attack 114 occurred.

The operations described in FIG. 9-1 can be performed for range-profile data 716 provided by a pair of receive channels 608-1 to 608-M. If the ultrasonic sensor 216 uses more than two receive channels 608-1 to 608-M, these operations can be performed in series or parallel for multiple pairs of the receive channels 608-1 to 608-M. Consider an example in which the ultrasonic sensor 216 uses four receive channels (e.g., M equals four). In this case, the pre-processor 702 can generate up to six interferograms 718, which can be processed by the feature extractor 704 and the spoofing predictor 706 to detect the presentation attack 114. If multiple interferograms 718 are available, the spoofing predictor 706 can detect the presentation attack 114 responsive to the multi-channel feature 728 associated with one of the multiple interferograms 718 indicating the presence of the presentation-attack instrument 404. To decrease a probability of the ultrasonic sensor 216 incorrectly determining that a human face 408 presented for face authentication 104 represents the presentation-attack instrument 404, the spoofing predictor 706 can detect the presentation attack 114 responsive to a predetermined quantity of the interferograms 718 indicating the presence of the presentation-attack instrument 404 (e.g., such as three or more of the multiple interferograms 718). Example phase information and coherence information provided by the interferogram 718 is further described with respect to FIG. 9-2.

FIG. 9-2 illustrates example interferograms 928 to 932 associated with face authentication anti-spoofing. The interferogram 928 represents data collected when the object is the human face 408. The interferograms 930 and 932 represent data collected when the object is the device 120 or a piece of paper, respectively. The piece of paper can include the photograph 118 of the user 106, as shown in the environment 100-3.

Each of the interferograms 928 to 932 include phase information 934 and coherence information 936. Different shades of the phase information 934 represents different phase angles. Different shades of the coherence information 936 represent different coherence amounts. Lighter shades represent higher amounts of coherence, and darker shades represent lower amounts of coherence. Cells of the interferograms 928 to 932 associated with a region-of-interest 938 are identified in FIG. 9-2. The region-of-interest 938 is based on a measured distance between the object presented for face authentication 104 and the ultrasonic sensor 216.

Within the region-of-interest 938 of the interferogram 928, the phase information 934 includes significantly different phases. The coherence information 936 includes many cells that are weakly-correlated with coherence amounts that are less than 0.5. The coherence within the region-of-interest 938 can appear to be random. These characteristics can be due, at least in part, to the contoured and distributed nature of the human face 408.

Within the region-of-interest 938 of the interferograms 930 and 932, the phase information 934 depicts similar phases over time. The coherence information 936 within the region-of-interest 938 includes many cells that are strongly-correlated with coherence amounts that are greater than 0.5. These characteristics can be due, at least in part, to the planar and point-like nature of these presentation-attack instruments 404.

Comparing the region-of-interests 938 between interferograms 928 to 932, the phase information 934 within the interferograms 930 and 932 has less variation than the phase information 934 within the interferogram 928. Also, the coherence information 936 within the interferograms 930 and 932 has higher coherence amounts than the coherence information 936 within the interferogram 928. Additionally, there is less variation between the coherence information 936 within the interferograms 930 and 932 as compared to the coherence information 936 within the interferogram 928. In general, the multi-channel feature 728 extracted by the feature extractor 704 and the analysis performed by the spoofing predictor 706 enable the ultrasonic sensor 216 to detect these characteristics and appropriately identify an object as corresponding to the human face 408 or the presentation-attack instrument 404.

The interferometry techniques can also be applied to distinguish between the user 106 wearing an accessory 110 and the presentation-attack instrument 404. In some examples, the accessory 110 causes the coherence information 936 to have a few strongly-correlated cells. However, these strongly-correlated cells can exist across a broader region in range in comparison to the strongly-correlated cells of the presentation-attack instrument 404. By analyzing the phase information 934 and/or the coherence information 936 within the interferogram 928, the ultrasonic sensor 216 can recognize characteristics that distinguish the human face 408 from the presentation-attack instrument 404.

Figures 1, 10:
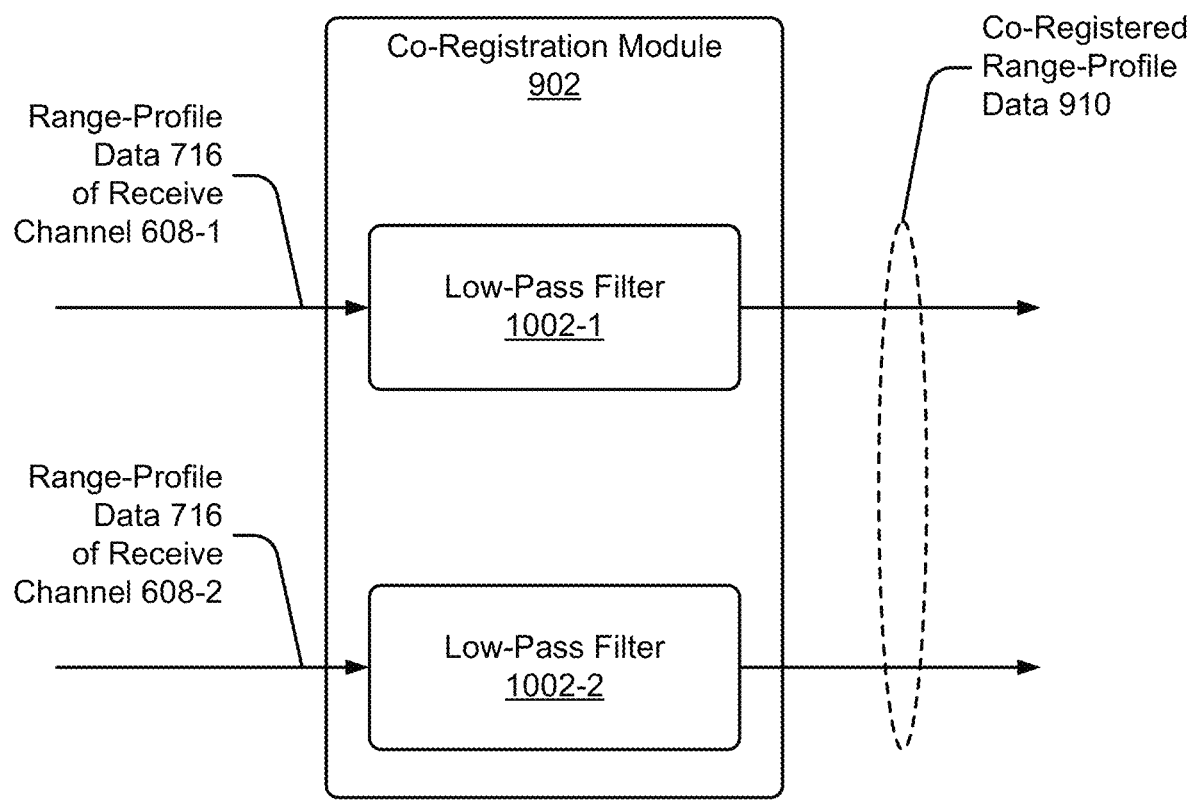
Figures 2, 10:
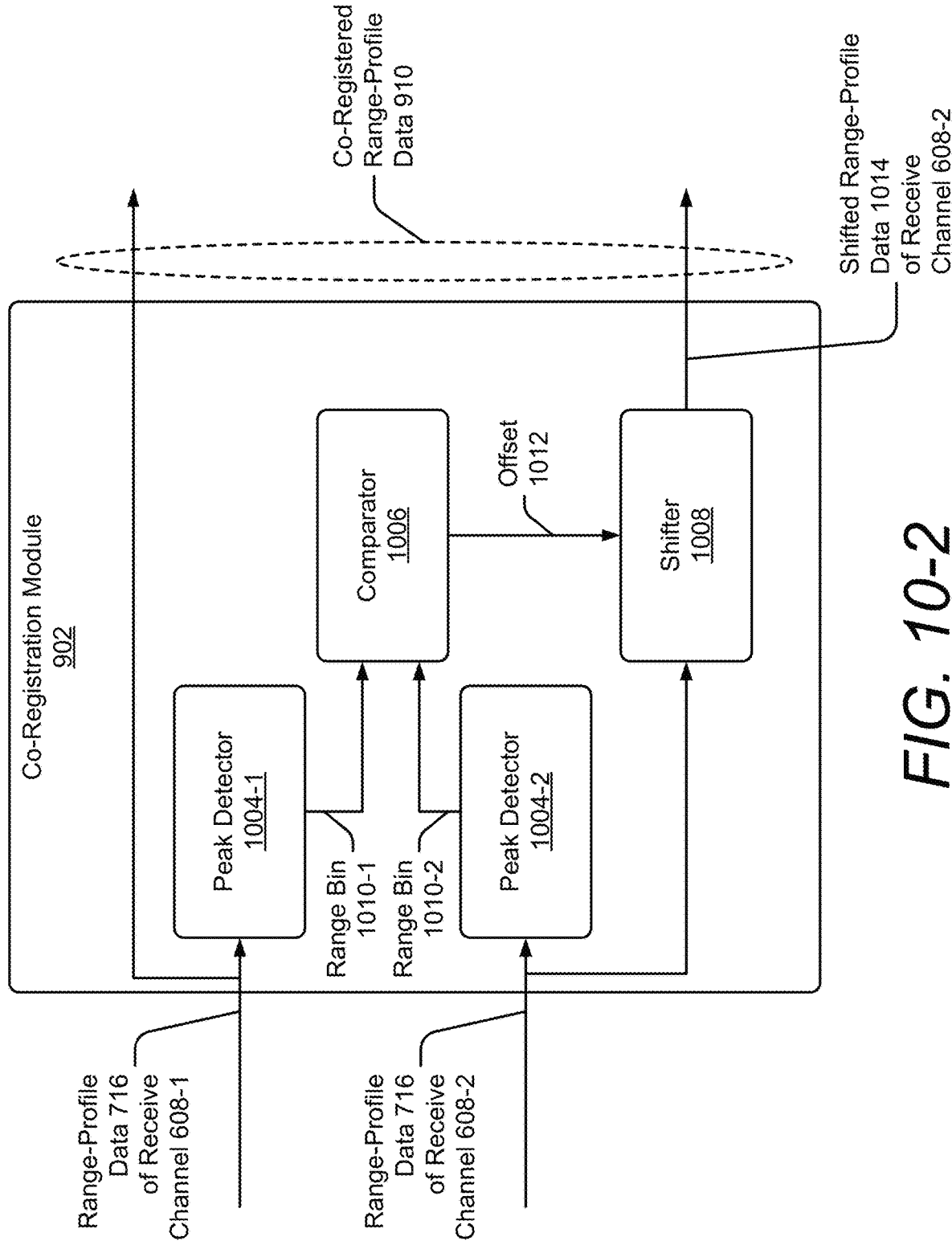
Figures 3, 10:
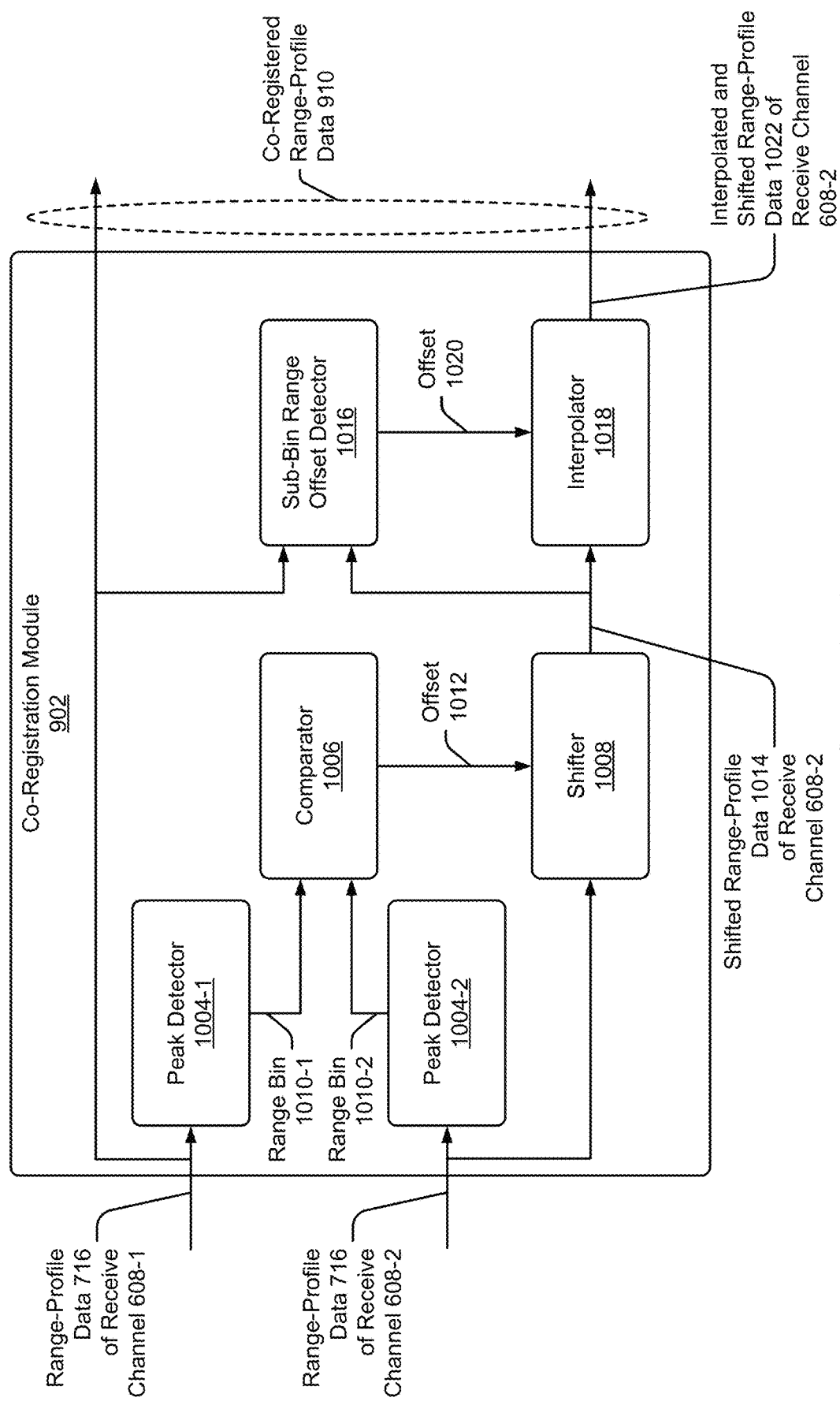
Figures 4, 10:
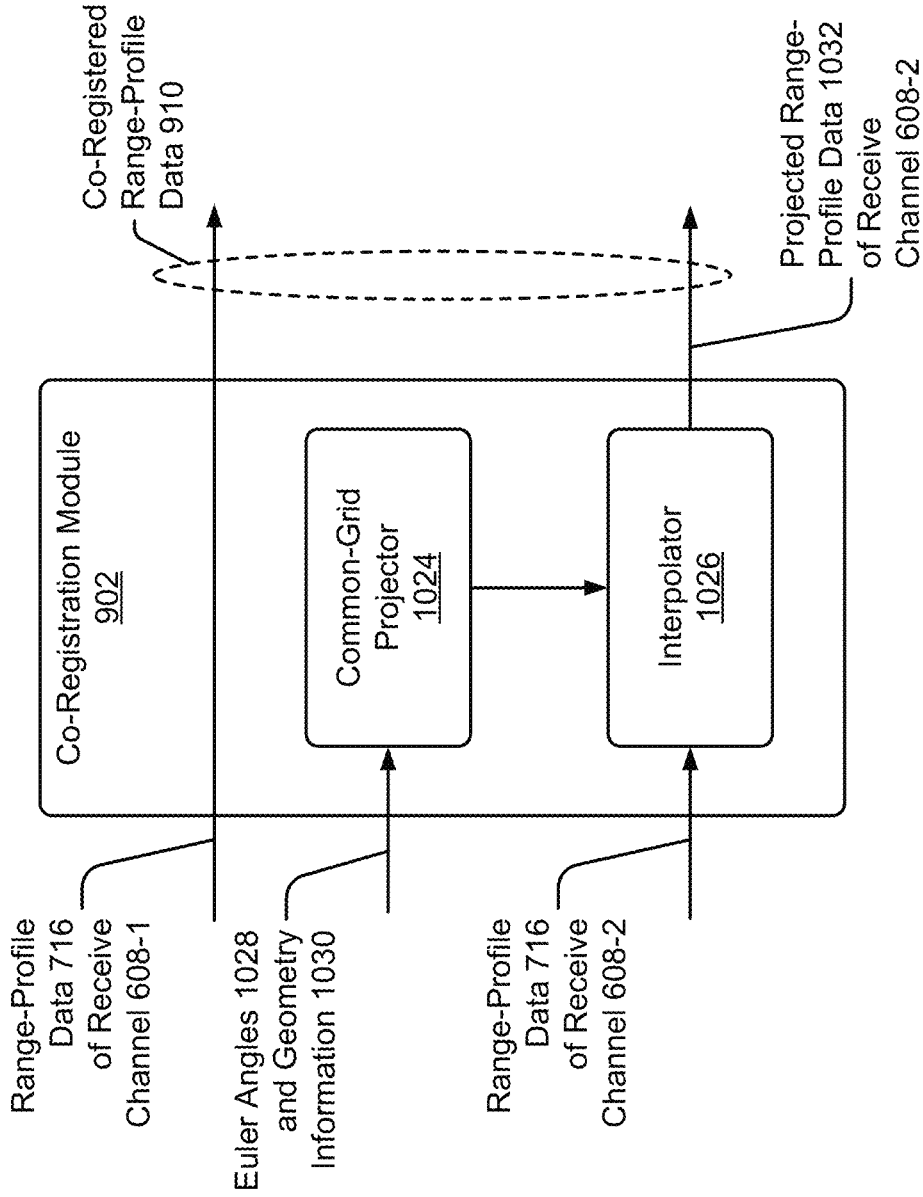

FIG. 10-1 illustrates an example scheme implemented by the ultrasonic sensor 216 for performing co-registration. In this case, the co-registration module 902 uses low-pass filtering to align the range-profile data 716 associated with the receive channels 608-1 and 608-2. The co-registration module 902 includes two low-pass filters 1002-1 and 1002-2. During operation, the low-pass filters 1002-1 and 1002-2 respectively filter the range-profile data 716 of the receive channels 608-1 and 608-2 across the range dimension to produce the co-registered range-profile data 910. By using the low-pass filters 1002-1 and 1002-2, the amplitude and/or phase information across adjacent range bins are combined to form a larger composite range bin. Although an object's range bin may differ between the range-profile data 716 of the receive channels 608-1 and 608-2, the object's range bin can be the same within the larger composite range bins of the co-registered range-profile data 910. In this way, the co-registration module 902 aligns the range-profile data 716 of the receive channels 608-1 and 608-2 in range.

Although implementing the co-registration module 902 with the low-pass filters 1002-1 and 1002-2 can be relatively simple, the resulting co-registered range-profile data 910 has a lower range resolution relative to the range-profile data 716. The low-pass filtering also provides localized co-registration. This means that the range bins associated with the object are substantially aligned while other range bins within the range-profile data 716 may not be aligned. To address the reduced range resolution, the co-registration module 902 can instead utilize techniques described with respect to FIG. 10-2.

FIG. 10-2 illustrates another example scheme implemented by the ultrasonic sensor 216 for performing co-registration. In this case, the co-registration module 902 evaluates maximum returns to align the range-profile data 716 associated with the receive channels 608-1 and 608-2. The co-registration module 902 includes two peak detectors 1004-1 and 1004-2, a comparator 1006, and a shifter 1008.

During operation, the peak detectors 1004-1 and 1004-2 respectively evaluate the range-profile data 716 associated with the receive channels 608-1 and 608-2 and identify range bins 1010-1 and 1010-2 associated with a peak amplitude. The comparator 1006 compares the range bins 1010-1 and 1010-2 to determine an amount that the range bin 1010-2 differs from the range bin 1010-1. This difference represents an offset 1012 (e.g., a range offset) between the range-profile data 716 of the receive channel 608-1 and the range-profile data 716 of the receive channel 608-2. The shifter 1008 shifts the range-profile data 716 of the receive channel 608-2 across the range dimension by an amount identified by the offset 1012. This results in the shifter 1008 producing shifted range-profile data 1014 of the receive channel 608-2. The range-profile data 716 of the receive channel 608-1 and the shifted range-profile data 1014 of the receive channel 608-2 are provided as the co-registered range-profile data 910.

Although slightly more complex than the co-registration module 902 of FIG. 10-1, the co-registration module 902 of FIG. 10-2 preserves the range resolution provided by the range-profile data 716. However, this technique still has the localized co-registration problem described above with respect to FIG. 10-1. To address the localized co-registration, the co-registration module 902 can instead utilize techniques described with respect to FIG. 10-3.

FIG. 10-3 illustrates an additional example scheme implemented by the ultrasonic sensor 216 for performing co-registration. In this case, the co-registration module 902 evaluates maximum returns to align the range-profile data 716 associated with the receive channels 608-1 and 608-2 and uses interpolation to provide global co-registration. The co-registration module 902 includes the two peak detectors 1004-1 and 1004-2, the comparator 1006, the shifter 1008, a sub-bin range offset detector 1016 (e.g., a sub-pixel range offset detector), and an interpolator 1018.

During operation, the peak detectors 1004-1 and 1004-2, the comparator 1006, and the shifter 1008 generate the shifted range-profile data 1014 of receive channel 608-2, as described above with respect to FIG. 10-2. The sub-bin range offset detector 1016 compares the range-profile data 716 of the receive channel 608-1 to the shifted range-profile data 1014 of the receive channel 608-2 to identify another offset 1020, which is smaller than a size of the range bins. The interpolator 1018 interpolates the shifted range-profile data 1014 based on the offset 1020 to generate interpolated and shifted range-profile data 1022 of the receive channel 608-2. The range-profile data 716 of the receive channel 608-1 and the interpolated and shifted range-profile data 1022 of the receive channel 608-2 are provided as the co-registered range-profile data 910.

By using interpolation, the co-registration module 902 of FIG. 10-3 can more accurately align the range-profile data 716 of the receive channels 608-1 and 608-2 relative to the co-registration modules 902 of FIGS. 10-1 and 10-2. However, this technique also increases the computational burden. Another accurate technique for co-registration is further described with respect to FIG. 10-4.

FIG. 10-4 illustrates yet another example scheme implemented by the ultrasonic sensor 216 for performing co-registration. In this case, the co-registration module 902 projects the range-profile data 716 to a common grid. The co-registration module 902 includes a common-grid projector 1024 and an interpolator 1026.

During operation, the common-grid projector 1024 accepts Euler angles 1028 and geometry information 1030. The Euler angles 1028 represent an orientation of the user device 102. The geometry information 1030 provides information about the relative position of the microphones 504-1 and 504-2 associated with the receive channels 608-1 and 608-2. The geometry information 1030 can specify distances and angles to the microphones 504-1 and 504-2 based on a reference point associated with the user device 102. By analyzing the Euler angles 1028 and the geometry information 1030, the common-grid projector 1024 can determine propagation path differences between the object and the microphones 504-1 and 504-2. In particular, the common-grid projector 1024 can determine the amplitude and/or phase differences that occur due to the different positions of the microphones 504-1 and 504-2 within the user device 102.

The interpolator 1026 uses information provided by the common-grid projector 1024 to re-sample or interpolate the range-profile data 716 of the receive channel 608-2. This resampling adjusts characteristics (e.g., amplitude and phase) of the range-profile data 716 to correspond with the common-grid. In some implementations, the common-grid is based on a position of the microphone 504-1. In this case, the range-profile data 716 of the receive channel 608-1 does not need to pass through the interpolator 1026 and can be provided as part of the co-registered range-profile data 910. The interpolator 1026 generates projected range-profile data 1032 of the receive channel 608-2, which can be provided as another part of the co-registered range-profile data 910.

Face Authentication Anti-Spoofing Using Skewness

Figures 1, 11:
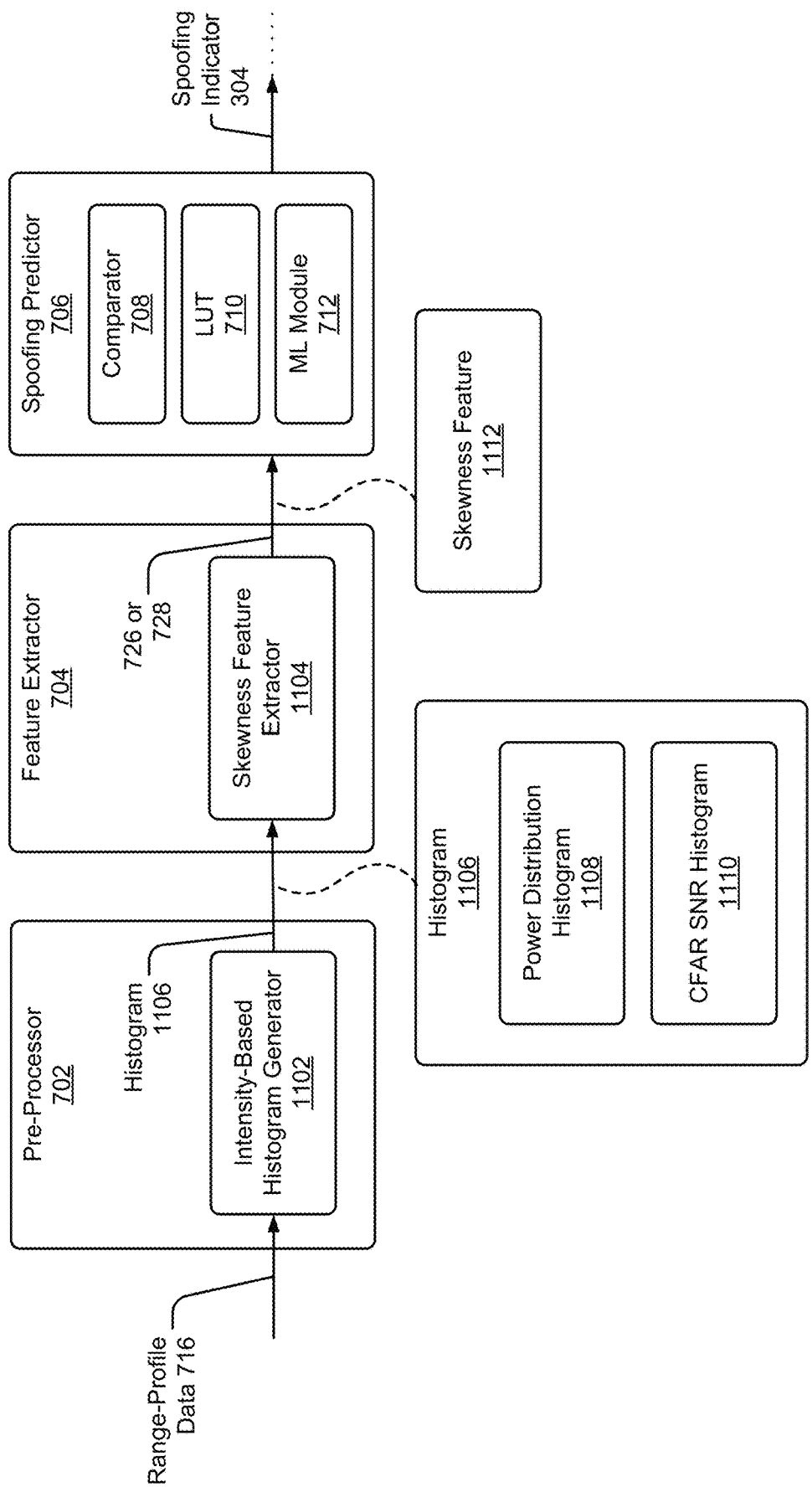
Figures 2, 11:
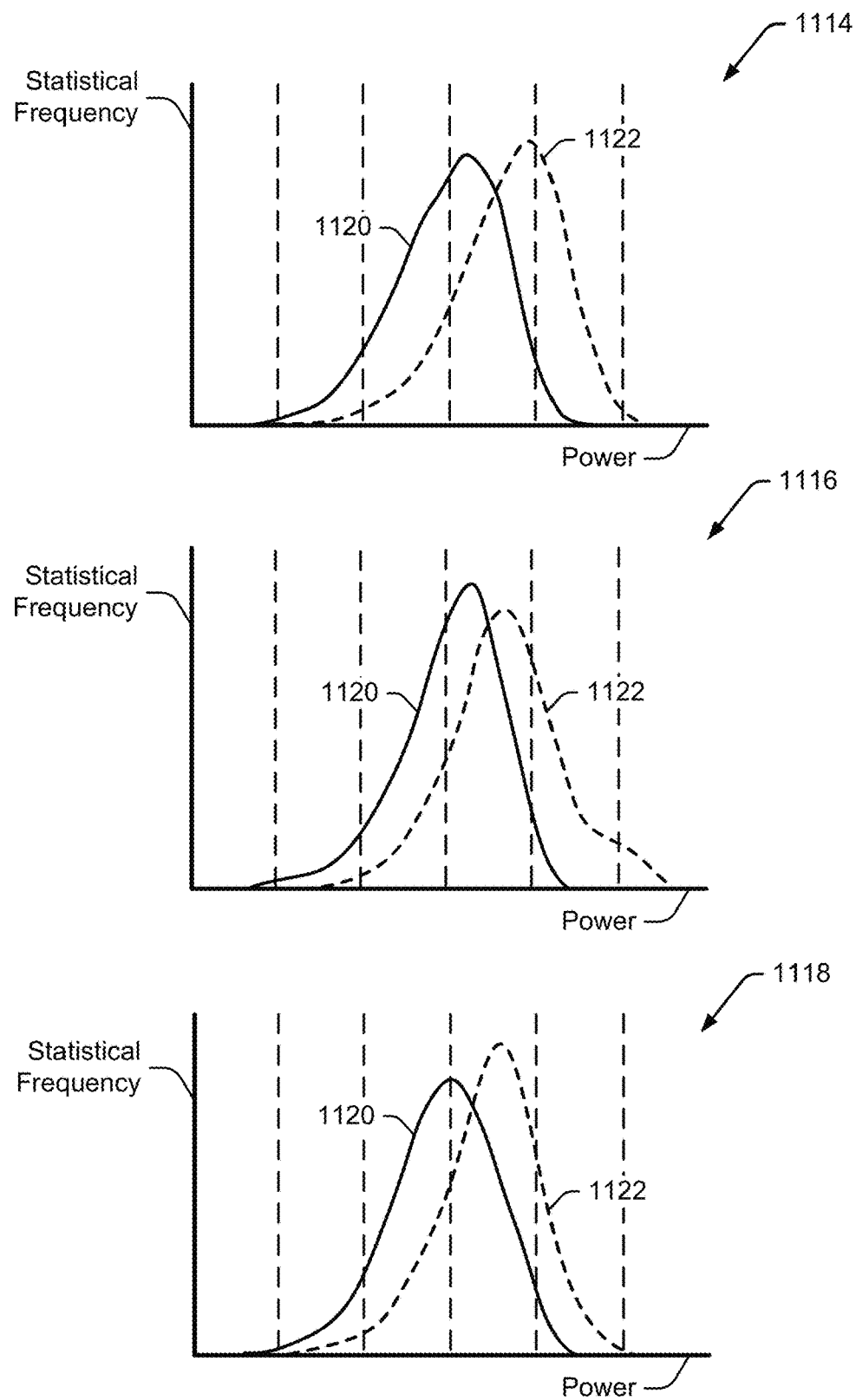
Figure 11:
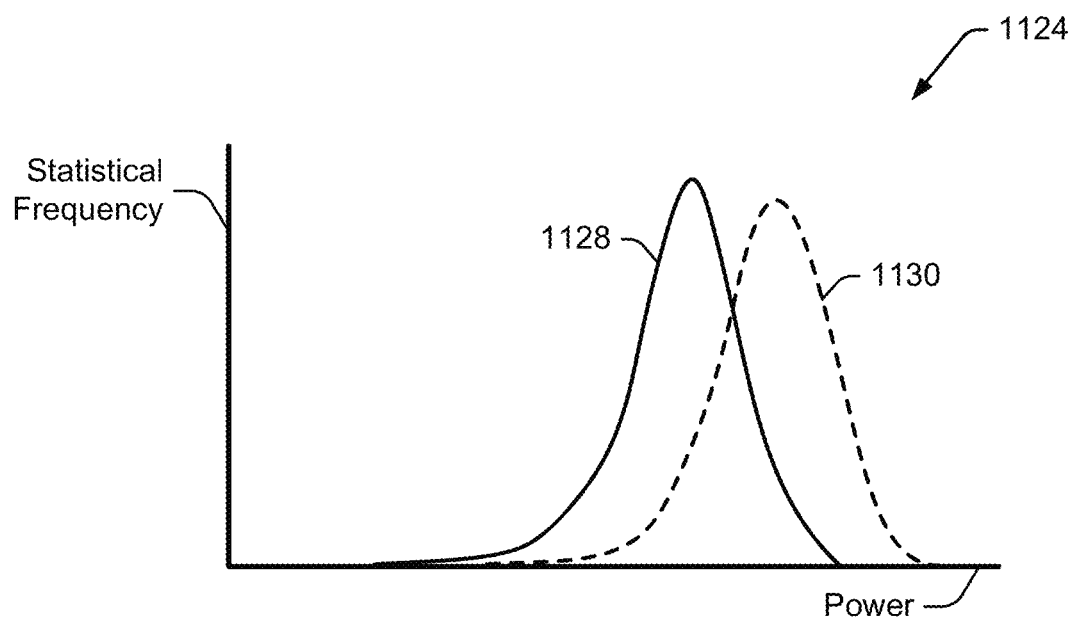
Figure 3:
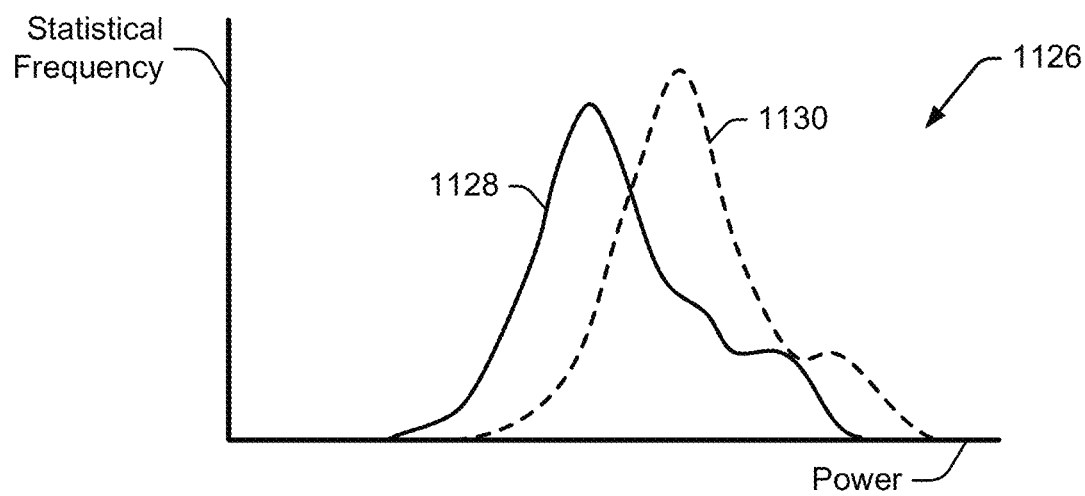

FIG. 11-1 illustrates an example scheme implemented by the ultrasonic sensor 216 to generate another single-channel or multi-channel feature for face authentication anti-spoofing. In this example, the ultrasonic sensor 216 evaluates skewness (e.g., asymmetry or adjusted Fisher-Pearson standardized moment coefficient) of an intensity-based probability distribution for at least one receive channel 608. The different physical structures of the presentation-attack instrument 404 and the human face 408 cause the intensity-based probability distributions associated with these objects to have different shapes. In this manner, the ultrasonic sensor 216 can distinguish between the presentation-attack instrument 404 and the human face 408 for face authentication anti-spoofing.

In the depicted configuration, the pre-processor 702 includes an intensity-based histogram generator 1102. The feature extractor 704 includes a skewness feature extractor 1104. The spoofing predictor 706 includes the comparator 708, the look-up table 710, and/or the machine-learned module 712.

During operation, the intensity-based histogram generator 1102 generates at least one histogram 1106 based on the range-profile data 716. The intensity-based histogram generator 1102 can generate multiple histograms 1106 if the ultrasonic sensor 216 utilizes multiple receive channels 608-1 to 608-M. Example histograms 1106 include a power distribution histogram 1108 and a constant-false-alarm-rate signal-to-noise ratio histogram 1110. The power distribution histogram 1108 represents statistical frequencies of different levels of received power. The constant-false-alarm-rate signal-to-noise ratio histogram 1110 (CFAR SNR histogram 1110) represents statistical frequencies of different constant-false-alarm-rate signal-to-noise ratios of one of the ultrasonic receive signals 412-1 to 412-M, which has been normalized based on a CFAR kernel.

In some aspects, the intensity-based histogram generator 1102 can filter the range-profile data 716 based on the measured location of the object prior to generating the histogram 1106. In this way, the intensity-based histogram generator 1102 can cause a later-determined single-channel feature 726 or multi-channel feature 728 to be associated with the object of interest.

The skewness feature extractor 1104 generates the skewness feature 1112 based on the histogram 1106. The skewness feature 1112 represents the amount of asymmetry or the adjusted Fisher-Pearson standardized moment coefficient. The spoofing predictor 706 analyzes the skewness feature 1112 to determine whether the object presented for face authentication 104 corresponds to the human face 408 or the presentation-attack instrument 404. In particular, the spoofing predictor 706 can determine that the object is the presentation-attack instrument 404 if the skewness feature 1112 indicates that the histogram 1106 is positively skewed relative to a threshold.

If multiple histograms 1106 are available, the spoofing predictor 706 can also evaluate differences between the skewness features 1112 of the multiple histograms 1106. Sometimes skewness differences greater than 0.1 dB can indicate that the object is the presentation-attack instrument 404. Additionally or alternatively, the spoofing predictor 706 can identify, using the look-up table 710 or the machine-learned module 712, the presence of heavy tails within one or more of the histograms 1106. The term "heavy tail" represents a higher statistical frequency occurring towards one end of a distribution relative to a normal distribution. The presence of heavy tails can indicate the presence of the presentation-attack instrument 404, as further described below. Example power distribution histograms 1108 and constant-false-alarm-rate signal-to-noise ratio histograms 1110 are depicted in FIGS. 11-2 and 11-3.

FIG. 11-2 illustrates example power distribution histograms 1114 to 1118 associated with face authentication anti-spoofing. The power distribution histogram 1114 represents data collected when the object is the human face 408. The power distribution histograms 1116 and 1118 represent data collected when the object is a latex mask and a rigid plastic mask, respectively. Each of the power distribution histograms 1114 to 1118 include a first power distribution 1120 associated with the receive channel 608-1 (e.g., associated with the microphone 504-1 of FIG. 5), and a second power distribution 1122 associated with the receive channel 608-2 (e.g., associated with the microphone 504-2 of FIG. 5).

The power distributions 1120 and 1122 within the power distribution histogram 1114 have relatively normal distributions. In this case, the skewness of the power distribution 1120 can be approximately −0.7 dB, and the skewness of the power distribution 1122 can be approximately −0.6 dB. Also, a difference between the skewness of the power distributions 1120 and 1122 can be relatively small (e.g., approximately 0.1 dB or less).

In contrast, at least one of the power distributions 1120 and 1122 within the power distribution histograms 1114 and 1118 are skewed in the positive direction relative to the power distributions 1120 and 1122 within the power distribution histogram 1114. Example skewness of the power distributions 1120 and 1122 within the power distribution histogram 1116 can be approximately −0.2 and −0.9 dB, respectively. In this case, the skewness of the power distribution 1120 is 0.5 dB greater for the latex mask relative to the human face 408. The power distribution 1122 within the power distribution histogram 1114 also has a non-Gaussian distribution or shape. In particular, the power distribution 1122 has a heavy tail on the right side.

Example skewness of the power distributions 1120 and 1122 within the power distribution histogram 1118 can be approximately −0.7 and −0.7 dB, respectively. In this case, the skewness of the power distribution 1122 is 0.1 dB greater for the rigid plastic mask relative to the human face 408. In this case, the ultrasonic sensor 216 may utilize other techniques, such as interferometry (of FIG. 9-1) or other single-channel techniques (of FIG. 8-1) to distinguish between the human face 408 and the rigid plastic mask.

For some types of presentation-attack instruments 404, a difference between the skewness of the power distributions 1120 and 1122 can be substantially large (e.g., greater than 0.3 dB), such as in the power distribution histogram 1116 for the latex mask. This is another characteristic that the spoofing predictor 706 can use to distinguish between the human face 408 and the presentation-attack instrument 404.

This technique can also be applied to other types of presentation-attack instruments 404, such as the device 120 and a paper-based medium 116. For both of these presentation-attack instruments 404, the positive skewness can be even more pronounced. For example, the skewness of the power distributions 1120 and 1122 can be approximately 0.4 and 0.3 dB, respectively, if the object is the device 120. As another example, the skewness of the power distributions 1120 and 1122 can be approximately 0.1 and −0.2 dB, respectively, if the object is the paper-based medium 116.

FIG. 11-3 illustrates example constant-false-alarm-rate signal-to-noise ratio histograms 1124 and 1126 associated with face authentication anti-spoofing. The constant-false-alarm-rate signal-to-noise ratio histogram 1124 represents data collected when the object is the human face 408. The constant-false-alarm-rate signal-to-noise ratio histogram 1126 represent data collected when the object is the device 120. Each of the constant-false-alarm-rate signal-to-noise ratio histograms 1124 and 1126 include a first distribution 1128 associated with the receive channel 608-1 (e.g., associated with the microphone 504 1), and a second distribution 1130 associated with the receive channel 608-2 (e.g., associated with the microphone 504-2).

The distributions 1128 and 1130 within the constant-false-alarm-rate signal-to-noise ratio histogram 1124 have relatively normal distributions (e.g., Gaussian distributions). In contrast, both distributions 1128 and 1130 within the constant-false-alarm-rate signal-to-noise ratio histogram 1126 have tails on the right side. The tails in the constant-false-alarm-rate signal-to-noise ratio histogram 1126 are heavier (e.g., have a higher statistical frequency) relative to the tails in the constant-false-alarm-rate signal-to-noise ratio histogram 1124.

Face Authentication Anti-Spoofing Using Power-Spectra-Based Variance

Figures 1, 12:
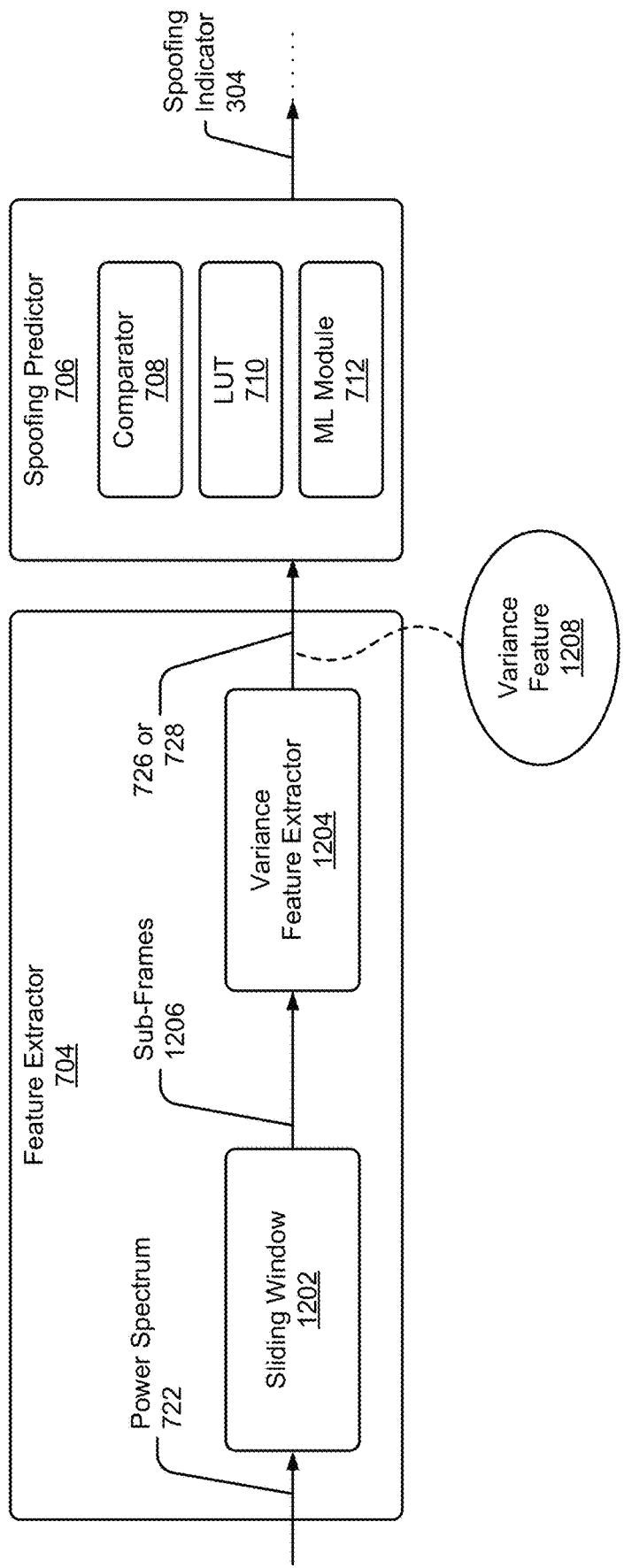
Figures 2, 12:
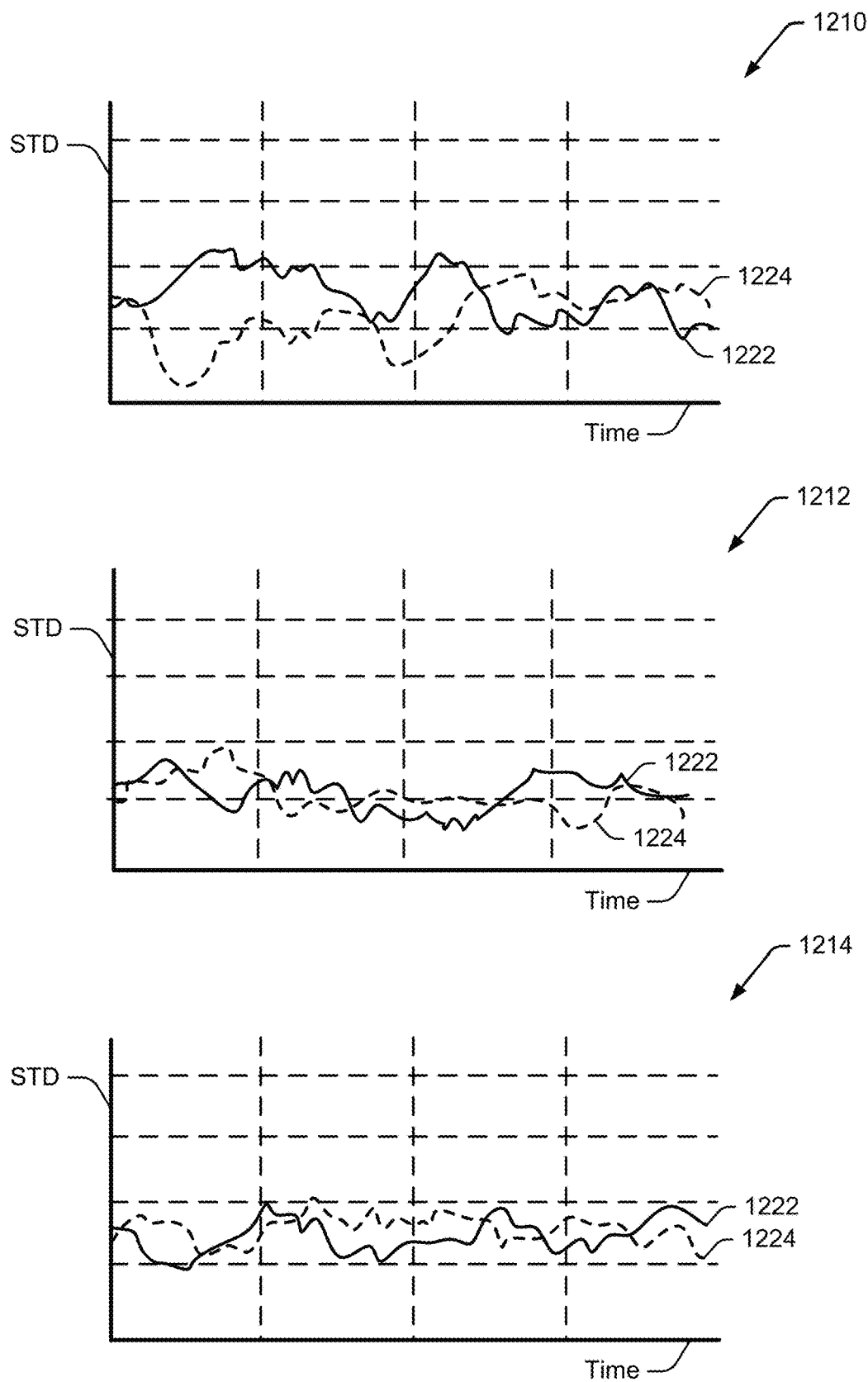
Figures 3, 12:
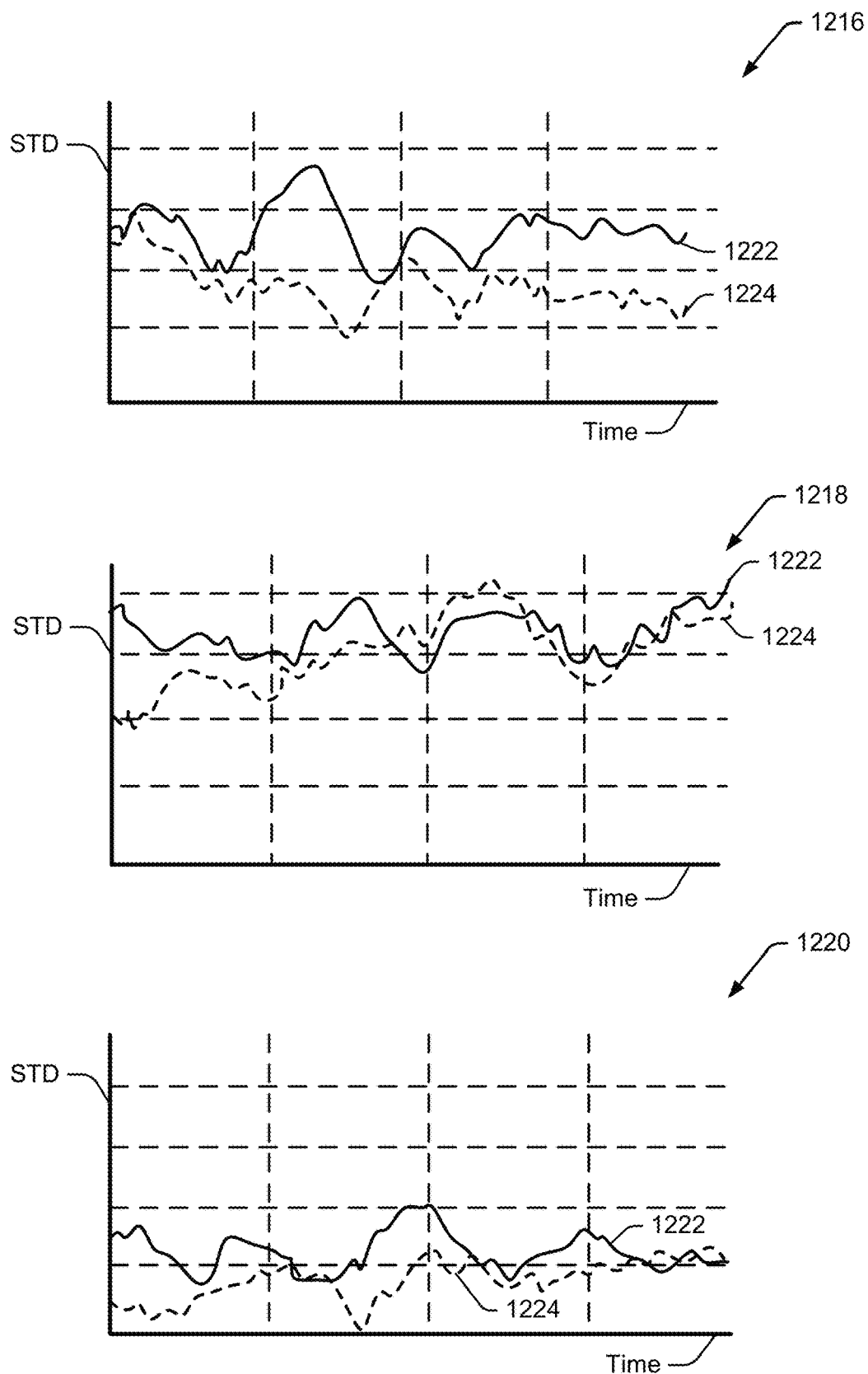

FIG. 12-1 illustrates an example scheme implemented by the ultrasonic sensor 216 to generate yet another single-channel or multi-channel feature for face authentication anti-spoofing. In this example, the ultrasonic sensor 216 uses spectral variance to evaluate an amount of variance observed over time within at least one receive channel 608. Due to the planar structure of some presentation-attack instruments 404, the spectral signature associated with the presentation-attack instrument 404 can have higher variance than distributed targets, such as the human face 408. By analyzing spectral variance for one or more receive channels 608-1 to 608-M, the ultrasonic sensor 216 can distinguish between the presentation-attack instrument 404 and the human face 408 for face authentication anti-spoofing.

In the depicted configuration, the feature-extractor 704 includes a sliding window 1202 and a variance feature extractor 1204. The spoofing predictor 706 can include the comparator 708, the look-up table 710, and/or the machine-learned module 712. During operation, the pre-processor 702 (not shown) provides a power spectrum 722 associated with one of the receive channels 608 to the sliding window 1202. To generate the power spectrum 722, the pre-processor 702 can perform a one-dimensional Fourier transform operation on the range-profile data 716 across the range dimension. Alternatively, the pre-processor 702 can perform a two-dimensional Fourier transform operation on the range-slow time data 720. Prior to generating the power spectrum 722, the pre-processor 702 can filter the range-profile data 716 based on the measured location of the object. In this way, the pre-processor 702 can cause a later-determined single-channel feature 726 or multi-channel feature 728 to be associated with the object of interest.

The sliding window 1202 divides the power spectrum 722 into individual subframes 1206 along a time dimension. These subframes 1206 have different time intervals that may or may not overlap. The variance feature extractor 1204 computes a standard deviation (or variance) of the amplitude information within one or more subframes and optionally within each subframe, to generate the variance feature 1208. Example variance features 1208 are further described below with respect to FIGS. 12-2 and 12-3.

FIGS. 12-2 and 12-3 illustrate standard-deviation graphs 1210 to 1220 associated with face authentication anti-spoofing. The standard-deviation graphs 1210 and 1212 are respectively associated with a human face 408 and a human face 408 wearing a hat as an accessory 110. The standard-deviation graph 1214 is associated with a plastic mask. The standard-deviation graphs 1216, 1218, and 1220 are respectively associated with a paper-based medium 116, the device 120, and a latex mask. Each of the standard-deviation graphs 1210 to 1220 depict variances 1222 and 1224 associated with receive channels 608-1 and 608-2 (e.g., associated with microphones 504-1 and 504-2 of FIG. 5).

To distinguish between the human face 408 (with or without the accessory 110) and the various presentation-attack instruments 404, the spoofing predictor 706 can determine whether the variances 1222 and 1224 are within a set of expected values. If the variances 1222 and 1224 are within the set of expected values, the spoofing predictor 706 determines that an object presented for face authentication 104 corresponds to the human face 408. Alternatively, if the variances 1222 or 1224 have values outside of the set of expected values, the spoofing predictor 706 determines that the presented object corresponds to the presentation-attack instrument 404. The set of expected values can generally include the values shown in the standard-deviation graphs 1210 and 1212.

Considering the standard-deviation graphs 1216 and 1218 associated with the paper-based medium 116 and the device 120, the variances 1222 and 1224 are significantly larger than the variances 1222 and 1224 of the standard-deviation graphs 1210 and 1212. For the standard-deviation graph 1220 associated with the latex mask, the variances 1222 and 1224 are significantly smaller than the variances 1222 and 1224 of the standard-deviation graphs 1210 and 1212.

It can be challenging to distinguish between the standard-deviation graphs 1210 and 1212 and the standard-deviation graph 1214 associated with the plastic mask using spectral variance. In this case, the ultrasonic sensor 216 can perform one or more of the other described techniques to distinguish between the human face 408 and the plastic mask.

Example Methods

Figure 13:
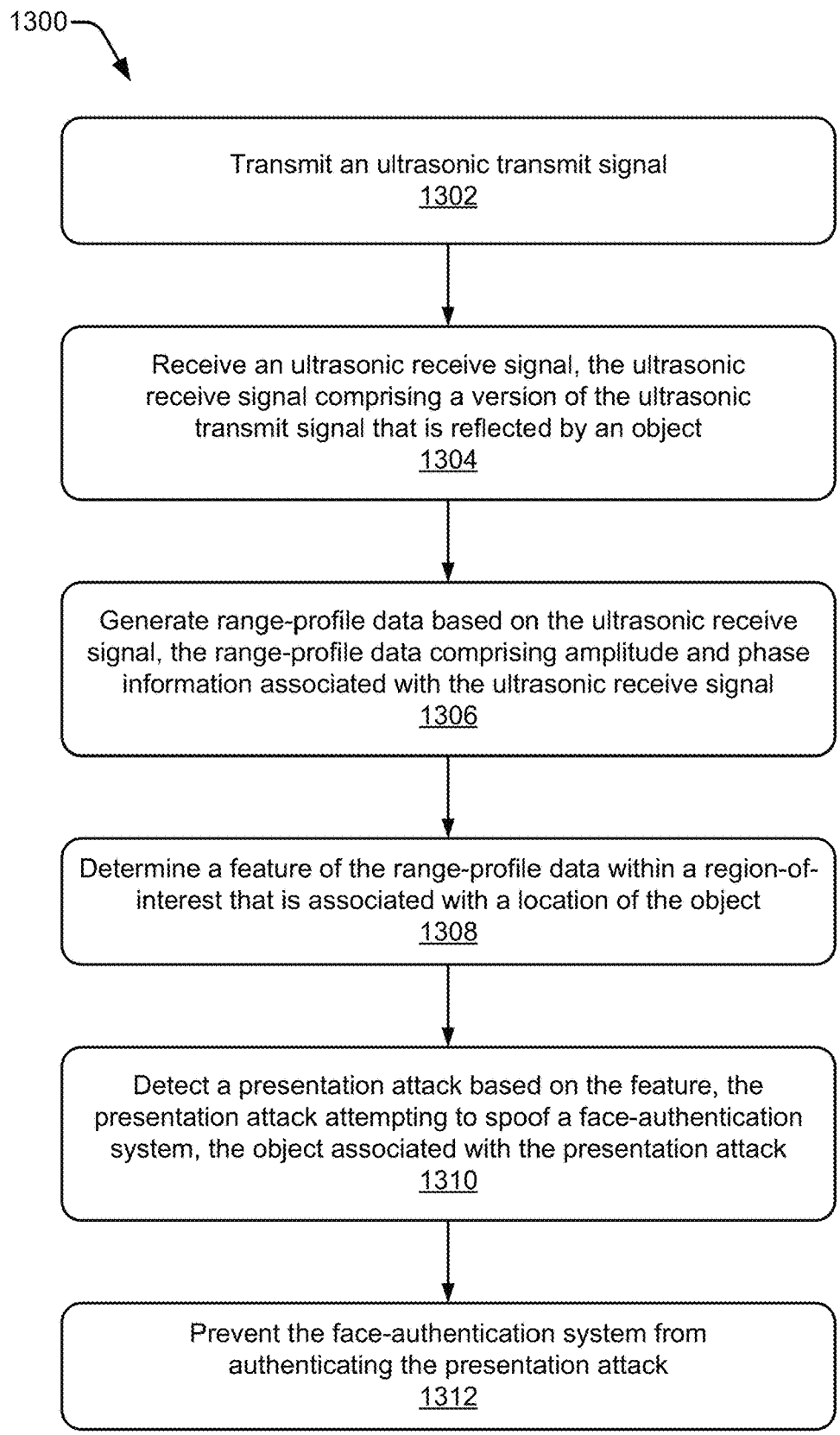
FIG. 13 illustrates an example method for performing face authentication anti-spoofing using ultrasound.
Figure 14:
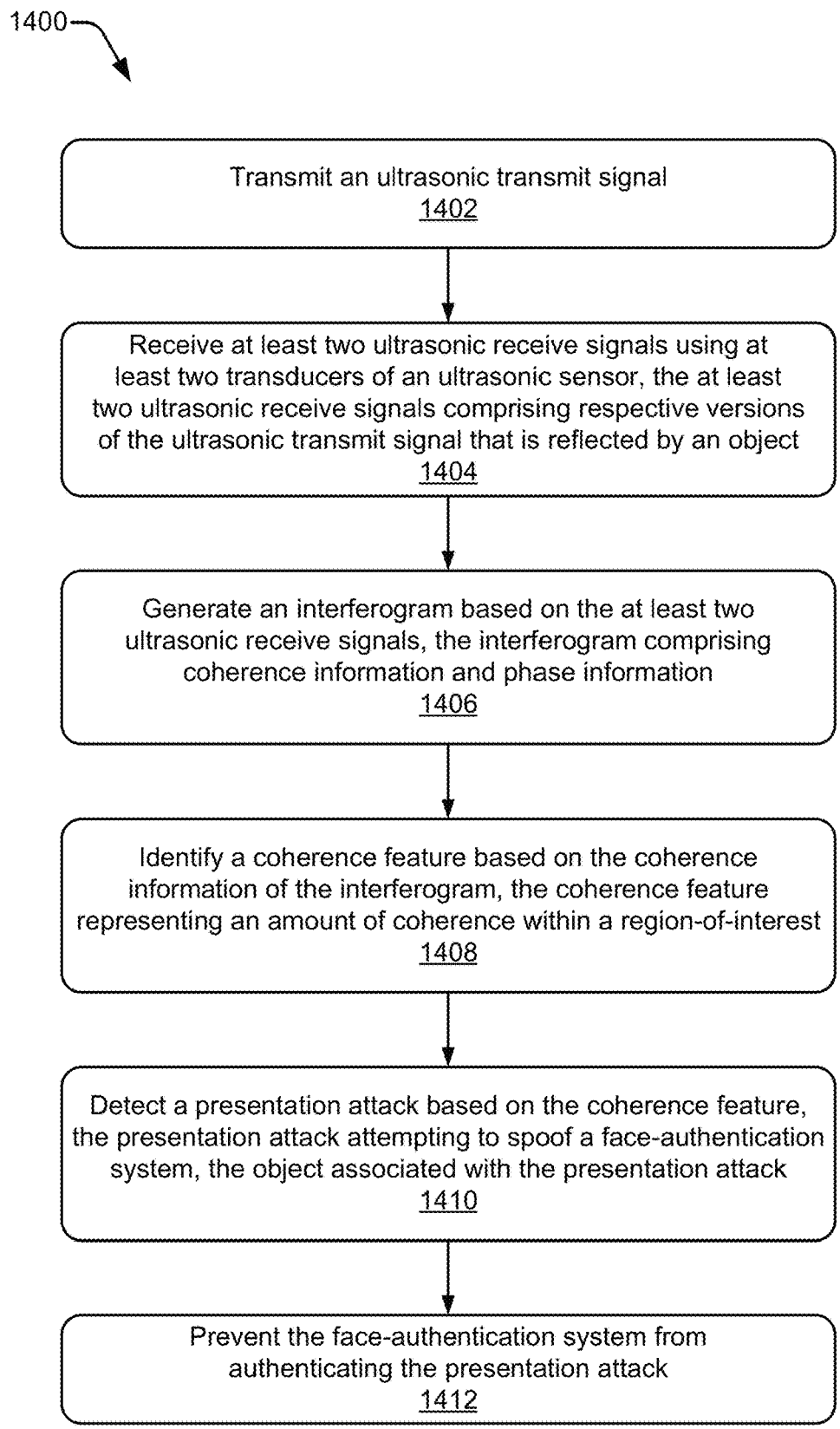
FIG. 14 illustrates another example method for performing face authentication anti-spoofing using interferometry-based coherence.
Figure 15:
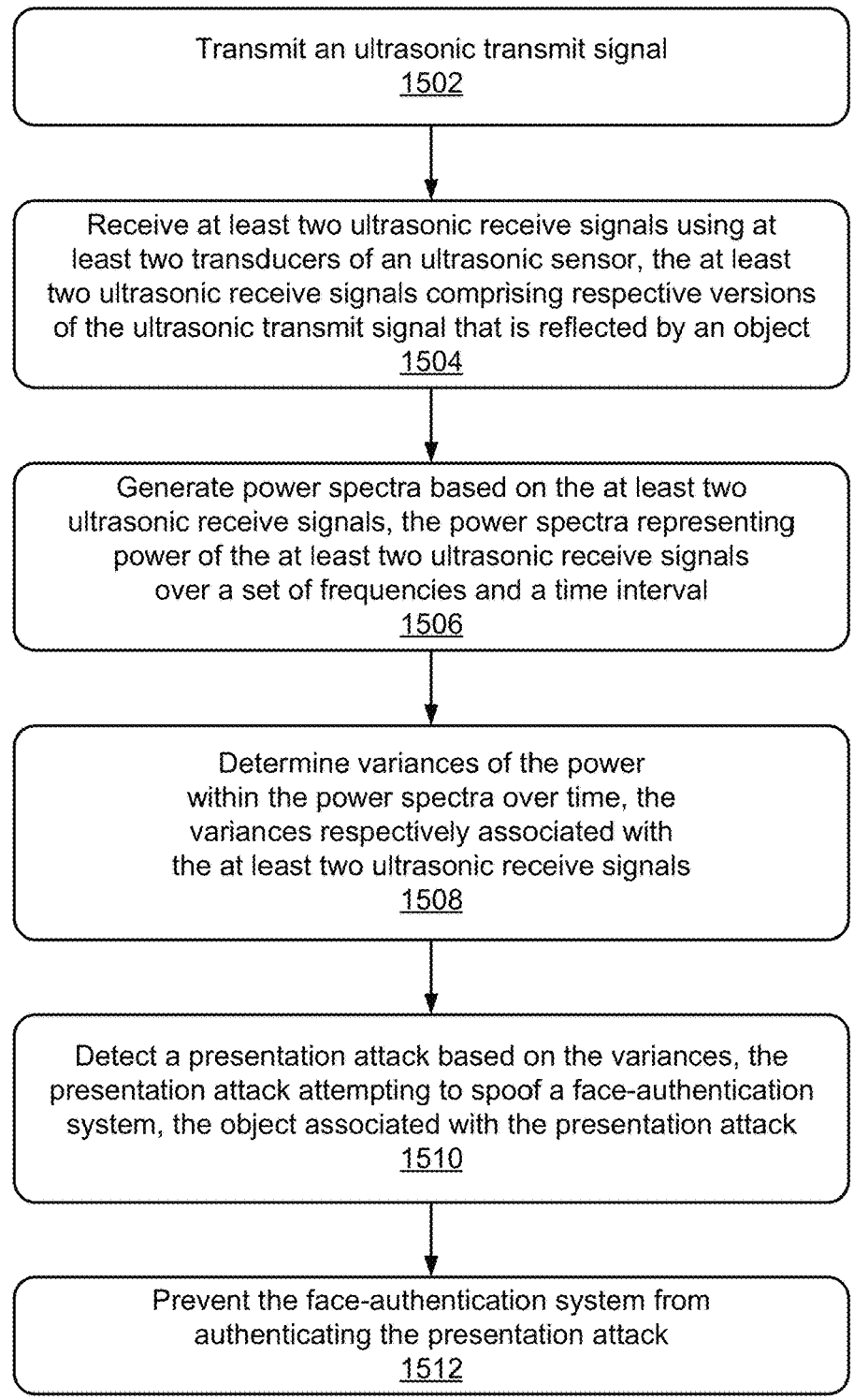
FIG. 15 illustrates an additional example method for performing face authentication anti-spoofing using power-spectra-based variance.

FIGS. 13, 14, and 15 depict example methods 1300, 1400, and 1500 for face authentication anti-spoofing using ultrasound. Each method 1300, 1400, and 1500 is shown as a set of operations (or acts) performed and is not necessarily limited to the order or combinations in which the operations are shown herein. Further, any of one or more of the operations may be repeated, combined, reorganized, or linked to provide a wide array of additional and/or alternative methods. In portions of the following discussion, reference may be made to environments 100-1 to 100-5 of FIG. 1, and entities detailed in FIGS. 2 to 4-1, reference to which is made for example only. The techniques are not limited to performance by one entity or multiple entities operating on one user device 102.

At 1302 in FIG. 13, an ultrasonic transmit signal is transmitted. For example, the ultrasonic sensor 216 transmits the ultrasonic transmit signal 410, as shown in FIG. 4-1. The ultrasonic transmit signal 410 includes frequencies in the range between approximately 20 kHz to 2 MHz, for example as described with reference to FIG. 2-2 above, and can represent a pulsed signal or a continuous signal. In some cases, the ultrasonic sensor 216 modulates a characteristic of the ultrasonic transmit signal 410, including the phase and/or frequency. In some implementations, the ultrasonic sensor 216 transmits the ultrasonic transmit signal 410-1 or 410-S responsive to the face-authentication system 202 receiving the request 302 or responsive to the ultrasonic sensor 216 receiving an alert from the sensor 218 (e.g., an alert from the inertial measurement unit 236) indicating that the user device 102 is approximately stationary.

The ultrasonic sensor 216 can use a dedicated transducer 222 to transmit the ultrasonic transmit signal 410. In other implementations, the ultrasonic sensor 216 can use a shared speaker (e.g., speaker 502) of the user device 102 to transmit the ultrasonic transmit signal 410.

At 1304, an ultrasonic receive signal is received. The ultrasonic receive signal comprises a version of the ultrasonic transmit signal that is reflected by an object. For example, the ultrasonic sensor 216 receives the ultrasonic receive signal 412 using one of the microphones 504-1 or 504-2. The ultrasonic receive signal 412 is a version of the ultrasonic transmit signal 410 (e.g., a delayed version of the ultrasonic transmit signal 410), which is reflected by an object (e.g., the presentation-attack instrument 404 or the human face 408). In some cases, the ultrasonic receive signal 412 has a different amplitude than the ultrasonic transmit signal 410 and/or is shifted in phase and/or frequency. In some implementations, the ultrasonic sensor 216 receives the ultrasonic receive signal 412 during at least a portion of time that the ultrasonic transmit signal 410 is transmitted.

At 1306, range-profile data is generated based on the ultrasonic receive signal. The range-profile data comprises amplitude and phase information associated with the ultrasonic receive signal. For example, the spoofing detector 230 of the ultrasonic sensor 216 generates the range-profile data 716, which is a type of complex data 714. The range-profile data 716 includes amplitude and phase information across a range dimension and a time dimension.

At 1308, a feature of the range-profile data within a region-of-interest that is associated with a location of the object is determined. For example, the ultrasonic sensor 216 determines a feature 724 (e.g., a single-channel feature 726) within a region-of-interest, which is associated with a location of the object. Example single-channel features 726 can include the peak-amplitude feature 808, the energy-distribution feature 810, and/or the phase feature 812, as shown in FIG. 8-1. In general, the region-of-interest identifies a general spatial region that encompasses the location of the object. In some cases, the identified spatial region can surround at least a portion of the location of the object to account for a margin of error in determining the location of the object. An example spatial region can include the range 826 of the object shown in FIG. 8-2. In some implementations, the ultrasonic sensor 216 can directly measure the location of the object by analyzing the range-profile data 716. Additionally or alternatively, the ultrasonic sensor 216 can reference the sensor data 308 provided by the sensor 218 to determine the location of the object.

At 1310, a presentation attack is detected based on the feature. The presentation attack attempts to spoof a face-authentication system. The object is associated with the presentation attack. For example, the ultrasonic sensor 216 detects the presentation attack 114 (e.g., or determines the presence of the presentation-attack instrument 404) based on the feature 724, as described with respect to FIGS. 8-1 and 8-2.

The presentation attack 114 attempts to spoof the face-authentication system 202. The object is associated with the presentation attack 114 and represents the presentation-attack instrument 404. Example presentation-attack instruments 404 can include a photograph 118 of the user 106, a digital picture 124 of the user 106, or a mask 126 that replicates one or more features of the user 106.

At 1312, the face-authentication system is prevented from authenticating the presentation attack. For example, the ultrasonic sensor 216 prevents the face-authentication system 202 from authenticating the presentation attack 114. In particular, the ultrasonic sensor 216 provides the spoofing indicator 304 to the face recognizer 214, which causes the face recognizer 214 to report 306 a face-authentication failure.

In a variant of the method 1300, block 1310 may instead determine based on the feature 724 that there is no presentation attack 114 (e.g., that the object that reflected the ultrasonic transmit signal 410 to generate the ultrasonic receive signal 412 is a human face). In this case, at 1312, the face-authentication system 202 can authenticate the human face 408 to allow the user 106 access.

By analyzing the range-profile data, the ultrasonic sensor 216 can perform face authentication anti-spoofing using as few as one receive channel 608. This can be useful for space-constrained devices in which the ultrasonic sensor 216 is implemented with a single receive channel 608. If additional receive channels 608 are available, the ultrasonic sensor 216 can evaluate the features 724 associated with one or more receive channels and optionally with each receive channel 608 to improve its ability to correctly detect the presentation attack 114.

At 1402 in FIG. 14, an ultrasonic transmit signal is transmitted using an ultrasonic sensor. For example, the ultrasonic sensor 216 transmits the ultrasonic transmit signal 410, as described in FIG. 13 with respect to 1302.

At 1404, at least two ultrasonic receive signals are received using at least two transducers of an ultrasonic sensor. The at least two ultrasonic receive signals comprise respective versions of the ultrasonic transmit signal that is reflected by an object. For example, the ultrasonic sensor 216 receives at least two of the ultrasonic receive signals 412-1 to 412-M using at least two of the microphones 504-1 to 504-M. The ultrasonic receive signal 412-1 to 412-M are respective versions of the ultrasonic transmit signal 410, which is reflected by an object (e.g., the presentation-attack instrument 404 or the human face 408). The ultrasonic receive signals 412-1 to 412-M can have different amplitudes than the ultrasonic transmit signal 410 and/or can be shifted in phase and/or frequency. In some implementations, the ultrasonic sensor 216 receives the ultrasonic receive signals 412-1 to 412-M during at least a portion of time that the ultrasonic transmit signal 410 is transmitted.

At 1406, an interferogram is generated based on the at least two ultrasonic receive signals. The interferogram comprises coherence information and phase information. For example, the spoofing detector 230 of the ultrasonic sensor 216 generates the interferogram 718 based on the at least two ultrasonic receive signals 412-1 to 412-M, as shown in FIG. 9-1. In particular, the pre-processor 702 of the spoofing detector 230 generates the interferogram 718 by combining information from range-profile data 716 associated with two of the receive channels 608-1 to 608-M. The interferogram 718 includes coherence information 936 and phase information 934, as shown in FIG. 9-2.

At 1408, a coherence feature is identified based on the coherence information of the interferogram. The coherence feature represents an amount of coherence within a region-of-interest. For example, the spoofing detector 230 of the ultrasonic sensor 216 identifies (e.g., extracts or generates) the coherence feature 914, which represents an amount of coherence within a region-of-interest 938. The coherence feature 914 can indicate a significantly large amount of coherence if the object is associated with a presentation-attack instrument 404 (as shown in interferograms 930 or 932) or a substantially small amount of coherence if the object is associated with the human face 408 (as shown in interferogram 928). An example coherence feature 914 can represent an average coherence within the region-of-interest 938. Another example coherence feature 914 represents an amount of coherence variance within the region-of-interest 938.

At 1410, a presentation attack is detected based on the coherence feature. The presentation attack attempts to spoof a face-authentication system. The object is associated with the presentation attack. For example, the ultrasonic sensor 216 detects the presentation attack 114 based on the coherence feature 914, as shown in FIG. 9-1. The presentation attack 114 attempts to spoof the face-authentication system 202. The object is associated with the presentation attack 114.

At 1412, the face-authentication system is prevented from authenticating the presentation attack 114. For example, the ultrasonic sensor 216 prevents the face-authentication system 202 from authenticating the presentation attack 114. In particular, the ultrasonic sensor 216 provides the spoofing indicator 304 to the face recognizer 214, which causes the face recognizer 214 to report 306 a face-authentication failure.

In a variant of the method 1400, block 1410 may instead determine based on the coherence feature 914 that there is no presentation attack 114 (e.g., that the object that reflected the ultrasonic transmit signal 410 to generate the ultrasonic receive signal 412 is a human face). In this case, at 1412, the face-authentication system 202 can authenticate the human face 408 to allow the user 106 access.

At 1502 in FIG. 15, an ultrasonic transmit signal is transmitted. For example, the ultrasonic sensor 216 transmits the ultrasonic transmit signal 410, as described in FIG. 13 with respect to 1302.

At 1504, at least two ultrasonic receive signals are received using at least two transducers of an ultrasonic sensor. The at least two ultrasonic receive signals comprise respective versions of the ultrasonic transmit signal that is reflected by an object. For example, the ultrasonic sensor 216 receives at least two of the ultrasonic receive signals 412-1 to 412-M using at least two of the microphones 504-1 to 504-M, as described in FIG. 14 with respect to 1404.

At 1506, power spectra are generated based on the at least two ultrasonic receive signals. The power spectra represent power of the at least two ultrasonic receive signals over a set of frequencies and a time interval. For example, the spoofing detector 230 of the ultrasonic sensor 216 generates the power spectra 722, as shown in FIG. 12-1. The power spectra 722 represents power of the at least two ultrasonic receive signals over a set of frequencies and a time interval.

At 1508, variances of the power within the power spectra are determined over time. The variances are respectively associated with the at least two ultrasonic receive signals. For example, the spoofing detector 230 generates a variance feature 1208, which represents a standard deviation of the power within the power spectra over time. Example standard deviation graphs are shown in FIGS. 12-2 and 12-3 for different types of objects.

At 1510, a presentation attack is detected based on the variances. The presentation attack attempts to spoof a face-authentication system. The object is associated with the presentation attack. For example, the spoofing detector 230 detects the presentation attack 114 based on the variance feature 1208, as shown in FIG. 12-1. The presentation attack 114 attempts to spoof the face-authentication system 202. The object is associated with the presentation attack 114.

At 1512, the face-authentication system is prevented from authenticating the presentation attack. For example, the ultrasonic sensor 216 prevents the face-authentication system 202 from authenticating the presentation attack 114. In particular, the ultrasonic sensor 216 provides the spoofing indicator 304 to the face recognizer 214, which causes the face recognizer 214 to report 306 a face-authentication failure.

In a variant of the method 1500, block 1510 may instead determine based on the variance feature 1208 that there is no presentation attack 114 (e.g., that the object that reflected the ultrasonic transmit signal 410 to generate the ultrasonic receive signal 412 is a human face). In this case, at 1512, the face-authentication system 202 can authenticate the human face 408 to allow the user 106 access.

The operations of FIGS. 13 to 15 can be combined in various ways. In general, the ultrasonic sensor 216 can perform face authentication anti-spoofing using any combination of single-channel features 726 or multi-channel features 728. Although employing additional techniques for face authentication anti-spoofing can use additional computational resources, it can increase an accuracy of the ultrasonic sensor 216 correctly distinguishing between the human face 408 and the presentation-attack instrument 404. Furthermore, performing multiple techniques can better enable the ultrasonic sensor 216 to distinguish between the human face 408 wearing an accessory 110 and the presentation attack 114.

Example Computing System

Figure 16:
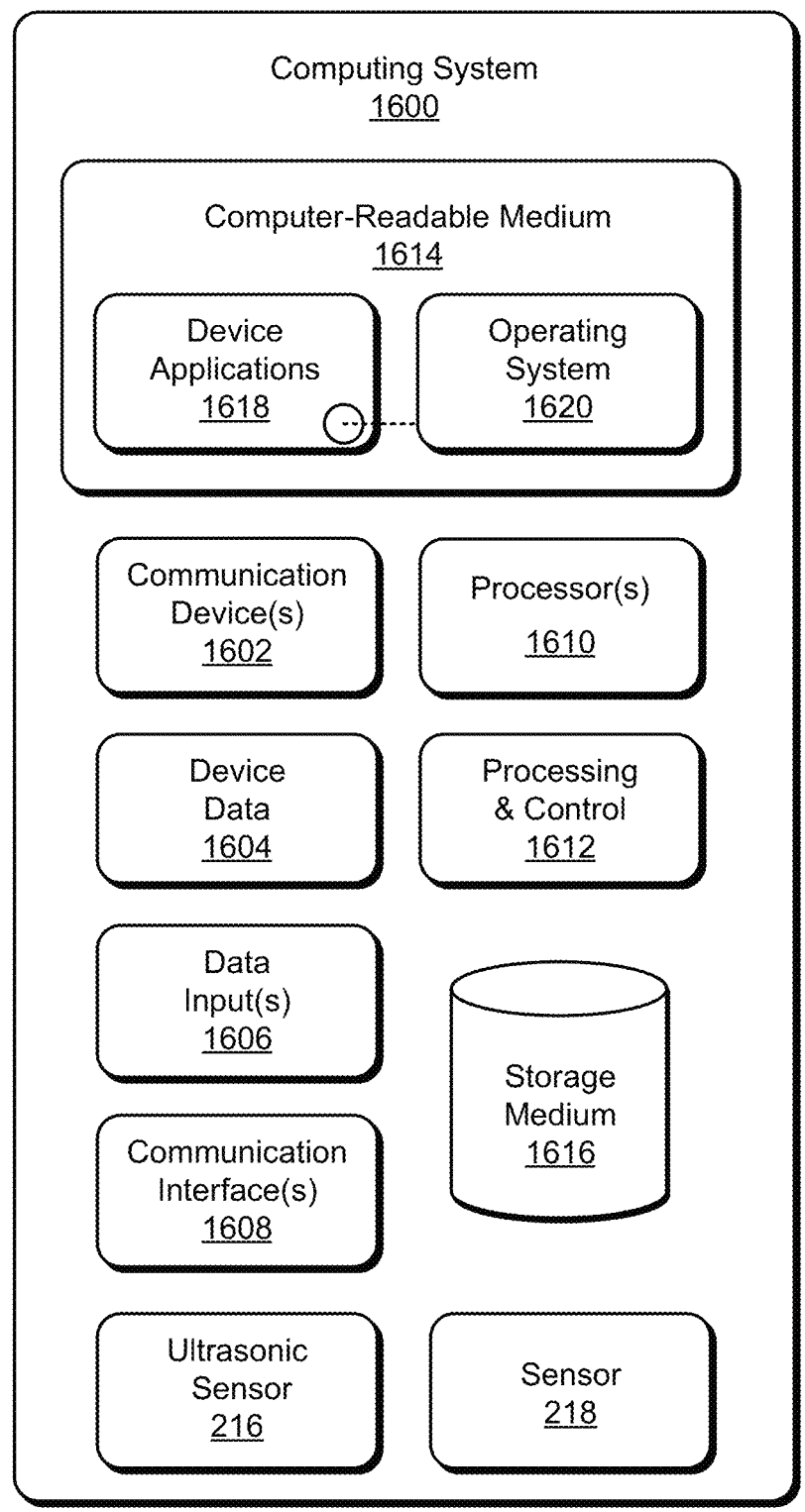
FIG. 16 illustrates an example computing system embodying, or in which techniques may be implemented that enable use of, face authentication anti-spoofing using ultrasound.

FIG. 16 illustrates various components of an example computing system 1600 that can be implemented as any type of client, server, and/or user device 102 as described with reference to the previous FIG. 2-1 to perform face authentication anti-spoofing using an ultrasonic sensor 216.

The computing system 1600 includes communication devices 1602 that enable wired and/or wireless communication of device data 1604 (e.g., received data, data that is being received, data scheduled for broadcast, or data packets of the data). The communication devices 1602 or the computing system 1600 can include one or more ultrasonic sensors 216 and one or more sensor 218. The device data 1604 or other device content can include configuration settings of the device, media content stored on the device, and/or information associated with a user 106 of the device. Media content stored on the computing system 1600 can include any type of audio, video, and/or image data. The computing system 1600 includes one or more data inputs 1606 via which any type of data, media content, and/or inputs can be received, including human utterances, inputs from the ultrasonic sensor 216, user-selectable inputs (explicit or implicit), messages, music, television media content, recorded video content, and any other type of audio, video, and/or image data received from any content and/or data source.

The computing system 1600 also includes communication interfaces 1608, which can be implemented as any one or more of a serial and/or parallel interface, a wireless interface, any type of network interface, a modem, and as any other type of communication interface. The communication interfaces 1608 provide a connection and/or communication links between the computing system 1600 and a communication network by which other electronic, computing, and communication devices communicate data with the computing system 1600.

The computing system 1600 includes one or more processors 1610 (e.g., any of microprocessors, controllers, and the like), which process various computer-executable instructions to control the operation of the computing system 1600 and to enable techniques for, or in which can be embodied, face-authentication anti-spoofing using ultrasound. Alternatively or in addition, the computing system 1600 can be implemented with any one or combination of hardware, firmware, or fixed logic circuitry that is implemented in connection with processing and control circuits, which are generally identified at 1612. Although not shown, the computing system 1600 can include a system bus or data transfer system that couples the various components within the device. A system bus can include any one or combination of different bus structures, including a memory bus or memory controller, a peripheral bus, a universal serial bus, and/or a processor or local bus that utilizes any of a variety of bus architectures.

The computing system 1600 also includes a computer-readable medium 1614, including one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. The disk storage device may be implemented as any type of magnetic or optical storage device, including a hard disk drive, a recordable and/or rewriteable compact disc (CD), any type of a digital versatile disc (DVD), and the like. The computing system 1600 can also include a mass storage media device (storage media) 1616.

The computer-readable medium 1614 provides data storage mechanisms to store the device data 1604, as well as various device applications 1618 and any other types of information and/or data related to operational aspects of the computing system 1600. For example, an operating system 1620 can be maintained as a computer application with the computer-readable medium 1614 and executed on the processors 1610. The device applications 1618 may include a device manager, including any form of a control application, software application, signal-processing and control module, code that is native to a particular device, a hardware abstraction layer for a particular device, and so on. Using the ultrasonic sensor 216, the computing system 1600 can perform face authentication anti-spoofing.

CONCLUSION

Although techniques using, and apparatuses including, an ultrasonic sensor to perform face authentication anti-spoofing have been described in language specific to features and/or methods, it is to be understood that the subject of the appended claims is not necessarily limited to the specific features or methods described. Rather, the specific features and methods are disclosed as example implementations of face authentication anti-spoofing using ultrasound.

Some Examples are described below.

Example 1: A method performed by an ultrasonic sensor, the method comprising:
  transmitting an ultrasonic transmit signal;
  receiving an ultrasonic receive signal, the ultrasonic receive signal comprising a version of the ultrasonic transmit signal that is reflected by an object;
  generating range-profile data based on the ultrasonic receive signal, the range-profile data comprising amplitude and phase information associated with the ultrasonic receive signal;
  determining a feature of the range-profile data within a region-of-interest that is associated with a location of the object;

detecting a presentation attack based on the feature, the presentation attack attempting to spoof a face-authentication system, the object associated with the presentation attack; and preventing the face-authentication system from authenticating the presentation attack.

Example 2: The method of example 1, wherein:

the determining of the feature comprises detecting a peak amplitude within the region-of-interest of the range-profile data; and the detecting the presentation attack comprises:

comparing the peak amplitude to a threshold; and responsive to the peak amplitude being above the threshold, detecting the presentation attack.

Example 3: The method of example 2, further comprising:

transmitting another ultrasonic transmit signal;

receiving another ultrasonic receive signal, the other ultrasonic receive signal comprising a version of the other ultrasonic transmit signal that is reflected by a human face;

generating other range-profile data based on the other ultrasonic receive signal, the other range-profile data comprising amplitude and phase information associated with the other ultrasonic receive signal;

detecting another peak amplitude within another region-of-interest of the other range-profile data, the other region-of-interest associated with a location of the human face;

comparing the other peak amplitude to the threshold; and responsive to the other peak amplitude being less than the threshold, enabling the face-authentication system to authenticate the human face.

Example 4: The method of any preceding example, wherein:

the determining of the feature comprises determining a distribution of energy over the region-of-interest; and the detecting the presentation attack comprises detecting the presentation attack responsive to the distribution of energy being greater than another threshold.

Example 5: The method of any preceding example, further comprising:

determining the location of the object, wherein the region-of-interest includes the location of the object.

Example 6: The method of example 5, further comprising:

accepting sensor data from a sensor, wherein the determining the location of the object comprises determining the location of the object based on the sensor data.

Example 7: The method of example 6, wherein the sensor comprises:

a phase-difference sensor of a camera; or a radio-frequency sensor.

Example 8: The method of any one of examples 5 to 7, further comprising:

prior to determining the feature, filtering the range-profile data to extract the amplitude and phase information associated with the region-of-interest.

Example 9: The method of any preceding example, wherein the transmitting of the ultrasonic transmit signal comprises generating the ultrasonic transmit signal having a bandwidth that results in a range resolution of the range-profile data being less than approximately 7 centimeters.

Example 10: The method of any preceding example, further comprising:

determining a distance to the object; and prior to detecting the presentation attack, normalizing the amplitude information within the range-profile data based on the distance to the object.

Example 11: The method of any one of examples 1 to 9, further comprising:

prior to detecting the presentation attack, normalizing the amplitude information within the range-profile data based on a cross-coupling factor or a constant-false-alarm-rate signal-to-noise ratio.

Example 12: The method of any preceding example, further comprising:

accepting motion data from an inertial measurement unit, the motion data representing motion of the ultrasonic sensor; and compensating for the motion of the ultrasonic sensor by modifying the range-profile data based on the motion data.

Example 13: The method of any one of examples 1 to 11, further comprising:

accepting motion data from an inertial measurement unit; and determining that the ultrasonic sensor is substantially stationary based on the motion data, wherein the transmitting the ultrasonic transmit signal comprises transmitting the ultrasonic transmit signal responsive to determining that the ultrasonic sensor is substantially stationary.

Example 14: An apparatus comprising an ultrasonic sensor configured to perform any one of the methods of examples 1 to 13.

Example 15: A computer-readable medium comprising instructions which, when executed by a processor, cause an ultrasonic sensor to perform any one of the methods of examples 1 to 13.

Example 16: A method performed by an ultrasonic sensor, the method comprising:

transmitting an ultrasonic transmit signal;

receiving at least two ultrasonic receive signals using at least two transducers of the ultrasonic sensor, the at least two ultrasonic receive signals comprising respective versions of the ultrasonic transmit signal that is reflected by an object;

generating an interferogram based on the at least two ultrasonic receive signals, the interferogram comprising coherence information and phase information;

identifying a coherence feature based on the coherence information of the interferogram, the coherence feature representing an amount of coherence within a region-of-interest;

detecting a presentation attack based on the coherence feature, the presentation attack attempting to spoof a face-authentication system, the object associated with the presentation attack; and preventing the face-authentication system from authenticating the presentation attack.

Example 17: The method of example 16, wherein the detecting the presentation attack comprises, responsive to the amount of coherence being greater than a coherence threshold, detecting the presentation attack.

Example 18: The method of example 17, wherein the detecting the presentation attack comprises:

transmitting another ultrasonic transmit signal;

receiving at least two other ultrasonic receive signals, the at least two other ultrasonic receive signals comprising versions of the other ultrasonic transmit signal that is reflected by a human face;

generating another interferogram based on the at least two other ultrasonic receive signals, the other interferogram comprising coherence and phase information;
identifying another coherence feature based on the coherence information of the other interferogram, the other coherence feature representing another amount of coherence within another region-of-interest; and
responsive to the other amount of coherence being less than the coherence threshold, enabling the face-authentication system to authenticate the human face.

Example 19: The method of one of examples 16 to 18, wherein the detecting the presentation attack comprises:
identifying a phase feature based on the phase information of the interferogram, the phase feature representing an amount of phase variation within the region-of-interest; and
responsive to the amount of phase variation being less than a phase threshold, detecting the presentation attack.

Example 20: The method of any one of examples 16 to 19, further comprising:
generating range-profile data based on the at least two ultrasonic receive signals; and
performing co-registration on the range-profile data to generate co-registered range-profile data,
wherein the generating the interferogram comprises generating the interferogram based on the co-registered range-profile data.

Example 21: The method of example 20, wherein:
the range-profile data comprises:
first range-profile data associated with a first ultrasonic receive signal of the at least two ultrasonic receive signals; and
second range-profile data associated with a second ultrasonic receive signal of the at least two ultrasonic receive signals; and
the performing of the co-registration aligns respective responses of the object within the first range-profile data and the second range-profile data along a range dimension.

Example 22: The method of example 21, wherein the performing of the co-registration comprises:
filtering the first range-profile data through a first low-pass filter; and
filtering the second range-profile data through a second low-pass filter.

Example 23: The method of example 21, wherein the performing of the co-registration comprises:
detecting a first peak amplitude within the first range-profile data;
determining a first range bin associated with the first peak amplitude;
detecting a second peak amplitude within the second range-profile data;
determining a second range bin associated with the second peak amplitude;
determining an offset based on a difference between the first range bin and the second range bin; and
shifting the second range-profile data in range based on the offset to generate shifted second range-profile data.

Example 24: The method of example 23, wherein the performing of the co-registration comprises:
determining another offset between the first range-profile data and the shifted second range-profile data; and
interpolating the shifted second range-profile data based on the other offset to generate interpolated and shifted second range-profile data.

Example 25: The method of example 21, wherein the performing of the co-registration comprises:
resampling the second range-profile data to project the second range-profile data to a common grid associated with the first range-profile data.

Example 26: The method of any one of examples 20 to 25, wherein the detecting the presentation attack comprises:
generating power distribution histograms based on the range-profile data, the power distribution histograms respectively associated with the at least two ultrasonic receive signals; and
detecting the presentation attack based on skewness of the power-distribution histograms.

Example 27: The method of any one of examples 20 to 26, wherein the detecting the presentation attack comprises:
generating constant-false-alarm-rate signal-to-noise ratio distribution histograms based on the range-profile data, the constant-false-alarm-rate signal-to-noise ratio distribution histograms respectively associated with the at least two ultrasonic receive signals; and detecting the presentation attack based on skewness of the constant-false-alarm-rate signal-to-noise ratio distribution histograms.

Example 28: The method of example 27, wherein the shapes of the constant-false-alarm-rate signal-to-noise ratio distribution histograms exhibit one or more of the following:
a non-Gaussian distribution; or
a distribution with a tail.

Example 29: An apparatus comprising an ultrasonic sensor configured to perform any one of the methods of examples 16 to 28.

Example 30: The apparatus of example 29, wherein:
the apparatus comprises a smartphone;
the ultrasonic sensor is integrated within the smartphone; and
the at least two transducers of the ultrasonic sensor comprise:
a first microphone of the smartphone; and
a second microphone of the smartphone.

Example 31: The apparatus of example 30, wherein the first microphone and the second microphone are positioned on opposite ends of the smartphone.

Example 32: The apparatus of any one of examples 29 to 31, wherein a distance between the at least two transducers is greater than a wavelength associated with the ultrasonic transmit signal.

Example 33: A computer-readable medium comprising instructions which, when executed by a processor, cause an ultrasonic sensor to perform any one of the methods of examples 16 to 28.

Example 34: A method performed by an ultrasonic sensor, the method comprising:
transmitting an ultrasonic transmit signal;
receiving at least two ultrasonic receive signals using at least two transducers of the ultrasonic sensor, the at least two ultrasonic receive signals comprising respective versions of the ultrasonic transmit signal that is reflected by an object;
generating power spectra based on the at least two ultrasonic receive signals, the power spectra representing power of the at least two ultrasonic receive signals over a set of frequencies and a time interval;
determining variances of the power within the power spectra over time, the variances respectively associated with the at least two ultrasonic receive signals;

detecting a presentation attack based on the variances, the presentation attack attempting to spoof a face-authentication system, the object associated with the presentation attack; and preventing the face-authentication system from authenticating the presentation attack.

Example 35: The method of example 34, wherein the generating the power spectra comprises:

generating complex data based on the at least two ultrasonic receive signals; and performing a Fourier transform to generate the power spectra.

Example 36: The method of example 34 or 35, wherein the complex data comprises:

range-profile data;

range-slow time data; or an interferogram.

Example 37: The method of any one of examples 34 to 36, wherein the detecting the presentation attack comprises:

determining whether the variances are within a set of values; and detecting the presentation attack responsive to at least one of the variances being outside of the set of values.

Example 38: The method of example 37, wherein the detecting the presentation attack comprises:

transmitting another ultrasonic transmit signal;

receiving at least two other ultrasonic receive signals, the at least two other ultrasonic receive signals comprising versions of the other ultrasonic transmit signal that is reflected by a human face;

generating other power spectra based on the at least two other ultrasonic receive signals, the other power spectra representing power of the at least two other ultrasonic receive signals over the set of frequencies and another time interval;

determining other variances of the power within the other power spectra over time, the other variances respectively associated with the at least two ultrasonic receive signals; and responsive to the other variances being within the set of values, enabling the face-authentication system to authenticate the human face.

Example 39: The method of example 38, wherein the human face is wearing an accessory.

Example 40: The method of any one of examples 34 to 39, wherein:

the power spectra comprises:

a first power spectrum associated with a first ultrasonic receive signal of the at least two ultrasonic receive signals; and a second power spectrum associated with a second ultrasonic receive signal of the at least two ultrasonic receive signals; and the determining the variances comprises:

generating, using a sliding window, a first set of subframes of the first power spectrum, subframes of the first set of subframes associated with different portions of the time interval;

computing a first standard deviation across the first set of subframes;

generating, using the sliding window, a second set of subframes of the second power spectrum, subframes of the second set of subframes associated with the different portions of the time interval; and computing a second standard deviation across the second set of subframes.

Example 41: The method of any one of examples 1 to 13, 16 to 28, or 34 to 40, wherein the presentation attack comprises:

an unauthorized actor presenting a photograph of an authorized user;

the unauthorized actor presenting a device that displays a digital picture of the authorized user; or the unauthorized actor wearing a mask that represents the authorized user.

Example 42: An apparatus comprising an ultrasonic sensor configured to perform any one of the methods of examples 34 to 41.

Example 43: The apparatus of example 42, wherein:

the apparatus comprises a smartphone;

the ultrasonic sensor is integrated within the smartphone; and the at least two transducers of the ultrasonic sensor comprise:

a first microphone of the smartphone; and a second microphone of the smartphone.

Example 44: The apparatus of example 43, wherein the first microphone and the second microphone are positioned on opposite ends of the smartphone.

Example 45: The apparatus of any one of examples 42 to 44, wherein a distance between the at least two transducers is greater than a wavelength associated with the ultrasonic transmit signal.

Example 46: A computer-readable medium comprising instructions which, when executed by a processor, cause an ultrasonic sensor to perform any one of the methods of examples 34 to 41.

The invention claimed is:

1. A method performed by an ultrasonic sensor, the method comprising:

transmitting an ultrasonic transmit signal;

receiving an ultrasonic receive signal, the ultrasonic receive signal comprising a version of the ultrasonic transmit signal that is reflected by an object;

generating range-profile data based on the ultrasonic receive signal, the range-profile data comprising amplitude information across a range dimension and a time dimension;

generating normalized range-profile data by normalizing the amplitude information within the range-profile data based on a determined distance to the object;

determining a feature associated with the amplitude information of the normalized range-profile data within a region-of-interest that is associated with a location of the object;

detecting a presentation attack based on a comparison of the determined feature to a threshold, the presentation attack attempting to spoof a face-authentication system, the object associated with the presentation attack; and preventing the face-authentication system from authenticating the presentation attack.

2. The method of claim 1, wherein:

the determining of the feature comprises detecting a peak amplitude within the region-of-interest of the range-profile data; and the detecting the presentation attack comprises:

comparing the peak amplitude to the threshold; and responsive to the peak amplitude being above the threshold, detecting the presentation attack.

3. The method of claim 2, further comprising:

transmitting another ultrasonic transmit signal;

receiving another ultrasonic receive signal, the other ultrasonic receive signal comprising a version of the other ultrasonic transmit signal that is reflected by a human face;

generating other range-profile data based on the other ultrasonic receive signal, the other range-profile data comprising amplitude associated with the other ultrasonic receive signal;

detecting another peak amplitude within another region-of-interest of the other range-profile data, the other region-of-interest associated with a location of the human face;

comparing the other peak amplitude to the threshold; and responsive to the other peak amplitude being less than the threshold, enabling the face-authentication system to authenticate the human face.

4. The method of claim 1, wherein:

the determining of the feature comprises determining a distribution of energy over the region-of-interest; and the detecting the presentation attack comprises detecting the presentation attack responsive to the distribution of energy being greater than the threshold.

5. The method of claim 1, further comprising:

determining the location of the object, wherein the region-of-interest includes the location of the object.

6. The method of claim 5, further comprising:

accepting sensor data from a sensor, wherein the determining the location of the object comprises determining the location of the object based on the sensor data.

7. The method of claim 6, wherein the sensor comprises:

a phase-difference sensor of a camera; or a radio-frequency sensor.

8. The method of claim 5, further comprising:

prior to determining the feature, filtering the range-profile data to extract the amplitude information associated with the region-of-interest.

9. The method of claim 1, wherein the transmitting of the ultrasonic transmit signal comprises generating the ultrasonic transmit signal having a bandwidth that results in a range resolution of the range-profile data being less than approximately 7 centimeters.

10. The method of claim 1, wherein the normalizing of the amplitude information further comprises normalizing the amplitude information based on a cross-coupling factor.

11. The method of claim 1, wherein the normalizing of the amplitude information further comprises normalizing the amplitude information based on a constant-false-alarm-rate signal-to-noise ratio.

12. The method of claim 1, further comprising:

accepting motion data from an inertial measurement unit, the motion data representing motion of the ultrasonic sensor; and compensating for the motion of the ultrasonic sensor by modifying the range-profile data based on the motion data.

13. The method of claim 1, further comprising:

accepting motion data from an inertial measurement unit; and determining that the ultrasonic sensor is substantially stationary based on the motion data, wherein the transmitting the ultrasonic transmit signal comprises transmitting the ultrasonic transmit signal responsive to determining that the ultrasonic sensor is substantially stationary.

14. An apparatus comprising an ultrasonic sensor configured to:

transmit an ultrasonic transmit signal;

receive an ultrasonic receive signal, the ultrasonic receive signal comprising a version of the ultrasonic transmit signal that is reflected by an object;

generate range-profile data based on the ultrasonic receive signal, the range-profile data comprising amplitude information across a range dimension and a time dimension;

generate normalized range-profile data by normalizing the amplitude information within the range-profile data based on a determined distance to the object;

determine a feature associated with the amplitude information of the normalized range-profile data within a region-of-interest that is associated with a location of the object;

detect a presentation attack based on a comparison of the determined feature to a threshold, the presentation attack attempting to spoof a face-authentication system, the object associated with the presentation attack; and prevent the face-authentication system from authenticating the presentation attack.

15. The apparatus of claim 14, wherein the ultrasonic sensor is configured to:

detect a peak amplitude within the region-of-interest of the range-profile data;

compare the peak amplitude to the threshold; and detect the presentation attack responsive to the peak amplitude being above the threshold.

16. The apparatus of claim 14, wherein the ultrasonic sensor is configured to:

determine a distribution of energy over the region-of-interest; and detect the presentation attack responsive to the distribution of energy being greater than the threshold.

17. The apparatus of claim 14, wherein the ultrasonic sensor is configured to generate the ultrasonic transmit signal having a bandwidth that results in a range resolution of the range-profile data being less than approximately 7 centimeters.

18. The apparatus of claim 14, wherein the ultrasonic sensor is further configured to normalize the amplitude information within the range-profile data based a cross-coupling factor or a constant-false-alarm-rate signal-to-noise ratio.

19. A non-transitory computer-readable medium comprising instructions which, when executed by a processor, cause an ultrasonic sensor to:

transmit an ultrasonic transmit signal;

receive an ultrasonic receive signal, the ultrasonic receive signal comprising a version of the ultrasonic transmit signal that is reflected by an object;

generate range-profile data based on the ultrasonic receive signal, the range-profile data comprising amplitude information across a range dimension and a time dimension;

generate normalized range-profile data by normalizing the amplitude information within the range-profile data based on a determined distance to the object;

determine a feature associated with the amplitude information of the normalized range-profile data within a region-of-interest that is associated with a location of the object;

detect a presentation attack based on a comparison of the determined feature to a threshold, the presentation attack attempting to spoof a face-authentication system, the object associated with the presentation attack; and prevent the face-authentication system from authenticating the presentation attack.

20. The computer-readable medium of claim 19, wherein the instructions cause the ultrasonic sensor to:

detect a peak amplitude within the region-of-interest of the range-profile data;

compare the peak amplitude to the threshold; and detect the presentation attack responsive to the peak amplitude being above the threshold.

* * * * *